(12) United States Patent
Harter et al.

(10) Patent No.: US 8,094,691 B2
(45) Date of Patent: Jan. 10, 2012

(54) YB: AND ND: MODE-LOCKED OSCILLATORS AND FIBER SYSTEMS INCORPORATED IN SOLID-STATE SHORT PULSE LASER SYSTEMS

(75) Inventors: Donald Harter, Ann Arbor, MI (US); Gyu Cho, Ann Arbor, MI (US); Zhenlin Liu, Ann Arbor, MI (US); Martin Fermann, Dexter, MI (US); Xinhua Gu, Danville, CA (US); Salvatore Nati, Dexter, MI (US); Lawrence Shah, Maitland, FL (US); Ingmar Hartl, Ann Arbor, MI (US); Mark Bendett, Kirkland, WA (US)

(73) Assignee: Imra America, Inc., Ann Arbor, MI (US)

( * ) Notice: Subject to any disclaimer, the term of this patent is extended or adjusted under 35 U.S.C. 154(b) by 0 days.

(21) Appl. No.: 12/816,105

(22) Filed: Jun. 15, 2010

(65) Prior Publication Data
US 2010/0272129 A1    Oct. 28, 2010

Related U.S. Application Data

(62) Division of application No. 12/340,036, filed on Dec. 19, 2008, now Pat. No. 7,782,912, which is a division of application No. 11/005,218, filed on Dec. 7, 2004, now Pat. No. 7,508,853.

(51) Int. Cl.
*H01S 3/30* (2006.01)
*H01S 3/10* (2006.01)
*H01S 3/13* (2006.01)

(52) U.S. Cl. ................. 372/25; 372/6; 372/30

(58) Field of Classification Search ............... 372/6, 25, 372/29.011, 30, 38.01
See application file for complete search history.

(56) References Cited

U.S. PATENT DOCUMENTS

| 4,829,529 A | 5/1989 | Kafka |
| 5,329,398 A | 7/1994 | Lai |
| 5,390,202 A | 2/1995 | Yan et al. |
| 5,400,350 A | 3/1995 | Galvanauskas |
| 5,436,759 A | 7/1995 | Dijaili |
| 5,450,427 A | 9/1995 | Fermann |
| 5,513,194 A | 4/1996 | Tamura |
| 5,530,582 A | 6/1996 | Clark |
| 5,572,358 A | 11/1996 | Gabl et al. |
| 5,592,327 A | 1/1997 | Gabl et al. |
| 5,627,848 A | 5/1997 | Fermann |
| 5,633,885 A | 5/1997 | Galvanauskas |

(Continued)

FOREIGN PATENT DOCUMENTS
DE    10124983 A1    3/2002
(Continued)

OTHER PUBLICATIONS

Botez et al., The Next Generation of High-Power Semiconductor Diode Lasers, TRW Space and Defense Quest, pp. 21-31, Winter 1991/1992.

(Continued)

*Primary Examiner* — Armando Rodriguez
(74) *Attorney, Agent, or Firm* — Sughrue Mion, PLLC

(57) ABSTRACT

The invention describes classes of robust fiber laser systems usable as pulse sources for Nd: or Yb: based regenerative amplifiers intended for industrial settings. The invention modifies adapts and incorporates several recent advances in FCPA systems to use as the input source for this new class of regenerative amplifier.

44 Claims, 48 Drawing Sheets

U.S. PATENT DOCUMENTS

| | | |
|---|---|---|
| 5,652,681 A | 7/1997 | Chen |
| 5,745,284 A | 4/1998 | Goldberg |
| 5,818,630 A | 10/1998 | Fermann |
| 5,847,863 A | 12/1998 | Galvanauskas |
| 6,049,554 A | 4/2000 | Lang et al. |
| 6,181,463 B1 | 1/2001 | Galvanauskas |
| 6,188,705 B1 | 2/2001 | Krainak et al. |
| 6,208,458 B1 | 3/2001 | Galvanauskas |
| 6,697,393 B2 | 2/2004 | Kasamatsu et al. |
| 6,885,683 B1 | 4/2005 | Fermann |
| 7,330,301 B2 | 2/2008 | Harter |
| 2001/0024458 A1 | 9/2001 | Fermann |
| 2001/0048788 A1 | 12/2001 | Xie |
| 2003/0118060 A1 | 6/2003 | Spuehle et al. |
| 2003/0156605 A1 | 8/2003 | Richardson et al. |
| 2003/0202547 A1 | 10/2003 | Fermann |
| 2004/0036957 A1 | 2/2004 | Galvanauskas |
| 2004/0240037 A1 | 12/2004 | Harter |
| 2004/0263949 A1 | 12/2004 | Gu |
| 2004/0263950 A1 | 12/2004 | Fermann |
| 2005/0041702 A1 | 2/2005 | Fermann |
| 2005/0111500 A1 | 5/2005 | Harter |
| 2005/0157998 A1 | 7/2005 | Dong |
| 2005/0190802 A1 | 9/2005 | Richardson et al. |
| 2005/0218122 A1 | 10/2005 | Yamamoto |
| 2005/0225846 A1 | 10/2005 | Nati |
| 2005/0226278 A1 | 10/2005 | Gu |
| 2005/0226286 A1 | 10/2005 | Liu |
| 2005/0226287 A1 | 10/2005 | Shah |
| 2006/0159137 A1 | 7/2006 | Shah |
| 2008/0232407 A1 | 9/2008 | Harter et al. |

FOREIGN PATENT DOCUMENTS

| | | |
|---|---|---|
| EP | 04104676 A2 | 12/2004 |
| JP | 2002-118315 | 4/2002 |

OTHER PUBLICATIONS

Duling III et al., Compact fiber soliton lasers produce ultrashort pulses, Laser Focus World Apr. 1993 p. 213.

Fermann et al., Environmentally stable Keer-type Mode-locked erbium Fiber Laser Producing306-fs pulses, ME Fermann, Optics Letters Jan. 1, 1994, pp. 43-38 Optics Letters vol. 19, No. 1 OSA.

Fermann et al., All-fiber source of 100 nJ subpicosecond pulses by M.E. Fermann, A. Galvanauskas and D. Harter, and published in Appl. Phys. Letters vol. 64, 11, 1994, pp. 1315-1317.

Harter et al., Short pulse amplification in tunable solid state materials, Harter, et al., SPIE, vol. 1229, 1990, pp. 19-28.

Mizoguchi et al., 100-fs, 10-Hz, terawatt KrF laser, M. Mizoguchi, K. Kondo, and S. Watanabe, Josa B, vol. 9, Iss. 4, pp. 560564 (1992).

Nabekawa et al., Terawatt KrF/Ti:sapphire hybrid laser system, Optics Letters vol. 18, No. 22, pp. 1922-1224, Nov. 15, 1993.

Tamura et al., Technique for obtaining high-energy ultrashort pulses from an additive-pulse mode-locked erbium-doped fiber ring laser, K. Tamura, C.Doerr, L.Nelson, H.Haus, E.Ippen, Optics Letters vol. 19 Is.1 p. 46 (1994).

Yakymyshyn et al., Frequency-doubled, additive-pulse, mode-locked NaCl:OH laser, Optics Letters vol. 14, No. 15, p. 793 Aug. 1, 1989.

Bado et al., Regenerative Amplification in Alexandrite of pulse from Specialized Oscillators, IEEE J of Quantum Electronics vol. 24, No. 6, p. 1167 Jun. 1988.

Galvanauskas, U.S. Appl. No. 09/317,221, filed May 24, 1999.

*Ex Parte Cark-Mxr Inc.*, B.P.A.I. decision, Reexamination control US90/005,220 of US5530582.

Saleh et al., "Acousto-optic Devices, from Fundamentals of Photonics", Wiley-Interscience publications, 1944, pp. 823-825.

S. F. Su et al., "Gain Equalization in Multiwavelength Lightwave Systems Using Acousto-Optic Tunable Filters", IEEE Photon, Technol. Lett. 4, 1992, pp. 269-271.

YB: AND ND: MODE-LOCKED OSCILLATORS AND FIBER SYSTEMS INCORPORATED IN SOLID-STATE SHORT PULSE LASER SYSTEMS

CROSS-REFERENCE TO RELATED APPLICATIONS

This application is a divisional of U.S. application Ser. No. 12/340,036, filed Dec. 19, 2008, which is a divisional of U.S. application Ser. No. 11/005,218 filed Dec. 7, 2004, which is the disclosure of which is incorporated herein by reference in its entirety.

BACKGROUND OF THE INVENTION

Regenerative amplifiers utilizing chirped pulse amplification (CPA) have been the dominant means for obtaining pulse energies greater than a microjoule with pulse durations in the femtosecond to picosecond range. Microjoule to millijoule pulse energies with pulse durations below 10 picoseconds have been found to be particularly useful for micromachining and for medical applications such as Lasik. However, a big stumbling block in the utilization of ultrafast sources for these applications has been that the regenerative amplifier is more of a piece of laboratory equipment and not conducive to the industrial setting.

Alternative sources for microjoule level, ultrafast pulses are emerging; utilizing all fiber chirped pulse amplification designs. Such systems are inherently more stable since they are based on technology similar to that utilized in Telecomm systems. During the past decade, there has been intensive work and success in making such systems practical. However, for higher pulse energies in the millijoule range, regenerative amplifiers will continue to dominate for some time since pulse energies above a millijoule have not been demonstrated in an all fiber system.

For micromachining applications, more industrially compatible regenerative amplifiers are now being developed based on Nd: or Yb: doped materials, rather than the Ti:sapphire that has dominated the scientific market. There are two basic reasons for this change. Commercial markets typically do not require the shorter pulses that can only be obtained from the Ti:sapphire regenerative amplifier, and the Nd: and Yb: based materials can be directly diode pumped, which makes these systems more robust and less expensive. An unresolved technical issue for Nd: or Yb: based regenerative amplifiers is the need for an equally robust seed source for femtosecond or picosecond pulses. The present seed lasers are mode-locked solid-state lasers with questionable reliability. It would be preferable to have a robust fiber seed source similar to that which has been developed for the Ti:sapphire regenerative amplifier, and used where Ti:sapphire regenerative amplifiers are applied to more commercial applications.

In a copending U.S. application Ser. No. 10/960,923, filed which is assigned to the common assignee and the disclosure of which is incorporated by reference in its entirety, the design changes needed for a mode-locked Yb:doped fiber oscillator and amplifier to be utilized as a seed source for a Yb: or Nd: based solid-state regenerative amplifier are described. The purpose of this application is to modify and apply many of the improvements in all fiber chirped pulse amplification systems for application to the seed source of a regenerative amplifier.

SUMMARY OF THE INVENTION

The purpose of this invention is to incorporate the many recent improvements in femtosecond mode-locked fiber lasers and femtosecond fiber chirped pulse amplification systems to regenerative amplifier systems that incorporate femtosecond or picosecond pulse sources based on fiber seed-sources and/or fiber amplifiers.

Yb: and Nd: mode-locked oscillators with fiber amplifiers can be utilized as sources of ultrafast pulses for regenerative amplifiers in order to obtain higher pulse energies than can be realized at this time from all fiber short pulse systems. A8827 (incorporated by reference herein) describes specifically how the sources can be configured to be implemented in such fiber based seed sources for solid state regenerative amplifiers. The femtosecond source and fiber amplifier need to be carefully configured in order to obtain optimum, reliable performance when incorporated into such a system. Recently there have been many improvements in mode-locked fiber sources implemented with fiber amplifiers in chirped pulse amplifier systems that can be utilized in a regenerative amplifier system that typically is based on chirped pulse amplification. Applicable improvements to fiber mode-locked sources are disclosed in Ser. Nos. 09/576,772, 09/809,248, 10/627,069, 10/814,502 and 10/814,319 (all incorporated by reference herein). Alternative suitable femtosecond sources that utilize fiber amplification for pulse conditioning and shortening are described in Ser. No. 10/437,057. One of the difficulties with chirped pulse amplification systems has been in producing reliable and compact pulse stretchers that can be dispersion matched to pulse compressors suitable for high pulse energies.

Significant improvements for dispersion matched fiber stretchers for fiber based chirped pulse amplification. These improvements are also applicable to chirped pulse amplification systems even when solid state bulk mode-locked lasers are utilized as the seed source. Significant improvements have been made in packaging, electronic controls, fabrication processes and optical parameter controls in order to make fiber based femtosecond sources reliable. These engineering improvements can also be utilized in these regenerative amplifier systems and are disclosed in Ser. Nos. 10/606,829, 10/813,163, 10/813,173.

Previously, Yb: and Nd: mode-locked oscillators and fiber amplifiers have been utilized as pulse sources for narrow bandwidth, bulk, solid-state amplifiers including regenerative amplifiers that can produce pulses 20 picoseconds or greater. In general, the configuration solutions for these longer pulse sources as described, for example in Ser. No. 10/927,374 (incorporated by reference herein) are different than those described here for sub-picosecond systems. However, the engineering improvements described here will also be applicable for the longer pulse systems, and the bulk amplifier operated as a regenerative amplifier has increased flexibility.

The first important element for a short pulse regenerative amplifier system is the source of short pulses. Femtosecond mode-locked fiber lasers are a good source of such pulses. Typically the fiber oscillator is low power and needs additional amplification for application as a seed source. Other important needs are pulse compression, wavelength flexibility, dispersion control and fiber delivery.

Therefore, it is an object of the present invention to introduce a modular, compact, widely-tunable, high peak and high average power, low noise ultrafast fiber amplification laser system suitable for a seed source for a regenerative amplifier.

It is a further object of the invention to ensure modularity of the system by employing a variety of easily interchangeable optical systems, such as 1) short pulse seed sources, 2) wide bandwidth fiber amplifiers, 3) dispersive pulse stretching elements, 4) dispersive pulse compression elements, 5) nonlinear frequency conversion elements and 6) optical components for fiber delivery. In addition, any of the suggested modules can be comprised of a subset of interchangeable optical systems.

It is a further object of the invention to ensure system compactness by employing efficient fiber amplifiers, directly or indirectly pumped by diode lasers as well as highly integrated dispersive delay lines. The high peak power capability of the fiber amplifiers is greatly expanded by using parabolic or other optimized pulse shapes. In conjunction with self-phase modulation, parabolic pulses allow for the generation of large-bandwidth high-peak power pulses, as well as for well-controlled dispersive pulse stretching. High power parabolic pulses are generated in high-gain single or multi-mode fiber amplifiers operating at wavelengths where the fiber material dispersion is positive.

Parabolic pulses can be delivered or transmitted along substantial fiber lengths even in the presence of self-phase modulation or general Kerr-effect type optical nonlinearities, while incurring only a substantially linear pulse chirp. At the end of such fiber delivery or fiber transmission lines, the pulses can be compressed to approximately their bandwidth limit.

Further, the high energy capability of fiber amplifiers is greatly expanded by using chirped pulse amplification in conjunction with parabolic pulses or other optimized pulse shapes, which allow the toleration of large amounts of self-phase modulation without a degradation of pulse quality. Highly integrated chirped pulse amplification systems are constructed without compromising the high-energy capabilities of optical fibers by using fiber-based pulse stretchers in conjunction with bulk-optic pulse compressors (or low non-linearity Bragg gratings) or periodically poled nonlinear crystals, which combine pulse compression with frequency-conversion.

The dispersion in the fiber pulse stretcher and bulk optic compressor is matched to quartic order in phase by implementing fiber pulse stretchers with adjustable 2nd, 3rd and 4th order dispersion. Adjustable higher-order dispersion can be obtained by using high numerical aperture single-mode fibers with optimized refractive index profiles by itself or by using standard step-index high numerical aperture fibers in conjunction with linearly chirped fiber gratings. Alternatively, higher-order dispersion can be controlled by using the dispersive properties of the higher-order mode in a high numerical aperture few-mode fiber, by using nonlinearly chirped fiber gratings or by using linearly chirped fiber gratings in conjunction with transmissive fiber gratings. Adjustable 4th order dispersion can be obtained by controlling the chirp in fiber Bragg gratings, transmissive fiber gratings and by using fibers with different ratios of $2^{nd}$, $3^{rd}$ and $4^{th}$ order dispersion. Equally, higher-order dispersion control can be obtained by using periodically poled nonlinear crystals.

The fiber amplifiers are seeded by short pulse laser sources, preferably in the form of short pulse fiber sources. For the case of Yb fiber amplifiers, Raman-shifted and frequency doubled short pulse Er fiber laser sources can be implemented as widely tunable seed sources. To minimize the noise of frequency conversion from the 1.5 µm to the 1.0 µm regime, self-limiting Raman-shifting of the Er fiber laser pulse source can be used. Alternatively, the noise of the nonlinear frequency conversion process can be minimized by implementing self-limiting frequency-doubling, where the center wavelength of the tuning curve of the doubling crystal is shorter than the center wavelength of the Raman-shifted pulses.

The process of Raman-shifting and frequency-doubling can also be inverted, where an Er fiber laser is first frequency-doubled and subsequently Raman-shifted in an optimized fiber providing soliton-supporting dispersion for wavelengths around 800 nm and higher to produce a seed source for the 1 µm wavelength regime.

As an alternative low-complexity seed source for an Yb amplifier, a modelocked Yb fiber laser can be used. The fiber laser can be designed to produce strongly chirped pulses and an optical filter can be incorporated to select near bandwidth-limited seed pulses for the Yb amplifier.

Presently the mode-locked Yb: doped fiber laser is the preferred oscillator. The preferred source is described Ser. No. 10/627,069 (incorporated herein).

The present invention is similarly directed to a mass-producible passively modelocked fiber laser. By incorporating apodized fiber Bragg gratings, integrated fiber polarizers and concatenated sections of polarization-maintaining and non-polarization-maintaining fibers, a fiber pig-tailed, linearly polarized output can be readily obtained from the laser. By further matching the dispersion value of the fiber Bragg grating to the inverse, or negative, of the dispersion of the intra-cavity fiber, the generation of optimally short pulses with a large optical bandwidth can be induced. In this regard, either positive dispersion in conjunction with negative dispersion fiber gratings or negative dispersion in conjunction with positive dispersion fiber gratings can be implemented. Preferably, the dispersion characteristics of the fiber Bragg grating and the dispersion characteristics of the rest of the intra-cavity elements are matched to within a factor of three. Even more preferably, these characteristics are matched within a factor of two, or within a factor in the range of 1.0 to 2.0. Also preferably, the Bragg grating has a chirp rate greater than 80 nm/cm. More preferably, the Bragg grating has a chirp rate greater than 160 nm/cm. Most preferably, the Bragg grating has a chirp rater greater than 300 nm/cm. To maximize the output power and the pulse repetition rate, the use of wide-bandwidth fiber Bragg gratings with low absolute dispersion is preferable. These fiber Bragg gratings are also used as end-mirrors for the cavity and allow the transmission of pump light to the intra-cavity gain fiber. The fiber Bragg gratings are conveniently produced using phase masks.

Alternatively, fiber couplers can be used inside the fiber cavity. Generally, sections of polarization-maintaining and non-polarization-maintaining fiber can be concatenated inside the fiber cavity. The non-polarization-maintaining section should then be short enough so as not to excessively perturb the polarization state. Intra-cavity sections of non-polarization-maintaining fiber preferably comprise all-fiber polarizers to lead to preferential oscillation of one linear polarization state inside the cavity. Similarly, when directly concatenating polarization-maintaining fiber sections, the length of the individual section should be long enough to prevent coherent interactions of pulses propagating along the two polarization axes of the polarization-maintaining fibers, thereby ensuring a maximum in pulse stability.

Saturable absorber mirrors (SAMs) placed inside the cavity enable passive modelocking. The saturable absorbers (SA) can be made from multiple quantum wells (MQW) or bulk semiconductor films. These saturable absorbers have preferably a bi-temporal life-time with a slow component ($>>100$ ps) and a fast component ($<<20$ ps). The realization of the bi-temporal dynamics of the optical nonlinearity is achieved by tailoring the depth profile of the ion-implantation in combination with the implantation dose and energy. The result is that the carriers trap at distinctively different rates in different depth regions of the SAM.

Saturating semiconductor films can for example be grown from aluminum-containing material such as AlGaInAs, the exact composition can be selected depending on the sought band-gap (typically selected to be in the vicinity of the desired operating wavelength of the laser system) and it is also governed by the requirement of lattice-match between the saturating semiconductor film and an underlying Bragg mirror or any other adjacent semiconductor material. Compositional requirements enabling lattice match between semiconductors and/or a certain band gap are well known in the state of the art and are not further explained here.

In aluminum containing semiconductors the surface area can induce a low optical damage threshold triggered by oxidization of the surface. In order to prevent optical damage of aluminum containing surface areas a passivation layer, e.g., InP, InGaAs or GaAs, is incorporated. SA degradation is further minimized by optimizing the optical beam diameter that impinges on the SAM. In one implementation the SAM and an intra-cavity fiber end can be either butt-coupled or brought into close contact to induce modelocking. Here, the incorporation of a precision AR-coating on the intra-cavity fiber end minimizes any bandwidth restrictions from etalon formation between the SAM and the fiber end. Etalons can also be minimized by appropriate wedging of the fiber ends. The beam diameter inside the SAM can be adjusted by implementing fiber ends with thermally expanded cores. Alternatively, focusing lenses can be directly fused to the fiber end. Moreover, graded-index lenses can be used for optimization of the focal size and working distance between the fiber tip and SA surface.

Wavelength tuning of the fiber lasers can be obtained by heating, compression or stretching of fiber Bragg gratings or by the incorporation of bulk optic tuning elements.

The use of bi- or multi-temporal saturable absorbers allows the design of dispersion compensated fiber laser operating in a single-polarization state, producing pulses at the bandwidth limit of the fiber gain medium.

Further improvement of the femtosecond Yb doped fiber oscillator can include an integral mass produced master oscillator, power amplifier design (MOPA) which is describe in Ser. No. 10/814,502 (incorporated by reference herein).

One embodiment of the present invention comprises a master oscillator power amplifier comprising a mode-locked fiber oscillator and a fiber amplifier. The mode-locked fiber oscillator comprises a pair of reflective optical elements that form an optical resonator. At least one of the reflective optical elements is partially transmissive and has a reflection coefficient that is less than about 60%. The mode-locked fiber oscillator outputs a plurality of optical pulses. The fiber amplifier is optically connected to the mode-locked fiber oscillator through a bi-directional optical connection such that light from the mode-locked fiber oscillator can propagate to the fiber amplifier and light from the fiber amplifier can propagate to the mode-locked fiber oscillator.

Another embodiment of the present invention comprises a method of producing laser pulses. In this method, optical energy is propagated back and forth through a gain fiber by reflecting light from a pair of reflective elements on opposite ends of the gain fiber. Less than about 60% of the light in the gain fiber is reflected back into the gain fiber by one of the reflectors. The pair of reflective elements together form a resonant cavity that supports a plurality of resonant optical modes. The resonant optical modes are substantially mode-locking to produce a train of pulses. The train of optical pulses is propagated from the laser cavity through one of the reflectors to a fiber amplifier along a bi-directional optical path from the laser cavity to the fiber amplifier where the laser pulses are amplified.

Another embodiment of the present invention comprises a fiber-based master oscillator power amplifier comprising a mode-locked fiber oscillator, a fiber amplifier comprising a gain fiber, and bi-directional optical path between the mode-locked fiber oscillator and the fiber amplifier. The mode-locked fiber oscillator comprises a resonant cavity and a gain medium. The mode-locked fiber oscillator produces a plurality of optical pulses. The bi-directional optical path between the mode-locked fiber oscillator and the fiber amplifier permits light from the mode-locked fiber oscillator to propagate to the fiber amplifier and light from the fiber amplifier to propagate to the mode-locked fiber oscillator. The mode-locked fiber oscillator comprises a first segment of fiber and the fiber amplifier comprises a second segment of optical fiber. The first and second segments form a substantially continuous length of optical fiber. In some embodiments, the first and second segments are spliced together. The first and second segments may be fusion spliced. The first and second segments may also be butt coupled together with or without a small gap, such as a small air gap, between the first and second segments.

Another embodiment of the present invention comprises a method of producing laser pulses comprising substantially mode-locking longitudinal modes of a laser cavity to produce laser pulses and propagating the laser pulses from the laser cavity to a fiber amplifier. The laser pulses are amplified in the fiber amplifier. Amplified spontaneous emission emitted from the fiber amplifier is received at the laser cavity. A first portion of the spontaneous emission enters the laser cavity. A second portion of the amplified spontaneous emission from the laser cavity is retro-reflected back to the fiber amplifier to cause the second portion to be directed away from the cavity toward the fiber amplifier.

Another embodiment of the present invention comprises a fiber master oscillator power amplifier comprising a mode-locked fiber oscillator and a fiber amplifier. The mode-locked fiber oscillator comprises a first portion of optical fiber and a pair of reflectors spaced apart to form a fiber optic resonator in the first fiber portion. At least one of the fiber reflectors comprises a partially transmissive fiber reflector. The mode-locked fiber oscillator outputs a plurality of optical pulses. The fiber amplifier comprises a second portion of optical fiber optically connected to the partially transmissive fiber reflector to receive the optical pulses from the mode-locked oscillator. The second portion of optical fiber has gain to amplify the optical pulses. The first portion of optical fiber, the partially transmissive fiber reflector, and the second portion of optical fiber comprise a continuous path formed by optical fiber uninterrupted by non-fiber optical components.

Another embodiment of the present invention comprises a master oscillator power amplifier comprising a mode-locked fiber oscillator and a fiber amplifier. The mode-locked fiber oscillator comprises a pair of reflective optical elements that form an optical resonator. At least one of the reflective optical elements comprises a partially transmissive Bragg fiber grating having a reflection coefficient that is less than about 60%. The mode-locked fiber oscillator outputs a plurality of optical pulses. A fiber amplifier is optically connected to the oscillator through an optical connection to the partially transmissive Bragg fiber grating.

Another embodiment of the present invention comprises a master oscillator power amplifier comprising a mode-locked fiber oscillator, a fiber amplifier, and a pump source. The mode-locked fiber oscillator comprises a pair of reflective optical elements that form an optical resonator. At least one of the reflective optical elements is partially transmissive and has a reflection coefficient that is less than about 60%. The mode-locked fiber oscillator outputs a plurality of optical pulses. A fiber amplifier is optically connected to the oscillator through an optical connection to the at least one partially transmissive reflective optical elements. The pump source is optically connected to the mode-locked fiber oscillator and the fiber amplifier to pump the mode-locked fiber oscillator and the fiber amplifier.

However, for most embodiments for a source for a regenerative amplifier the pulses need to be conditioned before amplification. Ser. No. 10/814,319 (incorporated by reference herein) addresses the utilization of modules so that the correct performance can be obtained from the femtosecond source for the seeder or a portion of the seeder for the regenerative amplifier system. Parameter controls available through these modules can be utilized for the optimization of the output from the regenerative amplifier.

One embodiment of the invention thus comprises a pulsed fiber laser outputting pulses having a duration and corresponding pulse width. The pulsed laser comprises a modelocked fiber oscillator, an amplifier, a variable attenuator, and a compressor. The modelocked fiber oscillator outputs optical pulses. The amplifier is optically connected to the modelocked fiber oscillator to receive the optical pulses. The amplifier comprises a gain medium that imparts gain to the optical pulse. The variable attenuator is disposed between the modelocked fiber oscillator and the amplifier. The variable attenuator has an adjustable transmission such that the optical energy that is coupled from the mode-locked fiber oscillator to the amplifier can be reduced. The compressor compresses the pulse thereby reducing the width of the pulse. Preferably a minimum pulse width is obtained.

Another embodiment of the invention comprises a method of producing compressed high power short laser pulses having an optical power of at least about 200 mW and a pulse duration of about 200 femtoseconds or less. In this method, longitudinal modes of a laser cavity are substantially mode-locked to repetitively produce a laser pulse. The laser pulse is amplified. The laser pulse is also chirped thereby changing the optical frequency of the optical pulse over time. The laser pulse is also compressed by propagating different optical frequency components of the laser pulse differently to produce compressed laser pulses having a shortened temporal duration. In addition, the laser pulse is selectively attenuated prior to the amplifying of the laser pulse to further shorten the duration of the compressed laser pulses.

Another embodiment of the invention comprises a method of manufacturing a high power short pulse fiber laser. This method comprises mode-locking a fiber-based oscillator that outputs optical pulses. This method further comprises optically coupling an amplifier to the fiber-based oscillator through a variable attenuator so as to feed the optical pulses from the fiber-based oscillator through the variable attenuator and to the amplifier. The variable attenuator is adjusted based on a measurement of the optical pulses to reduce the intensity of the optical pulses delivered to the amplifier and to shorten the pulse.

Another embodiment of the invention comprises a pulsed fiber laser outputting pulses having a pulse width. The pulsed fiber laser comprises a modelocked fiber oscillator, an amplifier, and a spectral filter. The modelocked fiber oscillator produces an optical output comprising a plurality of optical pulses having a pulse width and a spectral power distribution having a bandwidth. The amplifier is optically connected to the modelocked fiber amplifier for amplifying the optical pulses. The spectral filter is disposed to receive the optical output of the modelocked fiber oscillator prior to reaching the amplifier. The spectral filter has a spectral transmission with a band edge that overlaps the spectral power distribution of the optical output of the modelocked fiber oscillator to attenuate a portion of the spectral power distribution and thereby reduce the spectral bandwidth. The pulse width of the optical pulses coupled from the mode locked fiber oscillator to the fiber amplifier is thereby reduced.

Another embodiment of the invention comprises a method of producing compressed optical pulses. In this method, longitudinal modes of a fiber resonant cavity are substantially mode-locked so as to produce a train of optical pulses having a corresponding spectral power distribution with a spectral bandwidth. The optical pulses are amplified and compressed to produce compressed optical pulses. The spectral bandwidth of the spectral power distribution is reduced such that the compressed optical pulses have a shorter duration.

Another embodiment of the invention comprises a pulsed fiber laser comprising a modelocked fiber oscillator, an amplifier, one or more optical pump sources, a pulse compressor, and a pre-compressor. The modelocked fiber oscillator comprises a gain fiber and a pair of reflective optical elements disposed with respect to the gain fiber to form a resonant cavity. The modelocked fiber oscillator produces a train of optical pulses having an average pulse width. The amplifier is optically connected to the modelocked fiber amplifier such that the optical pulses can propagate through the amplifier. The fiber amplifier amplifies the optical pulses. The one or more optical pump sources are optically connected to the modelocked fiber oscillator and the fiber amplifier to pump the fiber oscillator and fiber amplifier. The pulse compressor is optically coupled to receive the amplified optical pulses output from fiber amplifier. The pulse compressor shortens the pulse width of the optical pulses output by the fiber amplifier. The pre-compressor is disposed in an optical path between the modelocked fiber oscillator and the fiber amplifier. The pre-compressor shortens the duration of the optical pulses introduced into the fiber amplifier such that the pulse duration of the optical pulses output by the compressor can be further shortened.

Another embodiment of the invention comprises a method of generating short high power optical pulses. The method comprises substantially mode-locking optical modes of a laser cavity to produce an optical signal comprising a plurality of laser pulses having an average pulse width. The optical signal comprises a distribution of frequency components. The method further comprises compressing the optical pulses and amplifying the compressed optical pulses to produce amplified compressed optical pulses. The amplified compressed optical pulses are further compressed subsequent to the amplifying using a dispersive optical element to differentiate between spectral components and introducing different phase shifts to the different spectral components.

Another embodiment of the invention comprises a pulsed fiber laser comprising a modelocked fiber oscillator, a fiber amplifier, an optical pump source, and a pulse compressor. The modelocked fiber oscillator outputs optical pulses. The fiber amplifier is optically connected to the modelocked fiber oscillator and amplifies the optical pulses. The optical pump source is optically connected to the fiber amplifier. The pulse compressor is optically coupled to receive the amplified optical pulses output from the fiber amplifier. The pulsed fiber laser further comprises at least one of (i) a first optical tap in the optical path between the modelocked fiber oscillator and the fiber amplifier and a first feedback loop from the first tap to control the modelocked fiber oscillator based on measurement of output from the first optical tap, and (ii) a second optical tap in the optical path between the fiber amplifier and the compressor and a second feedback loop from the second tap to control the fiber amplifier based on measurement of output from the first optical tap.

Another embodiment of the invention comprises a pulsed light source comprising a light source module, an isolator module, an amplifier module, and a compressor module. The light source module comprises an optical fiber and outputs optical pulses. The isolator module comprises an optical isolator in a housing having input and output fibers. The input fiber is optically coupled to the optical fiber of the light source module. The optical isolator is disposed in an optical path connecting the input and output fibers such that the optical pulses introduced into the input fiber are received by the isolator and permitted to continue along the optical path to the output coupler. The amplifier module comprises an amplifying medium and has an optical input optically connected to the output fiber of the isolator module to amplify the optical pulses. The compressor module is optically coupled to the amplifier module to compress the optical pulses.

Up to this point a mode-locked fiber laser or a bulk solid state mode-locked laser as the seed source for the fiber amplifier and regenerative amplifier has been disclosed. Other sources can also be utilized such a laser-diodes or microchip lasers. In Ser. No. 10/437,057 (incorporated by reference herein), it is disclosed how to modify these sources to give higher energy and shorter pulses through amplification and pulse compression in fiber amplifiers. An advantage of these sources that is mentioned in Ser. No. 10/437,057 is the repetition rate can be variable. It is a true advantage to match the repetition rate of the source to that of the regenerative amplifier.

Thus, one object of this invention is to convert relatively long pulses from rep-rate variable ultrafast optical sources to shorter, high-energy pulses suitable for seed sources in high-energy ultrafast lasers including a regenerative amplifier. Another object of this invention is to take advantage of the need for higher pulse energies at lower repetition rates so that such sources can be cost effective.

A gain switched laser diode as is used in telecom systems can be used as the initial source of pulses. In this case, the diode is operated at a much lower repetition rate. The pulses are still amplified in fiber amplifiers. Fiber amplifiers can be used as constant output power devices. The upper-state lifetime in typical doped amplifier fibers such as Ytterbium and Erbium is in the millisecond range so that these amplifiers can amplify pulse trains with the same efficiency at repetition rates from 10's of kHz to 100's of GHz and beyond. If the amplifier is amplifying pulses at 10 kHz rather than at 10 GHz at constant power, then the pulse energy will be six orders of magnitude higher. Again, with such high peak powers, pulse compression methods need to be different and unique. One first embodiment uses conventional compression by spectral broadening the pulses in an optical fiber with positive group velocity dispersion (GVD) and then compressing the pulse with diffraction gratings. The object of the pulse compression is to convert the 3-25 picosecond pulses from the gain switched laser diode to pulses that are subpicosecond.

Another source starts with pulses from a low cost Q-switched microchip laser. These lasers give pulses as short as 50 picoseconds but typically 250 picoseconds to 1.0 nanosecond. The pulse peak powers are typically 1-10 kW with pulse energies 6 orders of magnitude higher than from telecom laser diodes. Microchip lasers could be a very cost effective source for pulses less than 10 picoseconds with suitable pulse compression methods. Single mode fiber compression has thus far been limited to pulses shorter than 150 ps and peak powers less than 1 kW. Before compression the pulse can be further amplified in a regenerative amplifier.

Once a suitable femtosecond source has been identified further improvements have been made in the incorporation of these lasers in chirped pulse amplification systems where the amplifier has been a fiber amplifier. In Ser. No. 10/813,163, many improvements to the fiber chirped pulse amplification (FCPA) configuration have been made for a configuration that is more robust and suitable to an industrial environment. Here it has been realized that these improvements can be also utilized for fiber lasers seeding solid state amplifiers and particular solid state regenerative amplifiers. Specifically, the improvements for the FCPA configuration that are disclosed in Ser. No. 10/813,163 can be utilized in a regenerative amplifier seeded with a fiber laser configuration. The simplest embodiments are for the replacement of the power amplifier in FIGS. 1 and 11 of this application with a regenerative amplifier.

The following topics that are covered in Ser. No. 10/813, 163 are relevant to this configuration.

1) Functional segmentation of opto-mechanical components into modular devices to produce manufacturable industrial laser systems with Telcordia-grade quality and reliability.
2) Polarization fidelity within and between modules
3) Provision for tap units for test, monitoring or feedback
4) Spectral matching of oscillator to amplifier
5) Selection of the length of an amplifier to cut ASE at the lasing wavelength
6) Active stabilization of the optical performance of gain fiber in a laser or amplifier. The stabilization is realized by actively adjusting the pump source wavelength by changing the source temperature in order to match pump wavelength with the absorption spectrum of the gain medium. The temperature dependent spectrum in the gain fiber is cloned in the same type of fiber, and thus used as a monitor. Accurate control of the gain performance over a wide range of operating temperatures is possible implementing this method.
7) Extraction of one or more chirped pulses from a series of such pulses using an acousto-optic deflector, and compensation for detrimental effects on the spatial characteristics of the extracted chirped pulse, caused by dispersion in that deflector.

The invention thus relates to the technologies necessary to overcome the above problems and limitations of the prior art, to build a hybrid fiber and solid-state based chirped pulse amplification laser system suitable for industrial applications, with the fiber in a modular and compact laser design with all modules replaceable. The modules are designed and manufactured to telecom standards and quality.

Environmentally stable laser design is crucial for industrial application. An industrial laser system can be, for example, characterized by an output power variation below 0.5 dB over an environmental temperature range from 0 to 50 degrees Celsius, and by compliance with the vibration, thermal shock, high temperature storage and thermal cycling test criteria in Telcordia GR-468-CORE and GR-1221-CORE. This target can be achieved by functional segmentation of the components and packaging the modular device with Telcordia-qualified packaging technology. Before the modules are assembled into a system, they are tested and assembled separately.

Included in the modules are tap units that allow taking out signals along the propagation path in an integrated design. This is necessary for the optimization of each module as it is assembled, and important in the spectral matching along the chain of modules.

Polarization units are provided to prevent the buildup of side-pulses from orthogonal polarization light.

The acousto-optical down counter module can be designed to operate as a bandwidth filter. For further modulation of the signal an additional pulse extractor can be included near the end of the output. This unit suffers from dispersion due to the large bandwidth of the pulse. The compressor can be used to correct for this dispersion as disclosed hereafter.

The invention also relates to a means to extract one or more chirped pulses from a series of such pulses using an acousto-optic deflector, and to compensate for the detrimental effects on the spatial characteristics of the extracted chirped pulse caused by dispersion in that deflector. An important aspect of this system is to manage the spectrum of the pulse in the system while maintaining the ability to correct for dispersion and compress the pulse back to the femtosecond regime. Two principal embodiments of this type will be described. The first is the case where the spectral content of the seed pulse is small. In this case a nonlinear amplifier may be employed for the generation of additional spectrum while spectral filtering is employed to obtain a compressible pulse. The second case is where the spectrum from the source is larger than necessary. Nonlinear affects can be limited in the amplifier chain in this case, while spectral filtering is again employed to obtain a compressible pulse. An additional attribute that is necessary for many applications is the reduction of the ASE at the output. Specific amplifier designs are used to cut the ASE at the output wavelength. The compressor can be used as an optical spectral filter to this end.

Once gain performance is attained, a method for active stabilization of the optical performance of the gain fiber in a laser or amplifier is disclosed to maintain this performance. The present invention stabilizes the temperature dependent absorption of a gain fiber over a wide environmental temperature variation by an active feedback loop. A piece of fiber, optically identical with the gain fiber itself, is used as a spectral filter for monitoring the emission spectrum of the pump diode. The absorption spectrum of the filter fiber follows that of the gain fiber if both fibers are packaged so that the fibers are in proximity to each other. The transmission of the pump light through the filter fiber clones exactly the absorption characteristics of the gain fiber at a given package temperature. The temperature of the pump diode is controlled by a feedback loop such that the transmission through the filter fiber is maintained at the minimum. Importantly, the filter fiber functions as an active temperature sensor of the gain fiber. Precise spectral control of the gain at any fiber or package temperature can thus be realized.

As mentioned above, an important field of use for this system is in micromachining. An additional feature needed for this application field is the capability to start and stop the pulse stream while moving the targeted material in place. One method to do this is to control the down counter. However, this leads to problems with gain stabilization in the amplifier and excessive ASE on target. These problems have been addressed in Ser. No. 10/813,173 "Method and Apparatus for Controlling and Protecting Pulsed High Power Fiber Amplifier Systems" (incorporated by reference herein). However, another means to stop the pulse stream is to utilize an optical switch at the output.

The invention extracts one or more chirped pulses from a series of such pulses using an acousto-optic deflector, and compensates for the detrimental effects on the spatial characteristics of the extracted chirped pulse caused by dispersion in that deflector. The instant invention has the additional advantage that the means to compensate for dispersion in the acousto-optic deflector can be used to compress the duration of the chirped pulse. This is accomplished by placing the AOM in proximity to a grating compressor.

Further improvements for correction of higher order dispersion terms in fiber chirped pulse amplification systems. These can be applied to chirped pulse amplification systems with regenerative amplifiers.

Here, an ultra-compact high energy chirped pulse amplification systems based on linearly or nonlinearly chirped fiber grating pulse stretchers and photonic crystal fiber pulse compressors. Alternatively, photonic crystal fiber pulse stretchers and photonic crystal fiber compressors can also be implemented. For industrial applications the use of all-fiber chirped pulse amplification systems is preferred, relying on fiber-based pulse compressors and stretchers as well as fiber-based amplifiers.

Fiber-based high energy chirped pulse amplification systems of high utility can also be constructed from conventional optical components such as pulse stretchers based on long lengths of conventional fiber as well as bulk grating compressors. The performance of such 'conventional' chirped pulse amplification systems can be greatly enhanced by exploiting nonlinear cubicon pulse formation, i.e. by minimization of higher-order dispersion via control of self-phase modulation inside the amplifiers.

Finally, a particularly compact seed source for an Yb fiber-based chirped pulse amplification system can be constructed from an anti-Stokes frequency shifted modelocked Er fiber laser amplifier system, where a wavelength tunable output is obtained by filtering of the anti-Stokes frequency shifted output. The noise of such an anti-Stokes frequency shifted source is minimized by the amplification of positively chirped pulses in a negative dispersion fiber amplifier.

The preceding improvements have been focused on systems operating close to 1 μm. These systems appear to be the most suitable for industrial applications. However, Ti:sapphire regenerative amplifiers are presently the dominant design. Frequency doubled erbium fiber lasers are utilized for the more industrial Ti:sapphire systems. FCPA front ends are suitable for higher repetition rates utilizing an electro-optic pulse selector as is disclosed in Ser. No. 10/960,923. FCPA systems operating in the 1.5 telecomm wavelength which are then frequency doubled would be suitable for a Ti:sapphire amplifier or regenerative amplifier system.

The invention in Ser. No. 10/606,829 (incorporated by reference herein) provides an erbium fiber (or erbium-ytterbium) based chirped pulse amplification system operating at a wavelength of approximately 1550 nanometers. The use of fiber amplifiers operating in the telecommunications window enables telecommunications components and telecommunications compatible assembly procedures to be used, with superior mechanical stability It is found that electronic controls are needed for reliable operation for these complex systems. In Ser. No. 10/813,173 (incorporated by reference herein), the implementation of electronic controls are described which prevent catastrophic damage in a short pulse amplifier system as well as maintaining constant output power over the life of the system. These systems are very applicable in a regenerative amplifier system seeded by a fiber laser. The damage issues will also be a concern in a regenerative amplifier system. However, more importantly these front end systems normally will encompass nonlinear optical processes in the fiber amplifiers. These nonlinear optical processes are very dependent on laser intensity. Thus, to maintain the desired results over the life of the system, careful control of the optical powers is needed particularly in the nonlinear optical components in the system.

It is thus an object of the present invention to provide a high power fiber amplifier system with means for controlling the pump diode current and the gain of the fiber amplifier such that the output pulse energy is constant as the pulse width and repetition rate are adjusted during operation. This includes keeping the pulse energy constant during turn-on of the pulse train.

It is a further object of the invention to provide means for controlling the temperature of the fiber amplifier pump diode such that the pump diode wavelength is maintained at a fixed value with changes in diode current.

It is also an object of the invention to provide means for protecting the high power amplifier from damage due to gain buildup in excess of the damage threshold of the amplifier by monitoring the repetition rate of the injected oscillator pulses or external signal, and shutting off or reducing the pump diode current if the repetition rate falls below this threshold.

It is also an object of the invention to provide for monitoring of the amplitude of the seed pulses and to protect the high power fiber amplifier from damage by shutting off the pump diode if the amplitude of the injected pulses falls outside a safe threshold.

It is also an object of the invention to provide a high power amplifier system with means for controlling the amplitude of the seed pulse such that the output energy of the power amplifier is constant.

The above and other objects of the invention are met by providing a device and method for controlling the diode current of the pump diode in a high power fiber amplifier, the device comprising a means for setting the pump diode current or power, monitoring such current or power, and maintaining the diode current or power at a constant value. Typically the current of the diode is controlled to correct for long term decrease on its output due to aging. In contrast, in accordance with an embodiment of the present invention, the pump diode current is controlled to dynamically control the gain of the power amplifier to maintain uniform pulse energy as the repetition rate and the pulse temporal width is changed. This includes turning the pump diode on sufficiently in advance and ramping up the current to produce equal power for the first pulses when the unit is turned on.

The device also provides a means for calculating and/or storing the desired pump diode current setting as a function of system pulse width and repetition rate, such that the energy of the output pulse is maintained at a desired value as the pulse width and repetition rate are varied.

A device in accordance with an embodiment of the invention also provides a means for calculating and storing the appropriate pump diode temperature setting as a function of the pump diode current setting, such that the emission wavelength of the pump diode is maintained at a wavelength that provides maximum absorption of the pump diode energy by the fiber amplifier medium as the pump diode current is varied.

Means are also provided to monitor the repetition rate of the injected pulses into the amplifier system, to compare it to the predetermined repetition rate, and if lower than this repetition rate, to disable or reduce the current to the amplifier pump diode to prevent it from being damaged.

The exemplary device discussed above also provides a means for comparing the amplitude of the pulse being injected into the fiber amplifier with a predetermined minimum amplitude value and if lower than this predetermined minimum, a means to disable or reduce the current to the amplifier pump diode to prevent it from being damaged. A device in accordance with an embodiment of the invention also provides a means of selecting and attenuating the seed pulses such that the amplified output pulses are of uniform energy.

It is an even further object of the invention to monitor the repetition rate of the oscillator and to provide a means for calculating the required down counter divide ratio needed to obtain a lower repetition rate.

It is also an object of the invention to synchronize the oscillator with an external reference signal. It is also an object of the invention to vary this external reference in frequency, and have the oscillator repetition rate vary accordingly.

It is an even further object of the invention to vary the external reference in frequency, and have the oscillator repetition rate vary accordingly, and also have the down counted repetition rate vary accordingly. However, this variation will be of a limited range compared to an all fiber system due to the operation repetition rate of a regenerative amplifier.

Finally, these regenerative amplifier systems will be utilized in many cases for micromachining. Improvements for FPCA systems have been developed that are unique for a fiber seed source. Ser. No. 10/813,389 (incorporated by reference herein), describes the benefit for changing the pulse shapes that allow the change of the material processing properties of that laser. These methods include allowing the addition of heat by the addition of longer pulses. The physical means for changing these pulse shapes and building a all fiber chirped pulse amplification system suitable for material processing is described Ser. No. 10/813,269 (incorporated by reference herein). As is mentioned in Ser. No. 10/813,269 some of these changes in the seed source for a fiber chirped pulse amplification systems will also be suitable for regenerative amplifier systems. Herein further methods of obtaining various pulse changes are described.

The invention thus provides methods of materials processing using bursts of laser light comprised of ultrashort pulses in the femtosecond, picosecond and nanosecond ranges, wherein parameters of the pulses comprising the burst, such as pulse width, pulse separation duration, pulse energy, wavelength and polarization, are manipulated to induce desirable properties in the processed material.

While a precise and controlled removal of material is achieved using ultrashort pulses, there are situations when having a small amount of thermal effect retained by the material from the previous pulse prior to being irradiated by a subsequent ultrashort pulse is beneficial. In addition, it is well known that the properties of most materials have some dependence on temperature. For example, the absorption of light by silicon is very dependent on temperature. Hence, heating such a target material can help initiate the ablation process at lower threshold fluence and may produce a smoother surface. In general, the thermal and physical effect or any change in structure caused by the prior pulse influences the laser matter interaction with the next pulse.

The ablation threshold energy density, as a function of pulse width, can vary significantly from the square root of t as pulse widths enter the femtosecond range. These ultrashort pulses can be used to micro-machine cleanly without causing significant heat. These ultrashort pulses also have deterministic thresholds compared to the statistical thresholds of longer pulses.

The present invention may be used in micro-machining with bursts of pulses having pulse shapes that cannot be quantified by a single pulse width in order to describe their micro-machining properties. For example, a burst comprises a 100 femtosecond pulse and a one nanosecond pulse, where the one nanosecond pulse contains ninety percent of the energy and the 100 femtosecond pulse contains ten percent of the energy. The threshold for ablation of gold is a little over 0.3 J/cm² for the 100 femtosecond pulse and 3.0 J/cm² for the one nanosecond pulse. Thus, if the burst is focused to output 0.3 J/cm², then ablation will occur during the 100 femtosecond pulse, and not during the one nanosecond pulse. If the one nanosecond pulse impinges upon the surface first, it will have no affect while the 100 femtosecond pulse will ablate. Thus, the one nanosecond predominant pulse will not leave a heat affected zone. However, if the 100 femtosecond pulse is right before the one nanosecond pulse, then the 100 femtosecond pulse will change the absorption properties of the material so the one nanosecond pulse will also interact with the material. In this case, the ablation process would be predominantly heat related. If the one nanosecond pulse is increased to 100 nanoseconds, then the pulse energy content in the long pulse can be increased by ten-fold but the threshold is still determined by the ultrashort pulse and remains fixed even with one percent of the total energy in the ultrafast pulse.

Thus, in one embodiment of the present invention, the long pulse is before the ultrafast pulse if the pulse repetition rate is substantially greater than or equal 100 kilohertz. In another embodiment of the present invention, a portion of the long pulse follows after the ultrafast pulse, and adding a pedestal on the short pulse can create the long pulse. Micro-machining can be accomplished with an ultrashort pulse, where substantial energy is in a long pulse pedestal (>ten picoseconds) and where the long pulse pedestal adds a thermal machining mechanism.

The present invention can perform laser machining on material using a burst of ultrashort laser pulses and tailors the pulse width, pulse separation duration, wavelength and polarization to maximize the positive effect of thermal and physical changes achieved by the previous pulse on the laser matter interaction in a burst-machining mode. Better processing results can be achieved by manipulating the pulse width, the pulse separation duration and the pulse energies of pulses within a burst. The wavelength and polarization of a laser beam also strongly affect the absorption of the laser beam, and have to be varied pulse-to-pulse in a burst in order to produce maximum laser-matter interaction.

Besides the methods of manipulating laser beam parameters described above to achieve desired results, the present invention also includes methods to achieve the thermal and physical enhancement of a material during laser processing. In an embodiment of the present invention, the background light (commonly referred to as Amplified Spontaneous Emission (ASE)) is controlled to provide a constant source of energy for achieving thermal and physical changes to enhance the machining by individual ultrashort pulses. ASE is often emitted simultaneously and co-linearly with the ultrashort pulse from an amplified fiber laser. There are a number of ways to change the ASE ratio in the laser. Examples are changing the ultrashort pulse input energy into the amplifier, changing its center wavelength or changing the diode pump power to the amplifier. Another means more variable is within the compressor of the laser. As disclosed in application Ser. No. 10/813,163 the spectral output of the ASE can be designed to be at a different wavelength then that of the ultrashort pulse. Thus, in the compressor, where the spectral components are physically separated, a component can be placed to block or partially block the ASE, as disclosed in application Ser. No. 10/813,163. The ratio between the ASE and the ultrashort pulse energy can be controlled to vary the amount of preheating applied to the target material. In another embodiment of the invention, a pedestal of an ultrashort pulse is controlled. The pedestal is similar to a superimposed long-pulse with lower amplitude.

The invention is based on the interaction with a material of laser pulses of different pulse widths, pulse separation duration, energy, wavelength and polarization in a burst mode. The positive aspects of pulses having different pulse widths, pulse separation duration, energies, wavelengths and polarization are utilized, and a negative aspect of one pulse complements a positive aspect of another pulse. The coupling of laser energy during interaction of successive laser pulses with a material induces various thermal, physical and chemical couplings. The induced coupling involves microscopic change of electronic structure, phase transition, structural disintegration and/or other physical changes. For example, pulses with different pulse widths in a burst induce coupling that is different from a burst having pulses with the same pulse width.

An aspect of the invention provides a method of materials processing using laser light. The method comprises applying bursts of laser light to a target area of a material at a predetermined repetition rate. Preferably, the burst repetition rate is large enough for multipulse pulses generated within the round trip time of the regenerative amplifier, although lower repetition rates can be used. The burst of laser light comprises a first pulse and a second pulse of laser light displaced in time, although more pulses could be used in the burst as necessary. The first pulse has a first pulse width and the second pulse has a second pulse width, and predetermined parameters of the first pulse are selected to induce a change in a selected property of the processed material. The second pulse has a second pulse width, and predetermined parameters of the second pulse are selected based upon the property change induced by the first pulse. The first pulse width is generally in the nanosecond range, and the second pulse width is generally in the picosecond to femtosecond range. However, as stated previously it can be reversed. Predetermined parameters include pulse energy, pulse wavelength, pulse separation duration and pulse polarization vector. These parameters of the first and second pulses are controlled as well to machine the target area of the processed material.

A still further aspect of the present invention provides a method of materials processing that is similar to the previous aspect, except that the first and second pulses of the burst of laser light are overlapped in time, instead of being displaced in time. More pulses could be used in the burst as necessary. The first pulse has a first pulse width and the second pulse has a second pulse width, and the first pulse width can be greater than the second pulse width. The first pulse has a first pulse width and predetermined parameters of the first pulse are selected to induce a change in a selected property of the processed material. The second pulse has a second pulse width, and predetermined parameters of the second pulse are selected on based upon the property change induced by the first pulse. The first pulse width is generally in the nanosecond range, and the second pulse width is generally in the picosecond to femtosecond range. Predetermined parameters include pulse energy, pulse wavelength, pulse separation duration and pulse polarization vector which are controlled as well to machine the target area of the processed material. In addition, the second pulse may include a pedestal to facilitate thermally heating the processed material.

In yet another aspect of the present invention, an apparatus for generating optical pulses, wherein each pulse may have individualized characteristics, is provided. The apparatus comprises a laser means for generating the bursts of pulses, a control means that controls the laser means and a beam manipulation means for monitoring the pulse width, wavelength, repetition rate, polarization and/or temporal delay characteristics of the pulses comprising the pulse bursts. The apparatus generates feedback data based on the measured pulse width, wavelength, repetition rate, polarization and/or temporal delay characteristics for the control means. In one embodiment of the present invention, the laser means may comprise a fiber amplifier that uses stretcher gratings and compressor gratings. The beam manipulation means can comprise a variety of devices, e.g., an optical gating device that measures the pulse duration of the laser pulses, a power meter that measures the power of the laser pulses output from the laser means or a photodiode that measures a repetition rate of the laser pulses. Another beam manipulation means optically converts the fundamental frequency of a percentage of the generated laser pulses to one or more other optical frequencies, and includes at least one optical member that converts a portion of the fundamental of the laser pulses into at least one higher order harmonic signal. The optical member device may comprise a non-linear crystal device with a controller that controls the crystal's orientation. Preferably, the means for converting an optical frequency includes a spectrometer that measures predetermined parameters of pulses output from the non-linear crystal device and generates feedback for the control means.

BRIEF DESCRIPTION OF THE DRAWINGS

The accompanying drawings, which are incorporated in and constitute a part of this specification illustrate embodiments of the invention and, together with the description, serve to explain the aspects, advantages and principles of the invention. In the drawings.

DETAILED DESCRIPTION OF THE INVENTION

Figure 1:
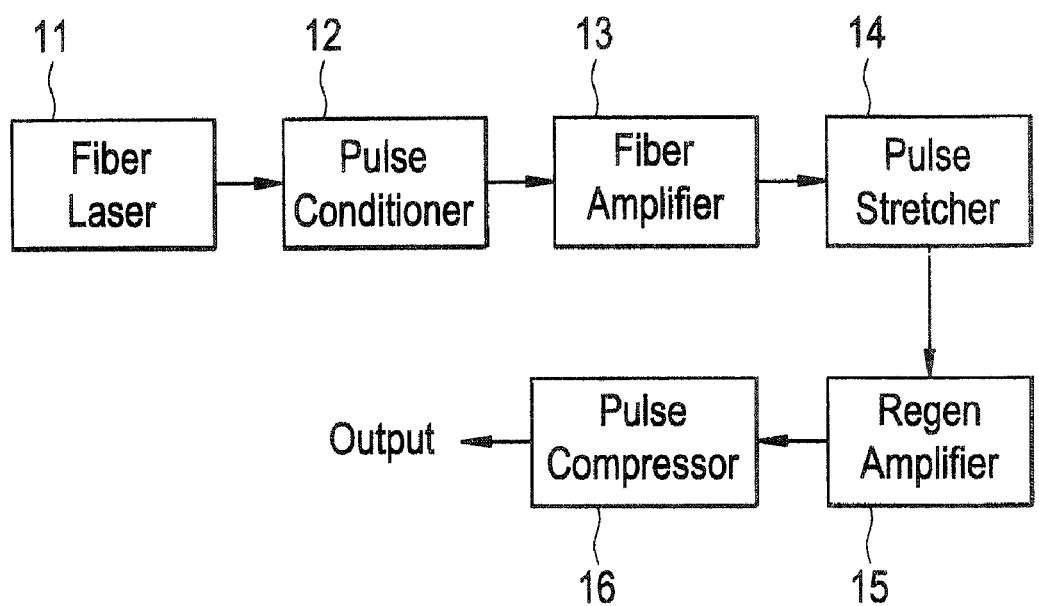
FIG. 1 is a block diagram showing the basic components of the present invention.

A generalized illustration of the system of the invention is shown in FIG. 1. The pulses are generated in a short pulse source. 11. These are coupled into a pulse conditioner 12 for spectral narrowing, broadening or shaping, wavelength converting, temporal pulse compression or stretching, pulse attenuation and/or lowering the repetition rate of the pulse train. The pulses are subsequently coupled into an Yb: or Nd: fiber amplifier 13. Pulse stretcher 14 provides further pulse stretching before the amplification in the regenerative amplifier 15 that is based on an Nd: or Yb: doped solid-state laser material. The compressor 16 compresses the pulse back to near transform limit. The six basic subsystems described here are each subject to various implementations, as is described in the subsequent embodiments.

Figure 2:
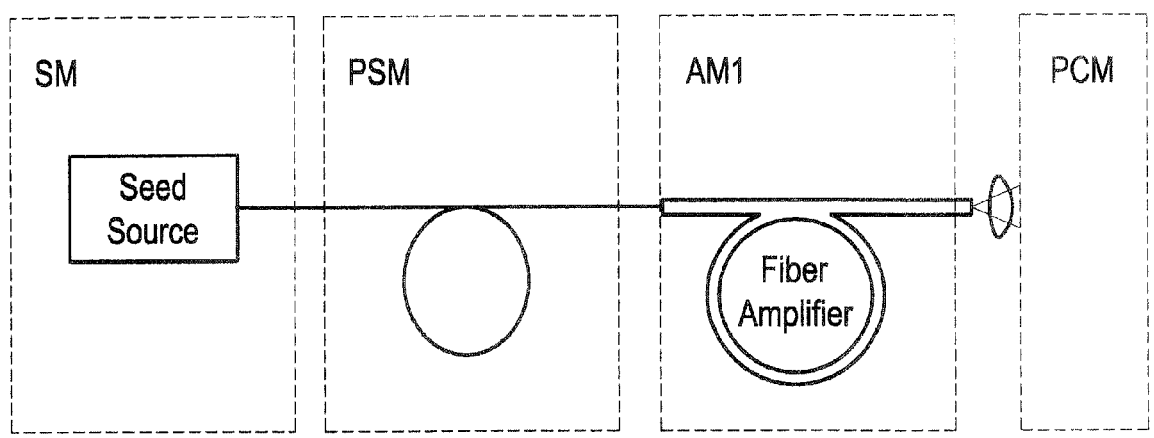
FIG. 2 is an illustration of a modular, compact, tunable system for generating high peak and high average power ultrashort laser pulses in accordance with the present invention.

A generalized illustration of one embodiment of the short pulse source 11 is shown in FIG. 2. The pulses generated in a laser seed source 1 (seed module; SM) are coupled into a pulse stretcher module 2 (PSM), where they are dispersively stretched in time. The stretched pulses are subsequently coupled into the fundamental mode of a cladding-pumped Yb fiber amplifier 3 (amplifier module, AM1), where the pulses are amplified by at least a factor of 10. Finally, the pulses are coupled into a pulse compressor module 4 (PCM), where they are temporally compressed back to approximately the bandwidth limit.

The embodiment shown in FIG. 2 is modular and four sub-systems; the SM 1, PSM 2, AM1 3 and PCM 4. The sub-systems can be used independently as well as in different configurations, as described in the alternative embodiments.

In the following, discussion is restricted to the SM-PSM-AM1-PCM system. The SM 1 preferably comprises a femtosecond pulse source (seed source 5). The PSM preferably comprises a length of fiber 6, where coupling between the SM and the PSM is preferably obtained by fusion splicing. The output of the PSM is preferably injected into the fundamental mode of the Yb amplifier 7 inside the AM1 module 3. Coupling can be performed by fusion splicing, a fiber coupler or a bulk-optic imaging system between PSM 2 and the fiber amplifier 7. All fibers are preferably selected to be polarization maintaining The PCM 4 is preferably a dispersive delay line constructed from one or two bulk optic diffraction gratings for reasons of compactness. Alternatively, a number of bulk optic prisms and Bragg gratings can be used inside the PCM 4. Coupling to the PCM 4 can be performed by a bulk optic lens system as represented by the single lens 8 in FIG. 2. In the case of a PCM that contains fiber Bragg gratings, a fiber pig-tail can be used for coupling to the PCM.

Figure 3:
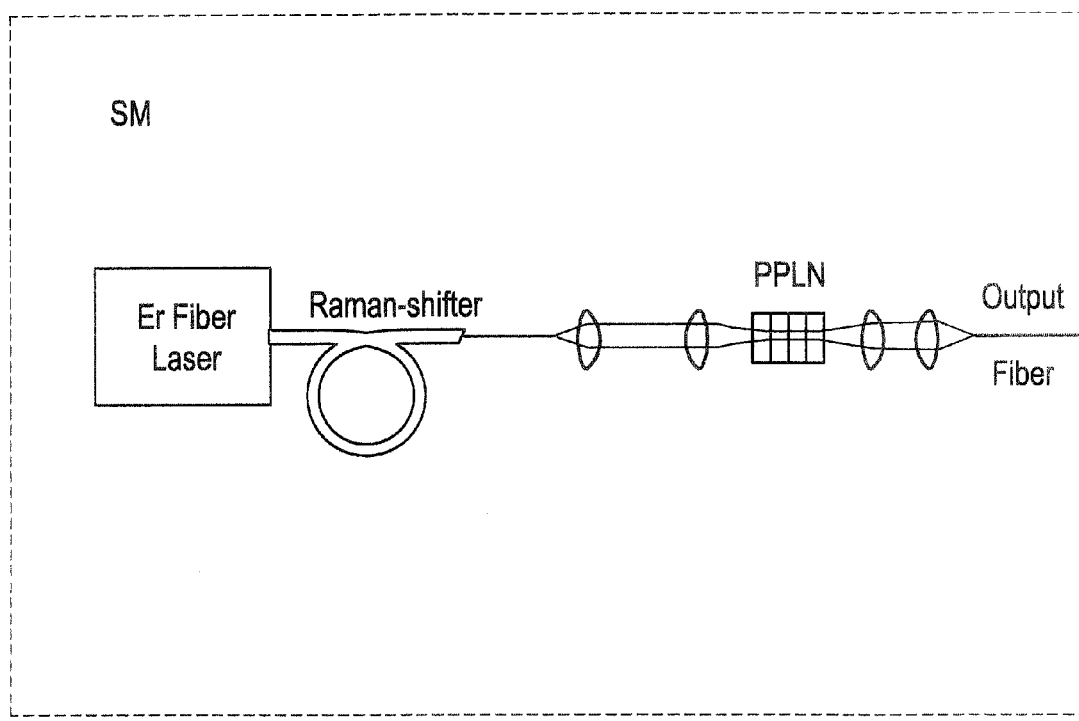
FIG. 3 is an illustration of an embodiment of a Seed Module (SM) for use in the present invention.

As an example of a femtosecond laser seed source, a Raman-shifted, frequency-doubled Er fiber laser is shown within an SM 1b in FIG. 3. The femtosecond fiber laser 9 can be a commercial high energy soliton source (IMRA America, Inc., Femtolite B60™) delivering ≈200 fs pulses at a wavelength of 1.57 µm and a pulse energy of 1 nJ at a repetition rate of 50 MHz.

For optimum Raman-shifting from 1.5 µm to the 2.1 µm wavelength region, a reduction in the core diameter (tapering) along the length of the polarization maintaining Raman-shifting fiber 10 is introduced. A reduction of the core diameter is required to keep the 2nd order dispersion in the Raman-shifter close to zero (but negative) in the whole wavelength range from 1.5 to 2.1 µm. By keeping the absolute value of the 2nd order dispersion small, the pulse width inside the Raman shifter is minimized, which leads to a maximization of the Raman frequency shift (J. P. Gordon, "Theory of the Soliton Self-frequency Shift," Opt. Lett., 11, 662 (1986)). Without tapering, the Raman frequency-shift is typically limited to around 2.00 µm, which even after frequency-doubling is not compatible with the gain bandwidth of Yb fiber amplifiers.

In this particular example, a two-stage Raman shifter 10 consisting of 30 and 3 m lengths of silica 'Raman' fiber (single-mode at 1.56 µm) with core diameters of 6 and 4 µm respectively, was implemented. Due to the onset of the infrared absorption edge of silica at 2.0 µm, it is beneficial to increase the rate of tapering towards the end of the Raman shifter 10. In the present example, conversion efficiencies up to 25% from 1.57 µm to 2.10 µm were obtained. Even better conversion efficiencies can be obtained by using a larger number of fibers with smoothly varying core diameter, or by implementing a single tapered fiber with smoothly varying core diameter.

Frequency-conversion of the Raman-shifted pulses to the 1.05 µm region can be performed by a length of periodically poled LiNbO3 (PPLN) crystal 11 with an appropriately selected poling period. (Although throughout this specification, the preferable material for frequency conversion is indicated as PPLN, it should be understood that other periodically-poled ferroelectric optical materials such as PP lithium tantalate, PP MgO:LiNbO$_3$, PP KTP, or other periodically poled crystals of the KTP isomorph family can also be advantageously used.) Coupling with the PPLN crystal 11 occurs through the use of a lens system, represented in FIG. 3 by lenses 12. The output of the PPLN crystal 11 is coupled by lenses 12 into output fiber 13. Conversion efficiencies as high as 16% can so be obtained for frequency-doubling of 2.1 µm resulting in a pulse energy up to 40 pJ in the 1 µm wavelength region. The spectral width of the frequency-converted pulses can be selected by an appropriate choice of the length of the PPLN crystal 11; for example a 13 mm long PPLN crystal produces a bandwidth of 2 nm in the 1.05 µm region corresponding to a pulse width of around 800 fs. The generated pulse width is approximately proportional to the PPLN crystal length, i.e., a frequency converted pulse with a 400 fs pulse width requires a PPLN length of 6.5 mm. This pulse width scaling can be continued until the frequency-converted pulse width reaches around 100 fs, where the limited pulse width of 100 fs of the Raman-shifted pulses limits further pulse width reduction.

In addition, when the frequency-converted pulse width is substantially longer than the pulse width of the Raman-shifted pulses, the wide bandwidth of the Raman-pulses can be exploited to allow for wavelength-tuning of the frequency-converted pulses, i.e., efficient frequency conversion can be obtained for pulses ranging in frequency from $2(\omega_1-\delta\omega)$ to $2(\omega_1+\delta\omega)$, where $2\delta\omega$ is the spectral width at half maximum of the spectrum of the Raman-shifted pulses. Continuous wavelength tuning here is simply performed by tuning the temperature of the frequency-conversion crystal 11.

The amplified noise of the Raman-shifter, PPLN-crystal combination is minimized as follows. Self-limiting Raman-shifting of the Er fiber laser pulse source can be used by extending the Raman shift out to larger than 2 µm in silica-based optical fiber. For wavelengths longer than 2 µm, the infrared absorption edge of silica starts to significantly attenuate the pulses, leading to a limitation of the Raman shift and a reduction in amplitude fluctuations, i.e., any increase in pulse energy at 1.5 µm tends to translate to a larger Raman-shift and thus to a greater absorption in the 2 µm wavelength region, which thus stabilizes the amplitude of the Raman-shifted pulses in this region.

Alternatively, the noise of the nonlinear frequency conversion process can be minimized by implementing self-limiting frequency-doubling, where the center wavelength of the tuning curve of the doubling crystal is shorter than the center wavelength of the Raman-shifted pulses. Again, any increase in pulse energy in the 1.5 µm region translates into a larger Raman-shift, producing a reduced frequency conversion efficiency, and thus the amplitude of the frequency-doubled pulses is stabilized. Therefore a constant frequency-converted power can be obtained for a large variation in input power.

Figure 4:
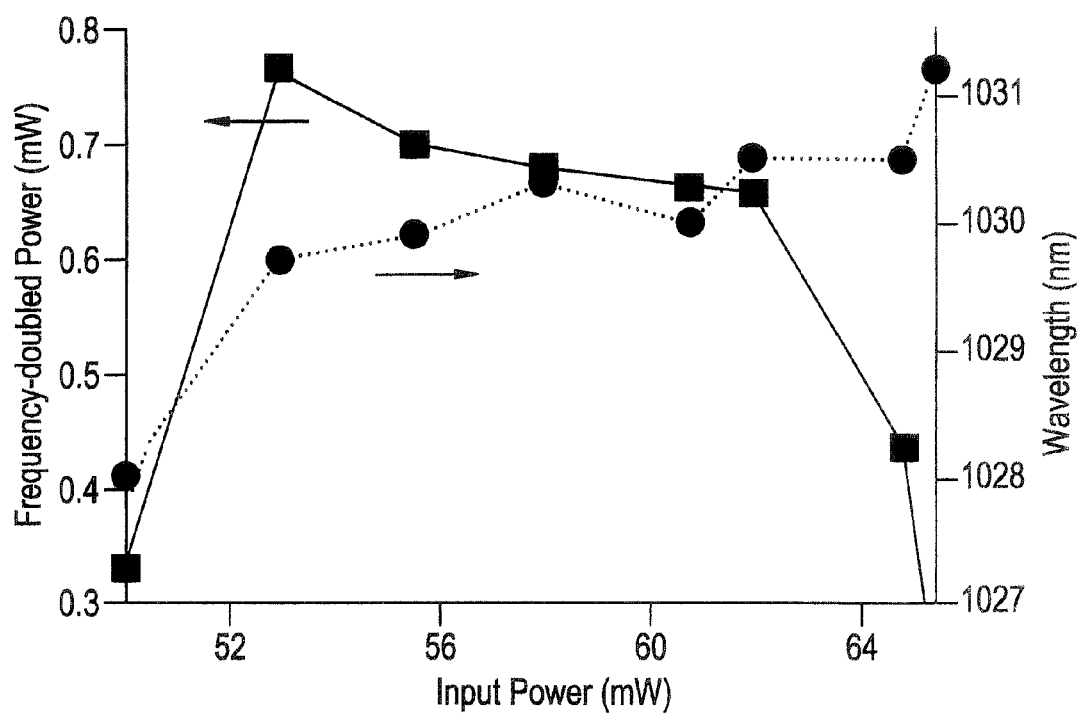
FIG. 4 is a diagram graphically illustrating the relationship between the average frequency-doubled power and wavelength which are output at a given range of input power according to one embodiment of the present invention.

This is illustrated in FIG. 4, where the average frequency-converted power in the 1 µm wavelength region as a function of average input power at 1.56 µm is shown. Self-limiting frequency-doubling also ensures that the frequency-shifted wavelength in the 1 µm wavelength region is independent of average input power in the 1.56 µm wavelength region, as also demonstrated in FIG. 4.

Figure 5:
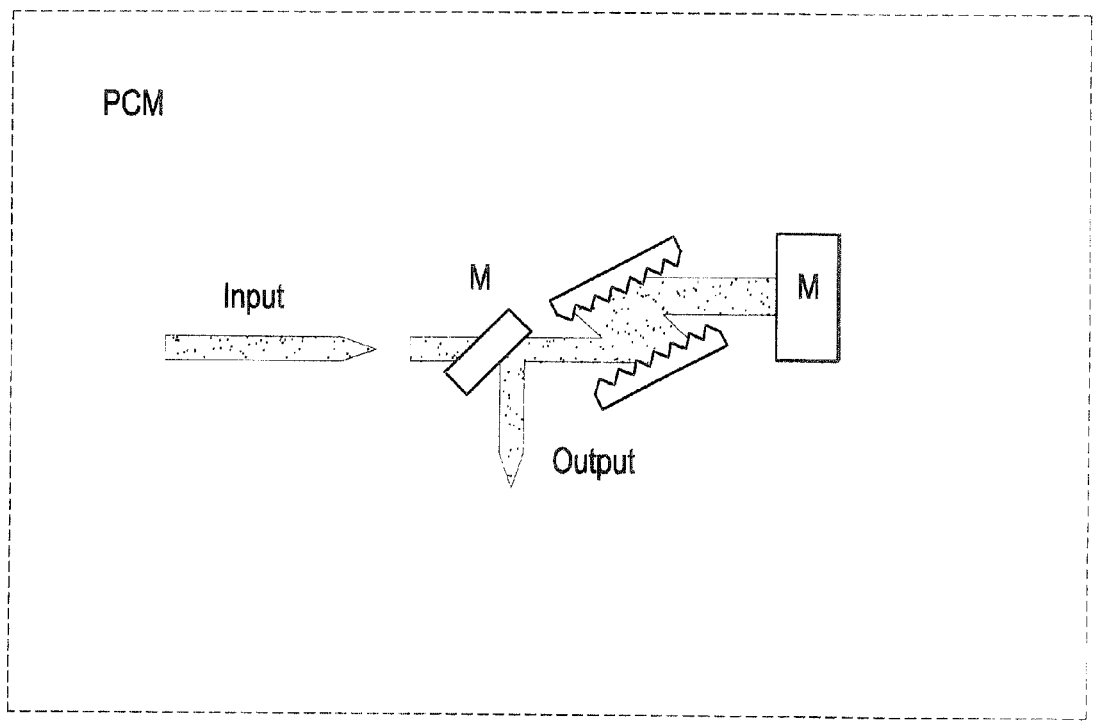
FIG. 5 is an illustration of an embodiment of a Pulse Compressor Module (PCM) for use with the present invention.

Several options exist for the PSM 2. When a length of fiber 6 (stretching fiber) is used as a PSM as shown in FIG. 2, an appropriate dispersive delay line can then be used in the PCM 4 to obtain near bandwidth-limited pulses from the system. However, when the dispersive delay line in the PCM 4 consists of bulk diffraction gratings 14 as shown in FIG. 5, a possible problem arises. The ratio of $|3^{rd}/2^{nd}|$-order dispersion is typically 1-30 times larger in diffraction grating based dispersive delay lines compared to the ratio of $|3^{rd}/2^{nd}|$-order dispersion in typical step-index optical fibers operating in the 1 µm wavelength region. Moreover, for standard step-index fibers with low numerical apertures operating in the 1 µm wavelength regime, the sign of the third-order dispersion in the fiber is the same as in a grating based dispersive delay line. Thus a fiber stretcher in conjunction with a grating-based stretcher does not typically provide for the compensation of $3^{rd}$- and higher-order dispersion in the system.

For pulse stretching by more than a factor of 10, the control of third-order and higher-order dispersion becomes important for optimal pulse compression in the PCM 4. To overcome this problem, the stretcher fiber 6 in the PSM 2 can be replaced with a length of fibers with W-style multi-clad refractive index profiles, i.e., 'W-fibers' (B. J. Ainslie et al.) or holey fibers (T. M. Monroe et al., 'Holey Optical Fibers' An Efficient Modal Model, J. Lightw. Techn., vol. 17, no. 6, pp. 1093-1102). Both W-fibers and holey fibers allow adjustable values of 2nd, 3rd and higher-order dispersion. Due to the small core size possible in W and holey fibers, larger values of 3rd order dispersion than in standard single-mode fibers can be obtained. The implementation is similar to the one shown in FIG. 1 and is not separately displayed. The advantage of such systems is that the PSM can work purely in transmission, i.e., it avoids the use of dispersive Bragg gratings operating in reflection, and can be spliced into and out of the system for different system configurations.

Figure 6:
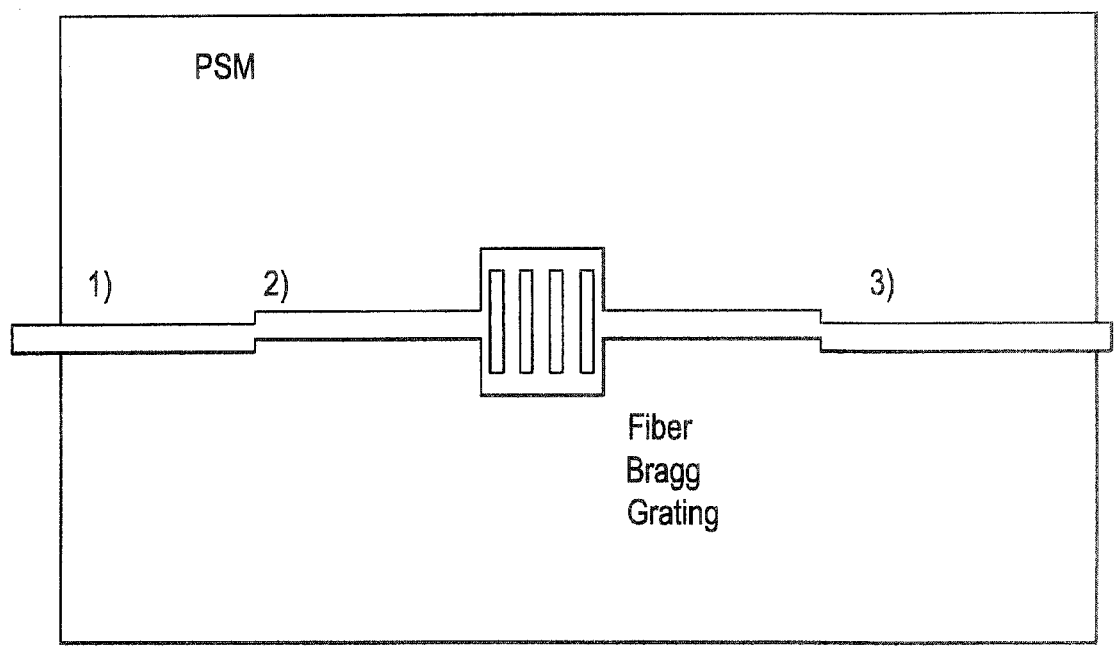
FIG. 6 is an illustration of an embodiment of a Pulse Stretcher Module (PSM) for use with the present invention.

An alternative PSM 2 with adjustable values of $2^{nd}$, $3^{rd}$ and $4^{th}$ order dispersion is shown in FIG. 6. The PSM 20a is based on the principle that conventional step-index optical fibers can produce either positive, zero or negative 3rd order dispersion. The highest amount of 3rd order dispersion in a fiber is produced by using its first higher-order mode, the $LP_{11}$ mode near cut-off. In FIG. 6, the $4^{th}$ and $3^{rd}$ order dispersion of the PSM 20a is adjusted by using three sections 15, 16, 17 of pulse stretching fiber. The 1st stretcher fiber 15 can be a length of fiber with zero 3rd-order and appropriate $4^{th}$-order dispersion. The 1st stretcher fiber 15 is then spliced to the $2^{nd}$ stretcher fiber 16, which is selected to compensate for the $3^{rd}$-order dispersion of the grating compressor as well as the whole chirped-pulse amplification system. To take advantage of the high $3^{rd}$-order dispersion of the $LP_{11}$ mode the 1st stretcher fiber 15 is spliced to the $2^{nd}$ stretcher fiber 16 with an offset in their respective fiber centers, leading to a predominant excitation of the $LP_{11}$ mode in the 2nd stretcher fiber 16. To maximize the amount of 3rd-order dispersion in the 2nd stretcher fiber 16, a fiber with a high numerical aperture NA>0.20 is preferred. At the end of the 2nd stretcher fiber 16, a similar splicing technique is used to transfer the $LP_{11}$ mode back to the fundamental mode of the $3^{rd}$ stretcher fiber 17. By an appropriate choice of fibers, the 4th-order dispersion of the whole amplifier compressor can be minimized. The $3^{rd}$ stretcher fiber 17 can be short with negligible dispersion.

The transfer loss of the whole fiber stretcher assembly is at least 25% due to the unavoidable 50% or greater loss incurred by transferring power from the $LP_{11}$ mode to the $LP_{01}$ mode without the use of optical mode-converters. Any residual energy in the $LP_{01}$ mode in the 2nd stretcher fiber can be reflected with an optional reflective fiber grating 18 as shown in FIG. 6. Due to the large difference in effective index between the fundamental and the next higher-order mode, the grating resonance wavelength varies between 10-40 nm between the two modes, allowing for selective rejection of one mode versus the other for pulses with spectral widths between 10-40 nm.

The energy loss of the fiber stretcher assembly can be made to be insignificant by turning the $3^{rd}$ stretcher fiber 17 into an Yb amplifier. This implementation is not separately shown.

When 4th-order dispersion is not significant, the 1st stretcher fiber 15 can be omitted. $4^{th}$ order dispersion can also be compensated by using a 1st stretcher fiber with non-zero $3^{rd}$ order dispersion, as long as the ratio of $3^{rd}$ and $4^{th}$ order dispersion is different between the $1^{st}$ and $2^{nd}$ stretcher fiber.

The Yb-doped fiber inside the AM1 3 can have an Yb doping level of 2.5 mole % and a length of 5 m. Both single-mode and multi-mode Yb-doped fiber can be used, where the core diameter of the fiber can vary between 1-50 µm; though the fundamental mode should be excited in case of a MM fiber to optimize the spatial quality of the output beam. Depending on the amount of required gain, different lengths of Yb-doped fiber can be used. To generate the highest possible pulse energies, Yb fiber lengths as short as 1 m can be implemented.

Pulse compression is performed in the PCM 4. The PCM 4 can contain conventional bulk optic components (such as the bulk diffraction grating pair shown in FIG. 5), a single grating compressor, or a number of dispersive prisms or grisms or any other dispersive delay line.

Alternatively, a fiber or bulk Bragg grating can be used, or a chirped periodically poled crystal. The chirped periodically poled crystal combines the functions of pulse compression and frequency doubling (A. Galvanauskas, et al., 'Use of chirped quasi-phase matched materials in chirped pulse amplification systems,' U.S. application Ser. No. 08/822,967, the contents of which are hereby incorporated herein by reference) and operates in transmission providing for a uniquely compact system.

Other modifications and variations to the invention will be apparent to those skilled in the art from the foregoing disclosure and teachings.

In particular, the SM 1 can be used as a stand-alone unit to produce near bandwidth limited femtosecond pulses in the frequency range from 1.52-2.2 µm, and after frequency conversion in a nonlinear crystal also in the frequency range from 760 nm to 1.1 µm. The frequency range can be further extended by using a fluoride Raman-shifting fiber or other optical fibers with infrared absorption edges longer than silica. Using this technique wavelengths up to around 3-5 µm can be reached. In conjunction with frequency-doubling, continuous tuning from 760 nm to 5000 nm can be achieved. The pulse power in the 2 µm region can be further enhanced by using Tm or Ho-doped fiber. With such amplifiers, near bandwidth-limited Raman-soliton pulses with pulse energies exceeding 10 nJ can be reached in single-mode fibers in the 2 µm wavelength region. After frequency-doubling, femtosecond pulses with energies of several nJ can be obtained in the 1 µm region without the use of any dispersive pulse compressors. Such pulses can be used as high energy seed pulses for large-core multi-mode Yb amplifiers, which require higher seed pulse energies than single-mode Yb amplifiers to suppress amplified spontaneous emission.

Figure 7:
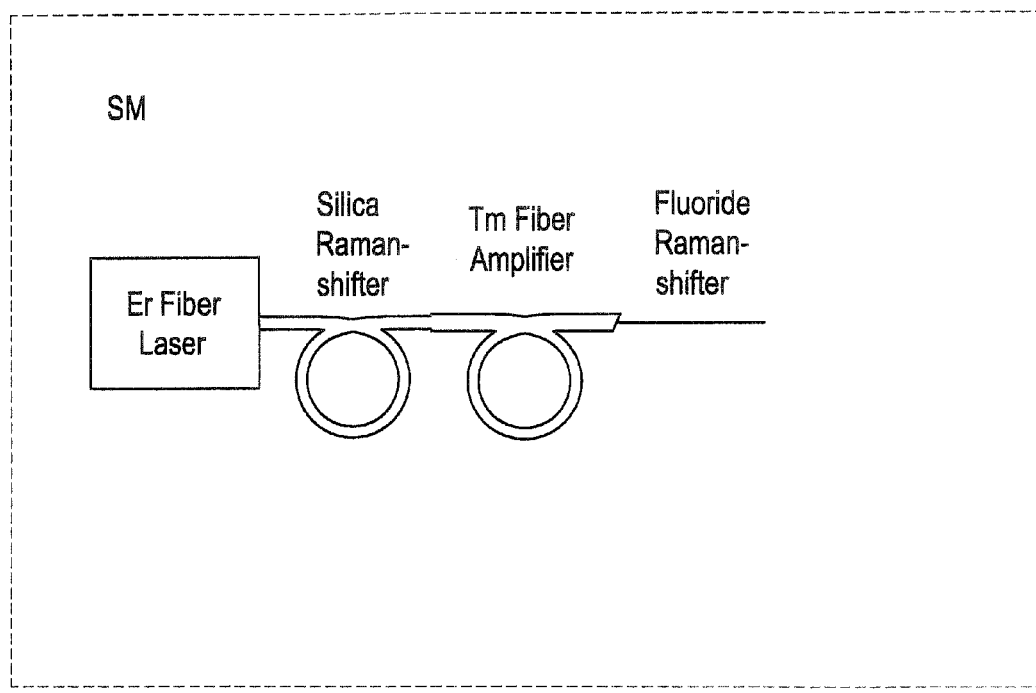
FIG. 7 is an illustration of a second embodiment of a Seed Module (SM) for use with the present invention.

An example of an ultra-wide tunable fiber source combining an Er-fiber laser pulse source 19 with a silica Raman-shifter 20, a Tm-doped amplifier 21 and a $2^{nd}$ fluoride glass based Raman shifter 22 is shown in the SM 1c of FIG. 7. An optional frequency-doubler is not shown for converting into the 900 nm to 1050 nm range. This would be a means for obtaining a high power source in this range. For optimum stability all fibers should be polarization maintaining. As another alternative to the Er-fiber laser pulse source a combination of a diode-laser pulse source with an Er-amplifier can be used; this is not separately shown.

Figure 8:
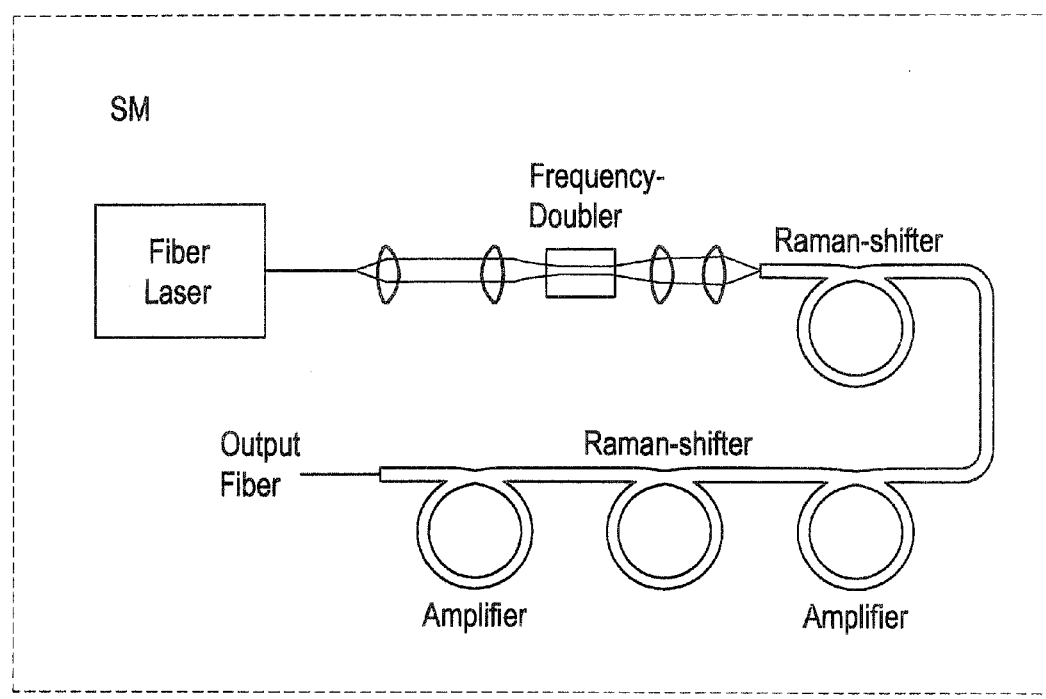
FIG. 8 is an illustration of a third embodiment of a Seed Module (SM) for use with the present invention.

As yet another alternative for a SM, SM 1d is shown in FIG. 8, and contains a frequency-doubled high-power passively mode-locked Er or Er/Yb-fiber oscillator 23 in conjunction with a length of Raman-shifting holey fiber 24. Here the pulses from the oscillator 23 operating in the 1.55 µm wavelength region are first frequency-doubled using frequency doubler 25 and lens system 26, and subsequently the frequency-doubled pulses are Raman-shifted in a length of holey fiber 24 that provides soliton supporting dispersion for wavelengths longer than 750 nm or at least longer than 810 nm. By amplifying the Raman-shifted pulses in the 1 µm wavelength regime or in the 1.3, 1.5, or 2 µm wavelength regime and by selecting different designs of Raman-shifting fibers, a continuously tunable source operating in the wavelength region from around 750 nm to 5000 nm can be constructed. The design of such a source with a number of attached amplifiers 27 is also shown in FIG. 8.

For optimum Raman self-frequency shift, the holey fiber dispersion should be optimized as a function of wavelength. The absolute value of the 3rd order dispersion of the holey fiber should be less than or equal to the absolute value of the 3rd order material dispersion of silica. This will help ensure that the absolute value of the 2nd order dispersion remains small over a substantial portion of the wavelength tuning range. Moreover the value of the 2nd order dispersion should be negative, and a 2nd order dispersion zero should be within 300 nm in wavelength to the seed input wavelength.

As yet another alternative for a seed source for an Yb amplifier, anti-Stokes generation in a length of anti-Stokes fiber can be used. After anti-Stokes generation, additional lengths of fiber amplifiers and Raman-shifters can be used to construct a widely wavelength-tunable source. A generic configuration is similar to the one shown in FIG. 8, where the frequency-doubling means 25 are omitted and the Raman-shifter means 24 are replaced with an anti-Stokes generation means. For example, to effectively generate light in the 1.05 µm wavelength regime in an anti-Stokes generation means using an Er fiber laser seed source operating at 1.55 µm, an anti-Stokes generation means in the form of an optical fiber with small core diameter and a low value of $3^{rd}$ order dispersion is optimum. A low value of $3^{rd}$ order dispersion is here defined as a value of $3^{rd}$ order dispersion smaller in comparison to the value of $3^{rd}$ order dispersion in a standard telecommunication fiber for the 1.55 wavelength region. Moreover, the value of the $2^{nd}$ order dispersion in the anti-Stokes fiber should be negative.

Figure 9:
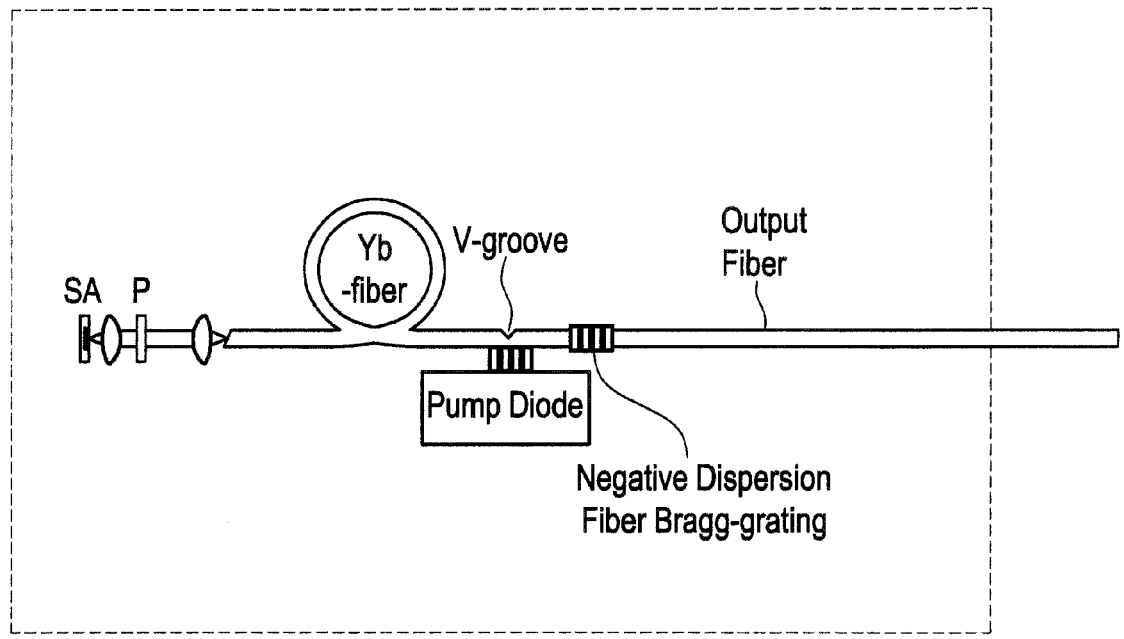
FIG. 9 is an illustration of a fourth embodiment of a Seed Module (SM) for use with the present invention.

As yet another alternative seed-source for an Yb amplifier, a passively modelocked Yb or Nd fiber laser can be used inside the SM. Preferably an Yb soliton oscillator operating in the negative dispersion regime can be used. To construct an Yb soliton oscillator, negative cavity dispersion can be introduced into the cavity by an appropriately chirped fiber grating 29, which is connected to output fiber 36 as shown in FIG. 9; alternatively, negative dispersion fiber such as holey fiber (T. Monroe et al.) can be used in the Yb soliton laser cavity. A SM incorporating such an arrangement is shown as SM 1e in FIG. 9. Here the Yb fiber 30 can be polarization maintaining and a polarizer 31 can be incorporated to select oscillation along one axis of the fiber (coupling being accomplished with lenses 32). For simplicity, the Yb fiber 30 can be cladding pumped from the side as shown in FIG. 9. However, a passively modelocked Yb fiber laser incorporating conventional single-mode fiber with conventional pumping through a WDM can also be used. Such an arrangement is not separately shown. In FIG. 9, SA 28 is used to induce the formation of short optical pulses. The grating 35 is used for dispersive control, and as an intra-cavity mirror. The pump diode 33 delivers pump light through V-groove 34.

An arrangement incorporating a holey fiber can be nearly identical to the system displayed in FIG. 9, where an additional length of holey fiber is spliced anywhere into the cavity. In the case of incorporating a holey fiber, the fiber Bragg grating does not need to have negative dispersion; equally the Bragg grating can be replaced with a dielectric mirror.

Figure 10:
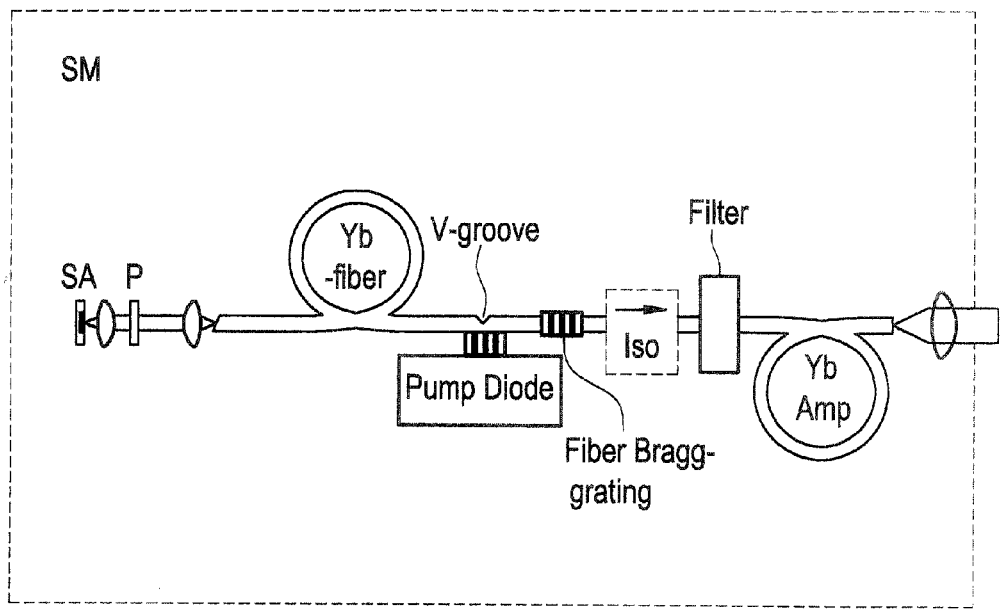
FIG. 10 is an illustration of a fifth embodiment of a Seed Module (SM) for use with the present invention.

Most straight-forward to implement, however, is an Yb oscillator operating in the positive dispersion regime, which does not require any special cavity components such as negative dispersion fiber Bragg gratings or holey fiber to control the cavity dispersion. In conjunction with a 'parabolic' Yb amplifier (or ordinary Yb amplifier), a very compact seed source for a high-power Yb amplifier system can be obtained. Such a Yb oscillator with an Yb amplifier 40 is shown in FIG. 10, where preferably the Yb amplifier 40 is a 'parabolic' Yb amplifier as discussed below. Elements which are identical to those in FIG. 9 are identically numbered.

The SM 1f in FIG. 10 comprises a side-pumped Yb amplifier 40 as described with respect to FIG. 9, though any other pumping arrangement could also be implemented. The Yb fiber 44 is assumed to be polarization maintaining and a polarizer 31 is inserted to select a single polarization state.

The fiber Bragg grating 37 has a reflection bandwidth small compared to the gain bandwidth of Yb and ensures the oscillation of pulses with a bandwidth small compared to the gain bandwidth of Yb. The Bragg grating 37 can be chirped or unchirped. In the case of an unchirped Bragg grating, the pulses oscillating inside the Yb oscillator are positively chirped. Pulse generation or passive modelocking inside the Yb oscillator is initiated by the saturable absorber 28. The optical filter 39 is optional and further restricts the bandwidth of the pulses launched into the Yb amplifier 40.

To optimize the formation of parabolic pulses inside the Yb amplifier 40 inside the SM 1f, the input pulses should have a bandwidth small compared to the gain bandwidth of Yb; also the input pulse width to the Yb amplifier 40 should be small compared to the output pulse width and the gain of the Yb amplifier 40 should be as high as possible, i.e., larger than 10. Also, gain saturation inside the Yb amplifier 40 should be small.

As an example of a parabolic amplifier a Yb amplifier of 5 m in length can be used. Parabolic pulse formation is ensured by using a seed source with a pulse width of around 0.2-1 ps and a spectral bandwidth on the order of 3-8 nm. Parabolic pulse formation broadens the bandwidth of the seed source to around 20-30 nm inside the Yb amplifier 40, whereas the output pulses are broadened to around 2-3 ps. Since the chirp inside parabolic pulses is highly linear, after-compression pulse widths on the order of 100 fs can be obtained. Whereas standard ultrafast solid state amplifiers can tolerate a nonlinear phase shift from self-phase modulation only as large as pi (as well known in the state of the art), a parabolic pulse fiber amplifier can tolerate a nonlinear phase shift as large as 10*pi and higher. For simplicity, we thus refer to a large gain Yb amplifier as a parabolic amplifier. Parabolic amplifiers obey simple scaling laws and allow for the generation of parabolic pulses with spectral bandwidths as small as 1 nm or smaller by an appropriate increase of the amplifier length. For example, a parabolic pulse with a spectral bandwidth of around 2 nm can be generated using a parabolic amplifier length of around 100 m.

Since a parabolic pulse can tolerate large values of self-modulation and a large amount of spectral broadening without incurring any pulse break up, the peak power capability of a parabolic amplifier can be greatly enhanced compared to a standard amplifier. This may be explained as follows. The time dependent phase delay $\Phi_{nl}(t)$ incurred by self-phase modulation in an optical fiber of length L is proportional to peak power, i.e.

$$\Phi_{nl}(t)=\gamma P(t)L,$$

where P(t) is the time dependent peak power inside the optical pulse. The frequency modulation is given by the derivative of the phase modulation, i.e., $\delta\omega=\gamma L[\partial P(t)/\partial t]$. For a pulse with a parabolic pulse profile $P(t)=P_0[1-(t/t_0)^2]$, where $(-t_0<t<t_0)$, the frequency modulation is linear. It may then be shown that indeed the pulse profile also stays parabolic, thus allowing the propagation of large peak powers with only a resultant linear frequency modulation and the generation of a linear pulse chirp.

The chirped pulses generated with the Yb amplifier 40 can be compressed using a diffraction grating compressor as shown in FIG. 5. Alternatively, the pulses can be left chirped and compensated with the compressor after the regenerative amplifier.

In addition to the passively modelocked Yb fiber laser 44 shown in FIG. 10, alternative sources could also be used to seed the Yb amplifier. These alternative sources can comprise Raman-shifted Er or Er/Yb fiber lasers, frequency-shifted Tm or Ho fiber lasers and also diode laser pulse sources. These alternative implementations are not separately shown.

Figure 11:
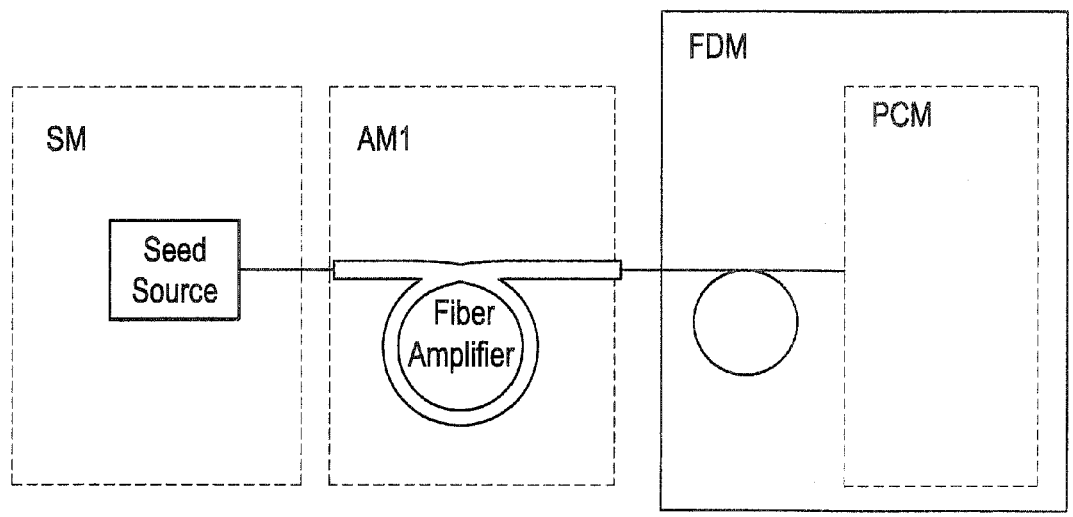
FIG. 11 is an illustration of an embodiment of the present invention in which a Fiber Delivery Module (FDM) is added to the embodiment of the invention shown in FIG. 1.

In FIG. 11 a fiber delivery module (FDM) 45 is added to the basic system shown in FIG. 2. The PSM 2 is omitted in this case; however, to expand the peak power capability of the amplifier module a PSM 2 can be included when required. The Yb amplifier 7 shown in FIG. 11 can be operated both in the non-parabolic or the parabolic regime.

In its simplest configuration, the FDM 45 consists of a length of optical fiber 46 (the delivery fiber). For a parabolic amplifier, the delivery fiber 46 can be directly spliced to the Yb amplifier 7 without incurring any loss in pulse quality. Rather, due to the parabolic pulse profile, even for large amounts of self-phase modulation, an approximately linear chirp is added to the pulse allowing for further pulse compression with the PCM 4. The PCM 4 can be integrated with the FDM 45 by using a small-size version of the bulk diffraction grating compressor 14 shown in FIG. 5 in conjunction with a delivery fiber. In this case the delivery fiber in conjunction with an appropriate collimating lens would replace the input shown in FIG. 5. A separate drawing of such an implementation is not shown. However, the use of the PCM 4 is optional and can for example be omitted, if chirped output pulses are required from the system. In conjunction with a PCM 4, the system described in FIG. 11 constitutes a derivative of a chirped pulse amplification system, where self-phase modulation as well as gain is added while the pulse is dispersively broadened in time. The addition of self-phase modulation in conventional chirped pulse amplification systems typically leads to significant pulse distortions after pulse compression. The use of parabolic pulses overcomes this limitation.

Figure 12:
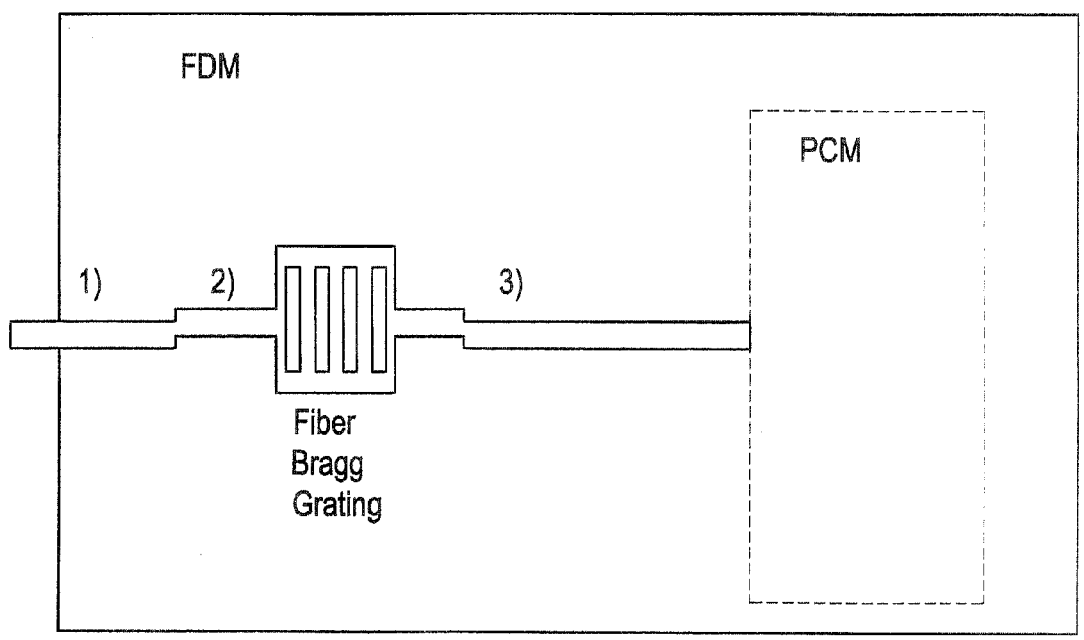
FIG. 12 is an illustration of an embodiment of a Fiber Delivery Module (FDM) for use with the present invention.

To obtain pulse widths shorter than 50 fs, the control of third order and higher-order dispersion in a FDM module or in an optional PSM becomes significant. The control of higher-order dispersion with a PSM was already discussed with reference to FIGS. 2 and 6; the control of higher-order dispersion in a FDM is very similar and discussed with an exemplary embodiment of the FDM 45a shown in FIG. 12. Just as in FIG. 2, the large third-order dispersion of a W-fiber can be used to compensate for the third-order dispersion of a bulk PCM 4. Just as in FIG. 6, by using fibers 15, 16, 17 with different values for higher-order dispersion in the FDM, the higher order dispersion of the whole system including a PCM 4 consisting of bulk diffraction gratings may be compensated.

Figure 13:
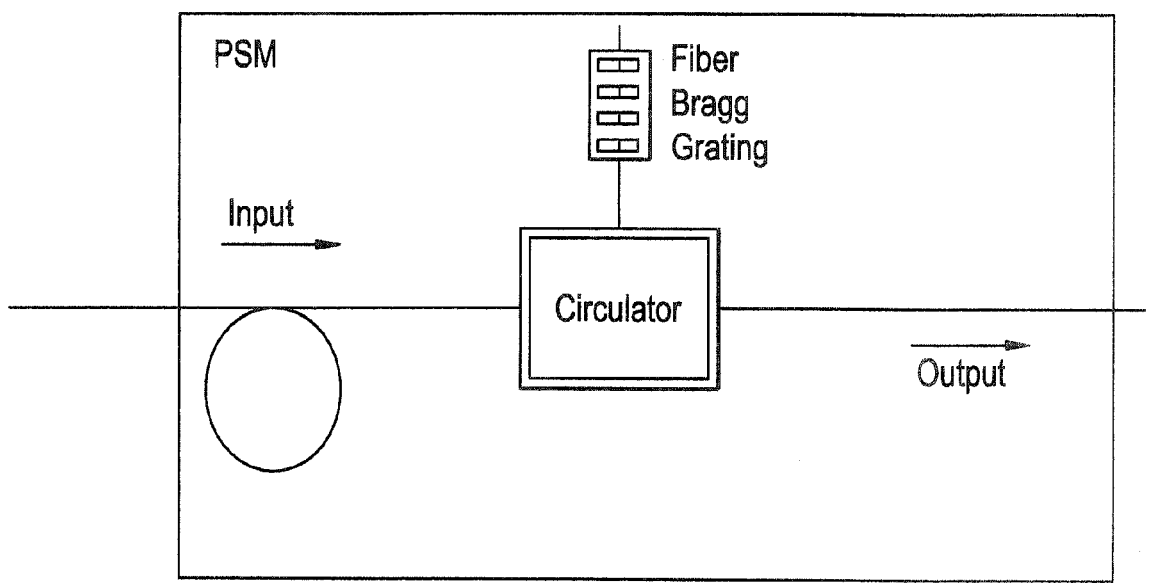
FIG. 13 is an illustration of a second embodiment of a Pulse Stretcher Module (PSM) for use with the present invention.
Figure 14:
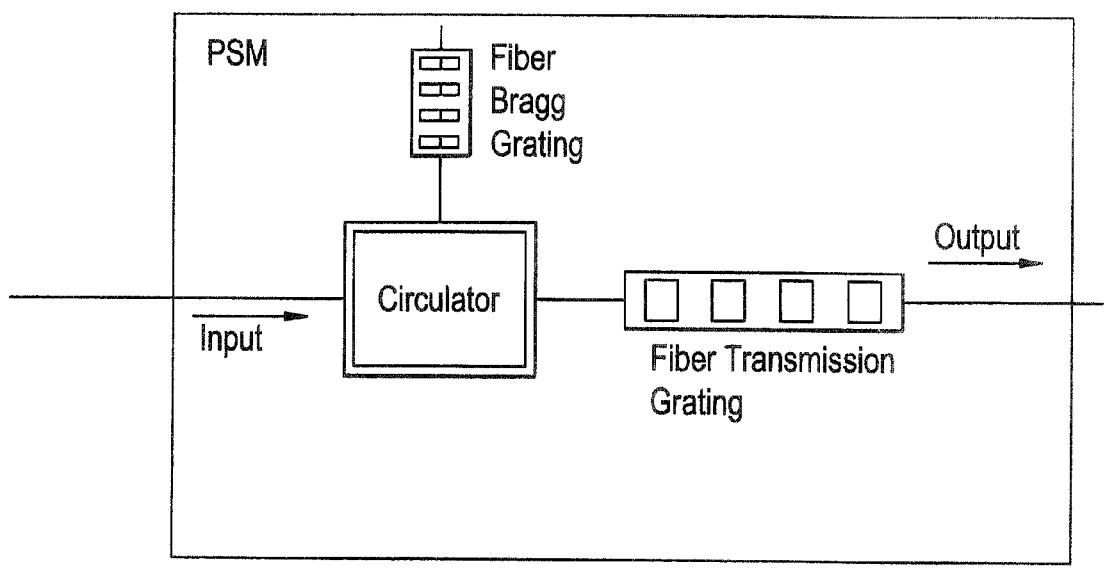
FIG. 14 is an illustration of a third embodiment of a Pulse Stretcher Module (PSM) for use with the present invention.

Alternative embodiments of PSMs are shown in FIGS. 13 and 14, which are also of practical value as they allow the use of commercially available linearly chirped fiber Bragg gratings in the PSM, while compensating for higher-order dispersion of a whole chirped-pulse amplification system comprising PSM as well as PCM. As another alternative, nonlinearly chirped fiber Bragg gratings can also be used in the PSM to compensate for the dispersion of the PCM. Such an arrangement is not separately shown.

Alternatively, the pulses can be left chirped and compensated with the compressor after the regenerative amplifier. This would mean not utilizing the PCM. This design would place additional design challenges on the dispersion correction in the PSM.

To avoid the use of W-fibers or the $LP_{11}$ mode in the PSM, an alternative embodiment of a PSM as shown in FIG. 13 is shown as PSM 2b. Here a negatively linearly chirped Bragg grating 47 is used in conjunction with a single-mode stretcher fiber 48 with negative third-order dispersion and circulator 49. The introduction of the negative linearly chirped Bragg grating increases the ratio of $(3^{rd}/2^{nd})$-order dispersion in the PSM 2b, allowing for the compensation of the high value of $3^{rd}$ order dispersion in the PCM 4, when a bulk diffraction grating compressor is used. The PSM 2b can also contain W-fibers in conjunction with a linearly chirped fiber Bragg grating to further improve the flexibility of the PSM.

As yet another alternative embodiment of a PSM for the compensation of higher-order dispersion the arrangement in FIG. 14 is shown as PSM 2c, comprising a positively linearly chirped fiber Bragg grating 50, circulator 49 and another fiber transmission grating 51. Here the positively linearly chirped fiber Bragg grating 50 produces positive 2nd order dispersion and the other fiber transmission grating 51 produces an appropriate amount of additional $2^{nd}$ $3^{rd}$ and $4^{th}$ order dispersion, to compensate for the linear and higher order dispersion inside the PCM module. More than one fiber transmission grating or fiber Bragg grating can be used to obtain the appropriate value of $3^{rd}$ and $4^{th}$ and possibly even higher-order dispersion.

Figure 15:
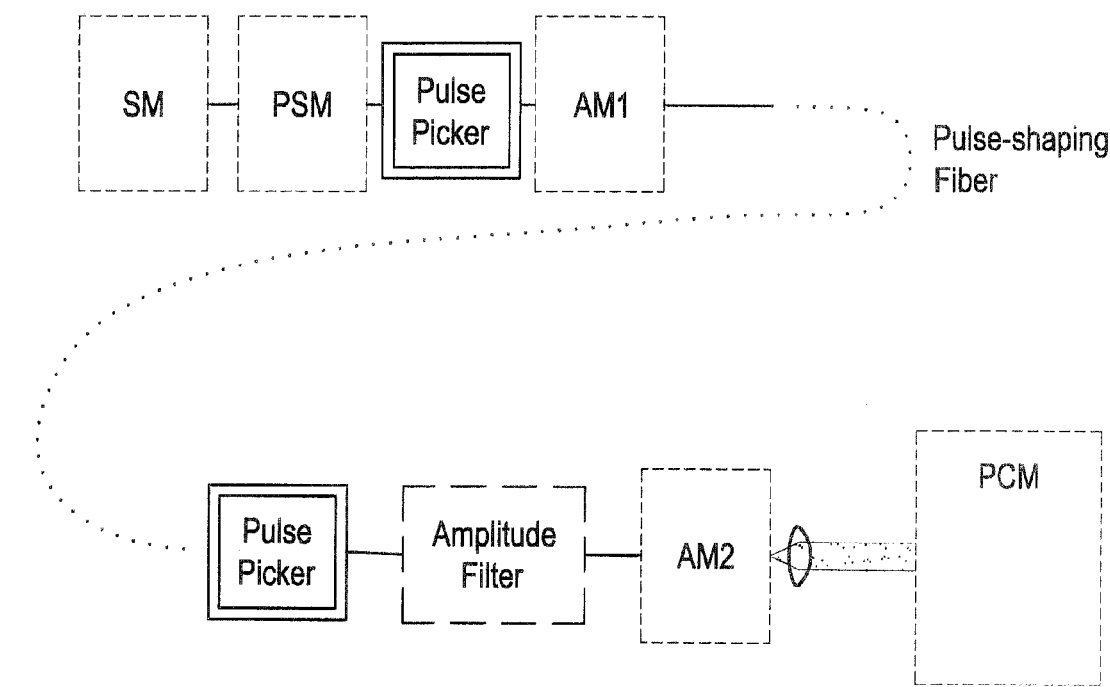
FIG. 15 is an illustration of an embodiment of the present invention in which pulse picking elements and additional amplification stages are added.

To increase the amplified pulse energy from an Yb amplifier to higher pulse energies, pulse picking elements and further amplification stages can be implemented as shown in FIG. 15. In this case, pulse pickers 52 are inserted in between the PSM 2 and the $1^{st}$ amplifier module AM1 3a, as well as between the 1st amplifier stage AM1 3a and $2^{nd}$ amplifier stage AM2 3b. Any number of amplifiers and pulse pickers can be used to obtain the highest possible output powers, where the final amplifier stages preferably consist of multi-mode fibers. To obtain a diffraction limited output the fundamental mode in these multi-mode amplifiers is selectively excited and guided using well-known techniques (M. E. Fermann et al., U.S. Pat. No. 5,818,630 and U.S. application Ser. No. 10/424,220) (both incorporated by reference herein). The pulse pickers 52 are typically chosen to consist of optical modulators such as acousto-optic or electro-optic modulators. The pulse pickers 52 down-count the repetition rate of the pulses emerging from the SM 1 by a given value (e.g. from 50 MHz to 5 KHz), and thus allow the generation of very high pulse energies while the average power remains small. Alternatively, directly switchable semiconductor lasers could also be used to fix the repetition rate of the system at an arbitrary value. Further, the pulse pickers 52 inserted in later amplifier stages also suppress the build up of amplified spontaneous emission in the amplifiers allowing for a concentration of the output power in high-energy ultra-short pulses. The amplification stages are compatible with PSMs and PCMs as discussed before; where the dispersion of the whole system can be minimized to obtain the shortest possible pulses at the output of the system.

Amplifier module AM1 3a can be designed as a parabolic amplifier producing pulses with a parabolic spectrum. Equally, the parabolic pulses from AM1 3a can be transformed into pulses with a parabolic pulse spectrum in a subsequent length of pulse-shaping or pulse stretching fiber 53 as also shown in FIG. 15, where the interaction of self-phase modulation and positive dispersion performs this transformation. This may be understood, since a chirped pulse with a parabolic pulse profile can evolve asymptotically into a parabolic pulse with a parabolic spectrum in a length of fiber. The parabolic pulse shape maximizes the amount of tolerable self-phase modulation in the subsequent amplification stages, which in turn minimizes the amount of dispersive pulse stretching and compression required in the PSM 2 and PCM 4. Equally, parabolic pulse shapes allow the toleration of significant amounts of self-phase modulation in the PSM 2 without significant pulse distortions.

Once the pulses are stretched, the detrimental influence of self-phase modulation in subsequent amplifiers can be minimized by using flat-top pulse shapes. A flat-top pulse shape can be produced by inserting an optional amplitude filter 54 as shown in FIG. 15 in front of the last amplifier module to produce a flat-top pulse spectrum. A flat-top spectrum is indeed transformed into a flat-top pulse after sufficient pulse stretching, because there is a direct relation between spectral content and time delay after sufficient pulse stretching. It can be shown that even values of self-phase modulation as large as $10*\pi$ can be tolerated for flat-top pulses without incurring significant pulse distortions.

An amplitude filter as shown in FIG. 15 may in turn also be used to control the amount of higher-order dispersion in the amplifier chain for strongly chirped pulses in the presence of self-phase modulation when reshaping of the pulse spectrum in the amplifier can be neglected, i.e., outside the regime where parabolic pulses are generated. In this case self-phase modulation produces an effective amount of higher-order dispersion of:

$$\beta_n^{SPM} = \gamma P_0 L_{\mathit{eff}} \frac{d^n S(\omega)}{d\omega^n}\bigg|_{\omega=0},$$

where $P_0$ is the peak power of the pulse and $S(\omega)$ is the normalized pulse spectrum. $L_{\mathit{eff}}$ is the effective nonlinear length $L_{\mathit{eff}}=[\exp(gL)-1]/g$, where L is the amplifier length and g is the amplifier gain per unit length. Thus by accurately controlling the spectrum of strongly chirped pulses with an amplitude filter as shown in FIG. 15, any amount of higher-order dispersion can be introduced to compensate for the values of higher-order dispersion in a chirped pulse amplification system. It can indeed be shown for 500 fs pulses stretched to around 1 ns, a phase shift of $\approx 10\,\pi$ is sufficient to compensate for the third-order dispersion of a bulk grating compressor (as shown in FIG. 5) consisting of bulk gratings with 1800 grooves/mm. Attractive well-controllable amplitude filters are for example fiber transmission gratings, though any amplitude filter may be used to control the pulse spectrum in front of such a higher-order dispersion inducing amplifier.

Figure 16:
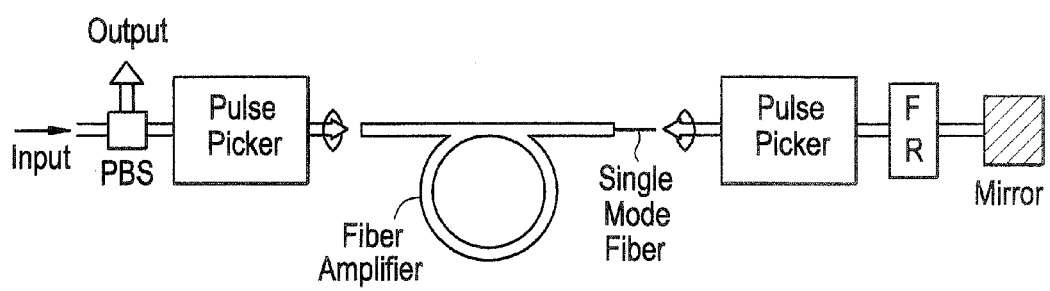
FIG. 16 is an illustration of another embodiment of the present invention where a fiber amplifier is operated with at least one forward and one backward pass, in combination with optical modulators such as pulse picking elements.
Figure 16:
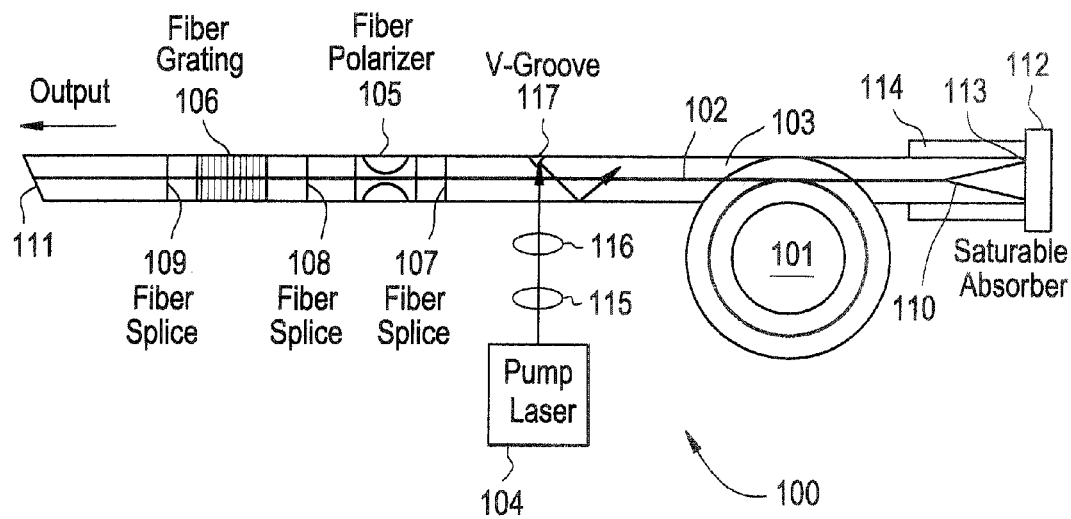

As another embodiment for the combination of an amplifier module with a pulse picker, the configuration displayed in FIG. 16 can be used. Since very high energy pulses require large core multi-mode fibers for their amplification, the control of the fundamental mode in a single-pass polarization maintaining fiber amplifier may be difficult to accomplish. In this case, it may be preferred to use a highly centro-symmetric non-polarization maintaining amplifier to minimize mode-coupling and to obtain a high-quality output beam. To obtain a deterministic environmentally stable polarization output from such an amplifier, a double-pass configuration as shown in FIG. 16 may be required. Here a single-mode fiber 55 is used as a spatial mode filter after the first pass through the amplifier 56; alternatively, an aperture could be used here. The spatial mode filter 55 cleans up the mode after the first pass through the multi-mode amplifier 56, and also suppresses amplified spontaneous emission in higher-order modes that tends to limit the achievable gain in a multi-mode amplifier. Lenses 60 can be used for coupling into and out of amplifier 56, spatial mode filter 55, and pulse pickers 52a and 52b. The Faraday rotator 57 ensures that the backward propagating light is polarized orthogonal to the forward propagating light; the backward propagating light is coupled out of the system at the shown polarization beam splitter 58. To optimize the efficiency of the system, a near-diffraction limited source is coupled into the fundamental mode of the multi-mode fiber 56 at the input of the system, where gain-guiding can also be used to further improve the spatial quality of the beam amplified in the multi-mode fiber. To count-down the repetition rate of the pulse train delivered from a SM and to suppress amplified spontaneous emission in the multi-mode amplifier, a 1st optical modulator 52a can be inserted after the first pass through the multi-mode amplifier. An ideal location is just in front of the reflecting mirror 59 as shown. As a result a double-pass gain as large as 60-70 dB could be obtained in such a configuration, minimizing the number of amplification stages required from amplifying seed pulses with pJ energies up to the mJ energy level. This type of amplifier is fully compatible with the SMs, PSMs and PCMs as discussed before, allowing for the generation of femtosecond pulses with energies in the mJ regime. As another alternative for the construction of a high-gain amplifier module, a count-down of the repetition rate from a pulse train delivered by a SM can also be performed with an additional 2nd modulator 52b prior to injection into the present amplifier module as also shown in FIG. 16. The repetition rate of transmission windows of the 1st modulator 52a should then be either lower or equal to the repetition rate of the transmission window of the 2nd modulator 52b. Such a configuration is not separately shown. FIG. 16 shares some similarities with FIG. 5 of U.S. Pat. No. 5,400,350, which is hereby incorporated by reference.

Figure 17:
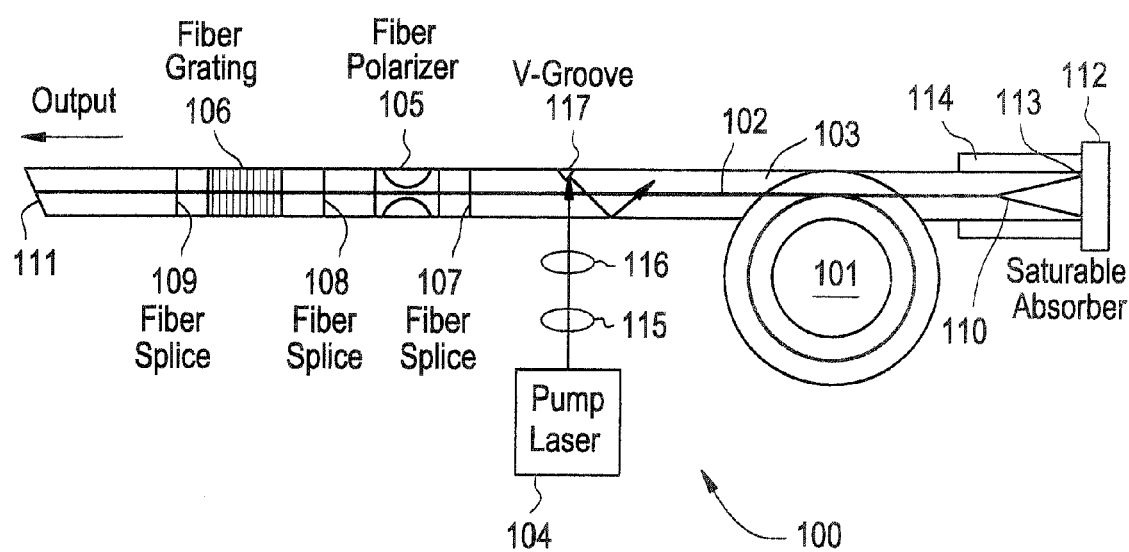
FIG. 17 is a diagram of a cladding pumped fiber cavity design according to a first embodiment of the invention.

FIG. 17 represents an embodiment of the femtosecond fiber oscillator embodied in a fiber laser cavity 100. A polarization-maintaining gain fiber 101 has a core 102 and cladding region 103. The fiber core 102 is doped with rare-earth ions, such as Yb, Nd, Er, Er/Yb, Tm or Pr, to produce gain at a signal wavelength when the laser is pumped with diode laser 104. The fiber core can be single-mode or multi-mode. The fiber laser cavity 100 further contains an integrated fiber polarizer 105 and a chirped fiber Bragg grating 106. Both of these elements, 105 and 106, are generally constructed of short fiber pigtails (e.g., 0.001-1 m in length), which are preferably fusion-spliced to fiber 101 using splices 107, 108 and 109. Alternatively, fiber polarizer 105 can be spliced in front of beam expander 110. When using multi-mode fiber, splice 107 is selected to match the fundamental mode in the gain fiber 101.

An exemplary integrated fiber polarizer in accordance with the invention comprises a polarization-maintaining undoped polarizer fiber (PF), with two orthogonal polarization axes, where the loss along one polarization axis is significantly higher than the loss along the other polarization axis. Alternatively, a very short section (less than 1 cm) of non-birefringent fiber (i.e., non-polarization-maintaining fiber) can be sandwiched between two sections of polarization-maintaining fiber, where the polarization axes of the polarization-maintaining fibers are aligned with respect to each other. By side-polishing the non-birefringent fiber, e.g., down to the evanescent field of the fiber core, along one of the axes of the birefringent fiber, and coating the polished region with metal, high extinction polarization action can be obtained along one of the axes of the birefringent fiber. The design of side-polished fiber polarizers is well known in the field and not discussed further here.

For optimum laser operation, the fiber polarization axes of the PF are aligned parallel to the polarization axes of the gain fiber 101. To ensure stable modelocked operation, the polarizer preferably effectively eliminates satellite pulses generated by any misalignment between the polarization axes of the PF and the gain fiber 101.

Neglecting any depolarization in the all-fiber polarizer itself, it can be shown by applying a Jones matrix calculation method that for a misalignment of the polarization axes of gain fiber 101 and fiber polarizer 105 by $\alpha$ degrees, the linear reflectivity R from the right-hand side of the cavity varies approximately between $R=1-0.5 \sin^2 2\alpha$ and $R=1$ depending on the linear phase in the gain fiber 101. If the group delay along the two polarization axes of the gain fiber is larger than the intra-cavity pulse width, any satellite pulse is suppressed by $\sin^4 \alpha$ after transmission through the polarizer. Typical fiber splicing machines can align polarization-maintaining fibers with an angular accuracy of less than $\pm 2°$; hence any reflectivity variation due to drifts in the linear phase between the two polarization eigenmodes of fiber 101 can be kept down to less than $3 \times 10^{-3}$, whereas (for sufficiently long fibers) any satellite pulses obtained after transmission through the polarizer can be kept down to less than $6 \times 10^{-6}$ when using an integrated polarizer.

The chirped fiber Bragg grating 106 is preferably spliced to the PF 105 at splice position 108 and written in non-polarization-maintaining fiber. In order to avoid depolarization in the fiber Bragg grating, the Bragg grating pig-tails are preferably kept very short, e.g., a length smaller than 2.5 cm is preferable between splice locations 108 and 109. To obtain a linear polarization output, a polarization-maintaining fiber pig-tail is spliced to the left-side of the fiber Bragg grating at splice location 109. The laser output is obtained at a first fiber (or cavity) end 111, which is preferably angle-cleaved to avoid back-reflections into the cavity. An alternative preferred design is with the fiber grating written in polarization-maintaining fiber.

Fiber Bragg grating 106 serves two functions. First, it is used as an output mirror (i.e., it feeds part of the signal back to the cavity) and, second, it controls the amount of cavity dispersion. In the present implementation, the chirped fiber Bragg grating has a negative (soliton-supporting) dispersion at the emission wavelength in the wavelength region near 1060 nm and it counter-balances the positive material dispersion of the intra-cavity fiber. To produce the shortest possible pulses (with an optical bandwidth comparable to or larger than the bandwidth of the gain medium), the absolute value of the grating dispersion is selected to be within the range of 0.5-10 times the absolute value of the intra-cavity fiber dispersion. Moreover, the fiber Bragg grating is apodized in order to minimize any ripple in the reflection spectrum of the grating. Accordingly, the oscillation of chirped pulses is enabled in the cavity, minimizing the nonlinearity of the cavity and maximizing the pulse energy. Chirped pulses are characterized in having a pulse width which is longer than the pulse width that corresponds to the bandwidth limit of the corresponding pulse spectrum. For example the pulse width can be 50%, 100%, 200% or more than 1000% longer than the bandwidth limit.

Alternatively, the oscillation of chirped pulses is also enabled by using negative dispersion fiber in conjunction with positive dispersion chirped fiber Bragg gratings. Pulses with optical bandwidth comparable to the bandwidth of the gain medium can also be obtained with this alternative design.

A SAM 112 at a second distal fiber end 113 completes the cavity. In an exemplary implementation a thermally expanded core (TEC) 110 is implemented at cavity end 113 to optimize the modelocking performance and to allow close coupling of the SAM 112 to the second fiber end 113 with large longitudinal alignment tolerances. Etalon formation between the fiber end 113 and the SAM 112 is prevented by an anti-reflection coating deposited on fiber end 113 (not separately shown). In the vicinity of the second fiber end 113, fiber 101 is further inserted into ferrule 114 and brought into close contact with SAM 112. Fiber 101 is subsequently fixed to ferrule 114 using, for example, epoxy and the ferrule itself is also glued to the SAM 112.

The pump laser 104 is coupled into the gain fiber 101 via a lens system comprising, for example, two lenses 115 and 116 and a V-groove 117 cut into fiber 101. Such side-coupling arrangements are described in, for example, U.S. Pat. No. 5,854,865 ('865) to L. Goldberg et al. Alternatively, fiber couplers can be used for pump light coupling.

Figure 18A:
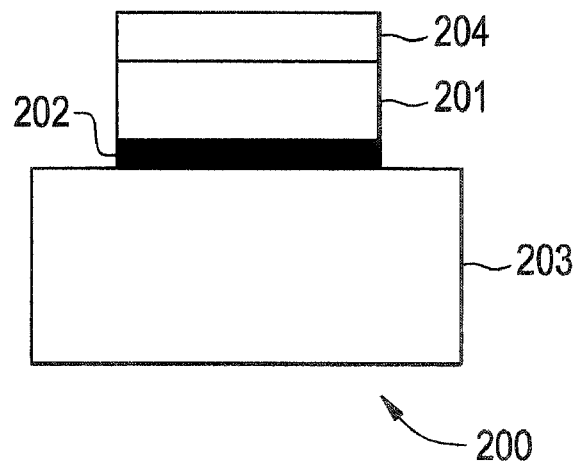
FIG. 18a is a diagram of a saturable absorber mirror according to an embodiment of the invention.

An exemplary design for a SAM in accordance with the present invention is shown in FIG. 18a. For example, SAM 200 includes an InGaAsP layer 201 with a thickness of 50-2000 nm. Further, layer 201 is grown with a band edge in the 1 µm wavelength region; the exact wavelength is defined by the sought emission wavelength of the fiber laser and can vary between 1.0-1.6 µm. The InGaAsP layer 201 is further coated or processed with a reflective material such as Au or Ag. A dielectric mirror or semiconductor Bragg reflector 202 is located beneath layer 201 and the entire structure is attached to heat sink 203, based on, for example, metal, diamond or sapphire.

In order to cover a broad spectral range (e.g., greater than 100 nm) metallic mirrors are preferred. When using a metallic mirror it is advantageous to remove the substrate (InP) by means of etching. When using HCl as an etching solvent the etching selectivity between InGaAsP and InP can be low, depending on the compound composition of InGaAsP. An etch-stop layer is beneficial between the substrate and the InGaAsP layer. InGaAs can be a proper etch-stop layer. When adding an InGaAs layer with a band-gap wavelength shorter than 1.03 µm, lattice relaxations can be avoided by keeping the thickness below 10 nm.

The InGaAsP layer can further be anti-reflection coated with layer 204 on its upper surface to optimize the performance of the SAM. Because of the saturable absorption by InGaAsP, the reflectivity of the SAM increases as a function of light intensity, which in turn favors the growth of short pulses inside the laser cavity. The absence of Al in the saturable absorber layer prevents oxidization of the semiconductor surfaces in ambient air and thus maximizes the life-time and power handling capability of the structure.

Instead of InGaAsP, any other Al-free saturable semiconductor can also be used in the construction of the SAM. Alternatively, Al-containing semiconductors can be used in the SAM with appropriately passivated surface areas. Surface passivation can, for example, be accomplished by sulfidization of the semiconductor surface, encapsulating it with an appropriate dielectric or with an Al-free semiconductor cap layer. An AlGaInAs absorber layer grown lattice-matched on InP can be surface-passivated with a thin (about 10 nm range) cap layer of InP. AlGaInAs with a higher band gap energy than the absorber layer can also be used for a semiconductor Bragg reflector in combination with InP. Among concepts for semiconductor Bragg mirrors lattice-matched to InP, an AlGaInAs/InP combination has an advantage over an InGaAsP/InP Bragg reflector due to its high refractive index contrast.

Figure 18B:
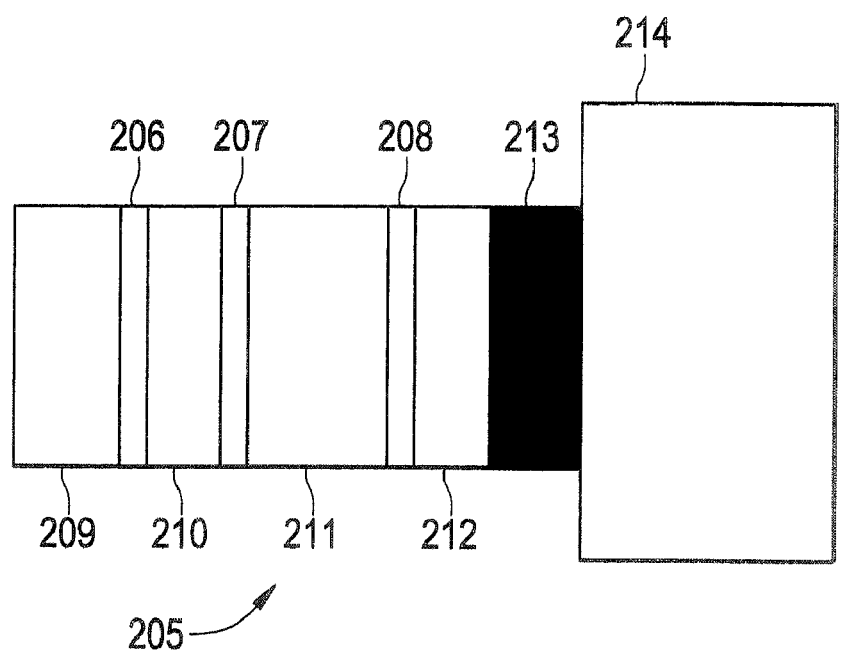
FIG. 18b is a diagram of a saturable absorber mirror according to an alternative embodiment of the invention.

Instead of a bulk semiconductor saturable absorber, a MQW saturable absorber structure as shown in FIG. 18b may also be used. In this case, the SAM 205 conveniently comprises MQW structures 206, 207 and 208 separated by passive spacer layers 209-212 in order to increase the saturation fluence and depth-selective ion-implantation concentration of each MQW section. Additional MQW structures can further be used, similarly separated by additional passive spacer layers. To reduce the wavelength and location sensitivity of the MQW saturable absorbers, the width of the spacer layers varies from spacer layer to spacer layer. Furthermore, multiple bulk layers with thicknesses larger than 500 Å can replace the MQW structure. The MQW layers, in turn, can contain several layers of quantum wells and barriers such as, for example, InGaAs and GaAs, respectively. Top surface 209 can further be anti-reflection coated (not shown); a reflective structure is obtained by including mirror structure 213. The entire structure can be mounted on heat sink 214.

The control of the response time of the saturable absorption for concomitant existence of fast and slow time constants is realized by introducing carrier trap centers with depth controlled H+ (or other ions) implantation. The implantation energy and dose are adjusted such that part of the absorbing semiconductor film contains a minimal number of trap centers. For example the semiconductor layer with the minimal number of trap centers can be selected to be at the edge of the optical penetration range of exciting laser radiation. Such a design serves only as an example and alternatively any semiconductor area within the optical penetration range can be selected to contain a minimal number of trap centers. Hence distinctive bi-temporal carrier relaxation is obtained in the presence of optical excitation. As an illustration of depth selective ion implantation, FIG. 19 shows the measurement of the depth profile of H+ ion implantation of an InGaAsP absorber film taken from secondary ion mass spectroscopy (SIMS).

Figure 19:
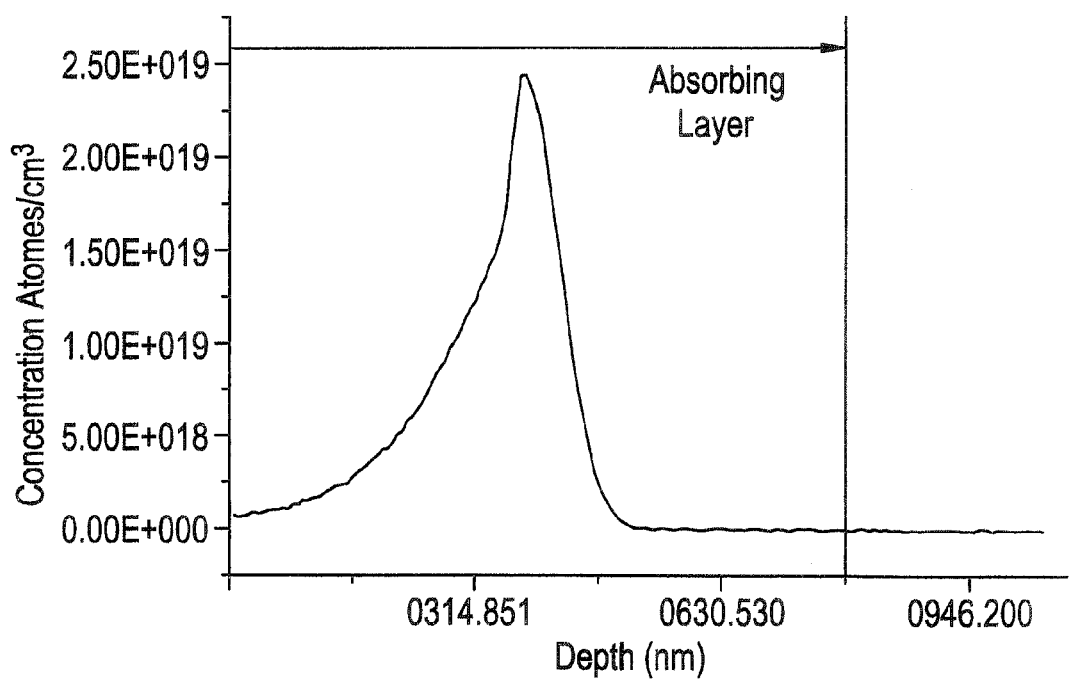
FIG. 19 is a diagram of the proton concentration as a function of depth obtained after proton implantation into a saturable semiconductor film.
Figure 20:
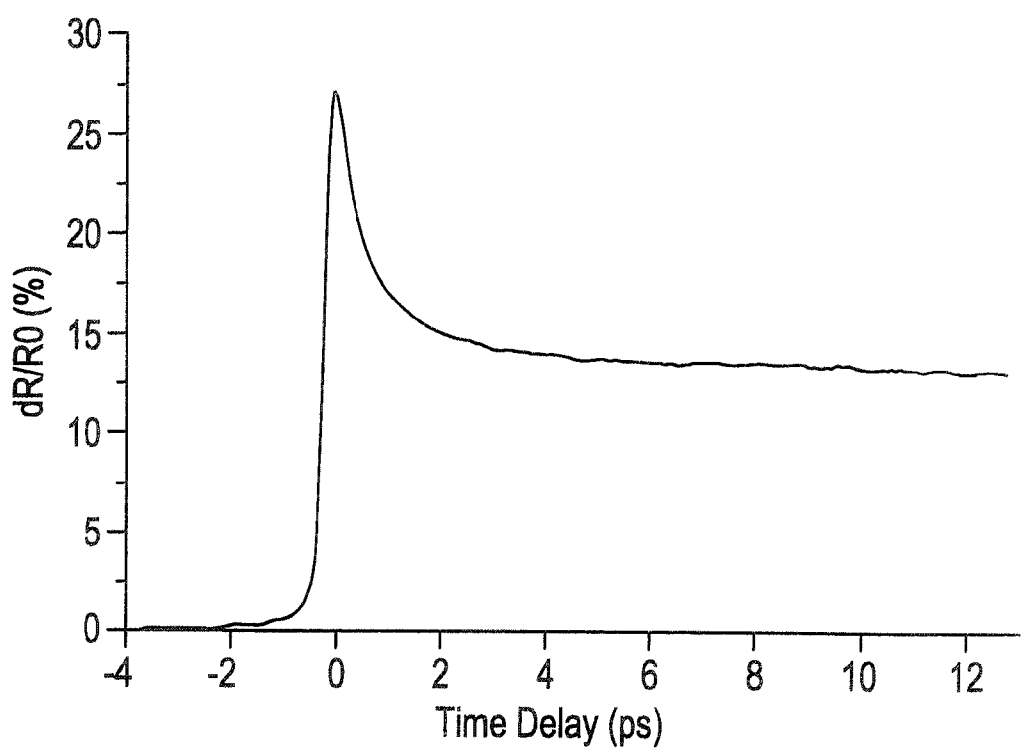
FIG. 20 is a diagram of the measured bi-temporal reflectivity modulation obtained in a semiconductor saturable mirror produced by ion-implantation with selective depth penetration.

The obtained bi-temporal carrier life-time obtained with the semiconductor film with a proton concentration as shown in FIG. 19, is further illustrated in FIG. 20. Here the reflectivity modulation (dR/R0) of a semiconductor saturable mirror due to excitation of the saturable mirror with a high energy short pulse at time t=0 is shown as a function of time delay. The measurement was obtained with a pump-probe technique, as well known in the art. FIG. 20 clearly displays the bi-temporal response time due to fast (<1 ps) and slow (>>100 ps) recovery. The distinctive fast response originates from the depth region with high trap concentration, while the slow component results from the rear depth region with a much lower trap center concentration.

When employing this absorber in the laser system described with respect to FIG. 17, Q-switched mode-locking is obtained at intracavity power levels of a few mW. At the operating pump power level, stable cw mode-locking evolving from Q-switch mode-locking is observed. In contrast, no Q-switching and no mode-locking operation is obtained with the same semiconductor material implanted uniformly with protons without bi-temporal carrier relaxation (exhibiting only fast carrier relaxation).

We emphasize that the description for FIG. 19 and FIG. 20 is to serve as an example in controlling 1) the fast time constant, 2) the slow time constant, 3) the ratio of the fast and slow time constants, 4) the amplitude of the fast response, 5) the amplitude of the slow response, and finally 6) the combination of all of the above by ion implantation in a saturable absorber. Thus, the concept depicted hereby can be applicable for any type of laser modelocked with a saturable absorber. Specifically, in the presence of un-avoidable large spurious intra-cavity reflections such as in fiber lasers or thin disk lasers (F. Brunner et al., Sub-50 fs pulses with 24 W average power from a passively modelocked thin disk Yb:YAG laser with nonlinear fiber compression, Conf. on Advanced Solid State Photonics, ASSP, 2003, paper No.: TuA1), the disclosed engineerable bi-temporal saturable absorbers can greatly simplify and stabilize short pulse formation.

The preferred implantation parameters for H+ ions in GaAs or InP related materials including MQW absorbers are as follows: The doses and the implantation energies can be selected from $10^{12}$ cm$^{-2}$ to $10^{17}$ cm$^{-2}$ and from 5 keV to 200 keV, respectively, for an optically absorbing layer thickness between 50 nm and 2000 nm. For MQW absorbers, the selective ion-implantation depth is rather difficult to measure because the shallow MQW falls into the implantation peak in FIG. 19. However, with the separation of MQW sections with spacers 209-212 (as shown in FIG. 18) it is feasible to employ depth selective ion implantation. For arsenic implantation, the implantation parameters for 50-2000 nm absorbing layer spans from $10^{12}$ cm$^{-2}$ to $10^{17}$ cm$^{-2}$ for the dosage and an implantation energy range of 100 keV to 1000 keV. In case of MQW saturable absorbers, the implantation range is preferably selected within the total thickness of the semiconductor layer structure containing MQW sections and spacers. In addition to H$^+$ and arsenic, any other ions such as for example Be can be implanted with controlled penetration depth by adjusting the above recipes according to the stability requirements of the desired laser.

Figure 21A:
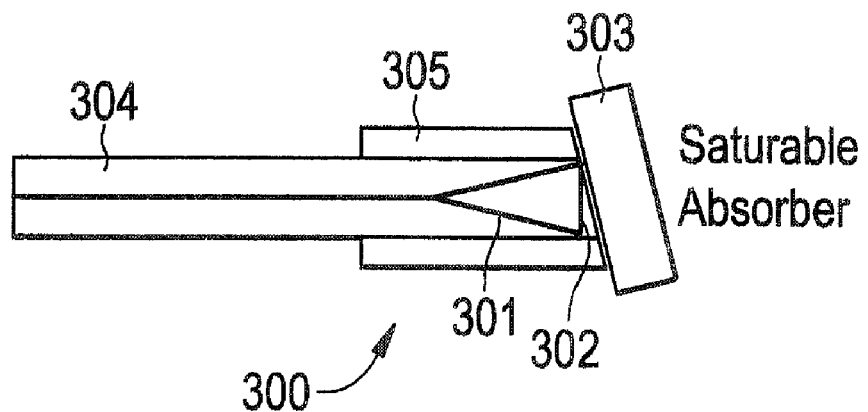
FIG. 21a is a diagram of a scheme for coupling a saturable absorber mirror to a fiber end according to an embodiment of the invention.

FIG. 21a illustrates an alternative implementation of the fiber end and SAM coupling in FIG. 17. Here cavity 300 comprises an angle-polished thermal-diffusion expanded core (TEC) 301. Fiber end 302 is brought into close contact with SAM 303 and fiber 304 is rotated inside ferrule 305 to maximize the back reflection from SAM 303. Ferrule 305 is further angle-polished and SAM 303 is attached to the angle-polished surface of ferrule 305. As shown in FIG. 21a, fiber 304 is conveniently glued to the left-hand side of ferrule 305. A wedge-shaped area between the fiber surface 302 and SAM 303 greatly reduces the finesse of the etalon between the two surfaces, which is required for optimum modelocked laser operation.

Figure 21B:
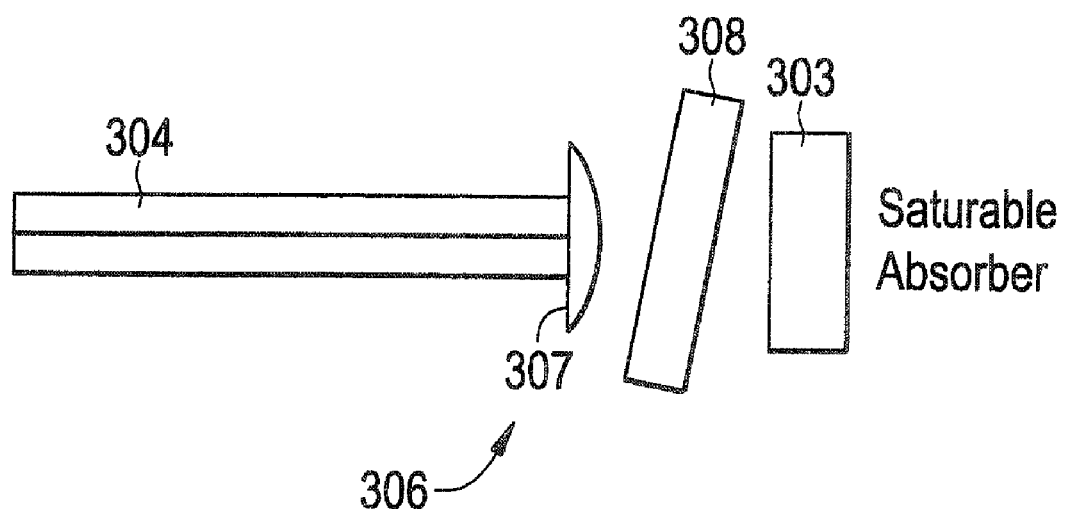
FIG. 21b is a diagram of a scheme for coupling a saturable absorber mirror to a fiber end according to an alternative embodiment of the invention.

Instead of TEC cores, more conventional lenses or graded index lenses can be incorporated between the fiber end and the SAM to optimize the beam diameter on the SAM. Generally, two lenses are required. A first lens collimates the beam emerging from the fiber end, and a second lens focuses the beam onto the SAM. According to present technology, even conventional lenses allow the construction of a very compact package for the second fiber end. An implementation with two separate collimation and focusing lenses is not separately shown. To minimize unwanted back reflections into the fiber cavity and to minimize the number of components, a single lens can be directly fused to the fiber end as depicted in FIG. 21b. As shown in FIG. 21b, assembly 306 contains SAM 303 and fiber 304 as well as lens 307, which focuses the optical beam onto the SAM. Lens 307 can also include a graded index lens.

To minimize aberrations in assembly 306, an additional lens can also be incorporated between lens 307 and SAM 303. Such an assembly is not separately shown. Alternatively, a lens can be directly polished onto fiber 304; however, such an arrangement has the disadvantage that it only allows a beam size on the SAM which is smaller than the beam size inside the optical fiber, thereby somewhat restricting the design parameters of the laser. To circumvent this problem, a lens surface can be directly polished onto the surface of a TEC; such an implementation is not separately shown. Another alternative is to exploit a graded-index lens design attached directly onto the fiber tip to vary the beam size on the SAM. In the presence of air-gaps inside the oscillator a bandpass filter 308 can be incorporated into the cavity, allowing for wavelength tuning by angular rotation as shown, for example, in FIG. 21b.

Passive modelocking of laser cavity 100 (FIG. 17) is obtained when the pump power exceeds a certain threshold power. In a specific, exemplary, implementation, polarization-maintaining fiber 101 was doped with Yb with a doping level of 2 weight %; the doped fiber had a length of 1.0 m; the core diameter was 8 um and the cladding diameter was 125 um. An additional 1.0 m length of undoped polarization-maintaining fiber was also present in the cavity. The overall (summed) dispersion of the two intra-cavity fibers was approximately +0.09 ps$^2$. In contrast, the fiber grating 106 had a dispersion of −0.5 ps$^2$, a spectral bandwidth of 10 nm and a reflectivity of 50%. The grating was manufactured with a phase mask with a chirp rate of 80 nm/cm.

When pumping with an optical power of 1.0 W at a wavelength of 910 nm, the laser produced short chirped optical pulses with a full width half maximum width of 1.5 ps at a repetition rate of 50 MHz. The average output power was as high as 10 mW. The pulse bandwidth was around 2 nm and hence the pulses were more than two times longer than the bandwidth-limit which corresponds to around 800 fs.

Alternatively, a fiber grating 106 with a dispersion of −0.1 ps$^2$, closely matching the dispersion of the intra-cavity fiber, was implemented. The fiber grating had a reflectivity of 9% and a spectral bandwidth of 22 nm centered at 1050 nm. The grating was manufactured with a phase mask with a chirp rate of 320 nm/cm. The laser then produced chirped optical pulses with a full-width half maximum width of 1.0 ps at a repetition rate of 50 MHz with an average power of 25 mW. The pulse spectral bandwidth was around 20 nm and thus the pulses were around 10 times longer than the bandwidth limit, which corresponds to around 100 fs. The generation of pulses with a pulse width corresponding to the bandwidth limit was enabled by the insertion of a pulse compressing element; such elements are well known in the state of the art and are not further discussed here. The generation of even shorter pulses can be generated with fiber gratings with a bandwidth of 40 nm (and more) corresponding to (or exceeding) the spectral gain bandwidth of Yb fibers.

Figure 22:
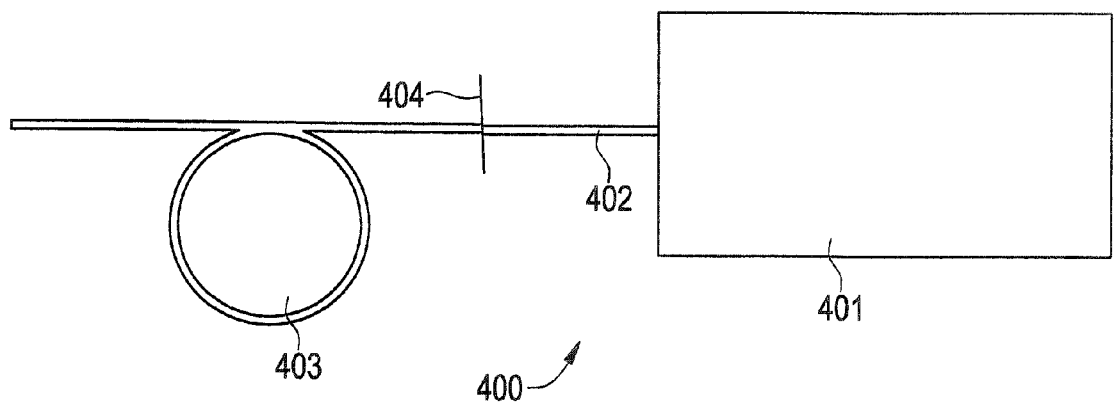
FIG. 22 is a diagram for increasing the optical bandwidth of a fiber laser according to an embodiment of the invention.

Shorter pulses or pulses with a larger bandwidth can be conveniently obtained by coupling the fiber output into another length of nonlinear fiber as shown in FIG. 22. Here, assembly 400 contains the integrated fiber laser 401 with pig-tail 402. Pig-tail 402 is spliced (or connected) to the nonlinear fiber 403 via fiber splice (or connector) 404. Any type of nonlinear fiber can be implemented. Moreover, fiber 403 can also comprise a fiber amplifier to further increase the overall output power.

Figure 23:
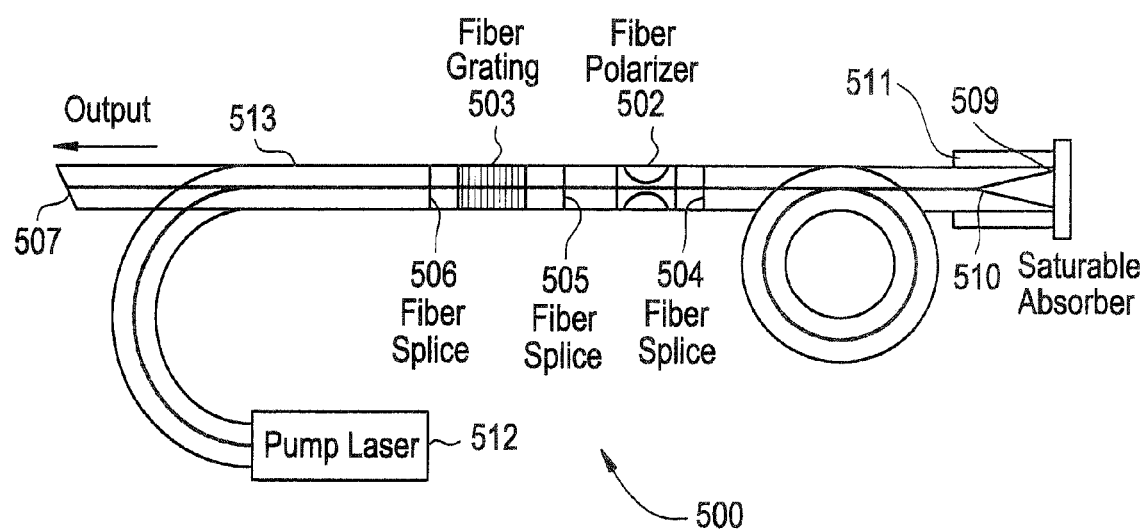
FIG. 23 is a diagram of a core pumped fiber cavity design according to an embodiment of the invention.

In addition to cladding pumped fiber lasers, core-pumped fiber lasers can be constructed in an integrated fashion. Such an assembly is shown in FIG. 23. The construction of cavity 500 is very similar to the cavity shown in FIG. 17. Cavity 500 contains polarization-maintaining fiber 501 and integrated fiber polarizer 502. Fiber 501 is preferably single-clad, though double-clad fiber can also be implemented. The chirped fiber grating 503 again controls the dispersion inside the cavity and is also used as the output coupler. Fiber 501, fiber polarizer 502, fiber grating 503 and the polarization-maintaining output fiber are connected via splices 504-506. The output from the cavity is extracted at angle-cleaved fiber end 507. SAM 508 contains anti-reflection coated fiber end 509, located at the output of the TEC 510. Fiber 501 and SAM 508 are fixed to each other using ferrule 511. The fiber laser is pumped with pump laser 512, which is injected into the fiber via wavelength-division multiplexing coupler 513.

In addition to chirped fiber gratings, unchirped fiber gratings can also be used as output couplers. Such cavity designs are particularly interesting for the construction of compact Er fiber lasers. Cavity designs as discussed with respect to FIGS. 17 and 23 can be implemented and are not separately shown. In the presence of fiber gratings as shown in FIGS. 17 and 23, the fiber gratings can also be used as wavelength tuning elements. In this, the fiber gratings can be heated, compressed or stretched to change their resonance condition, leading to a change in center wavelength of the laser output. Techniques for heating, compressing and stretching the fiber gratings are well known. Accordingly, separate cavity implementations for wavelength tuning via a manipulation of the fiber grating resonance wavelength are not separately shown.

Figure 24:
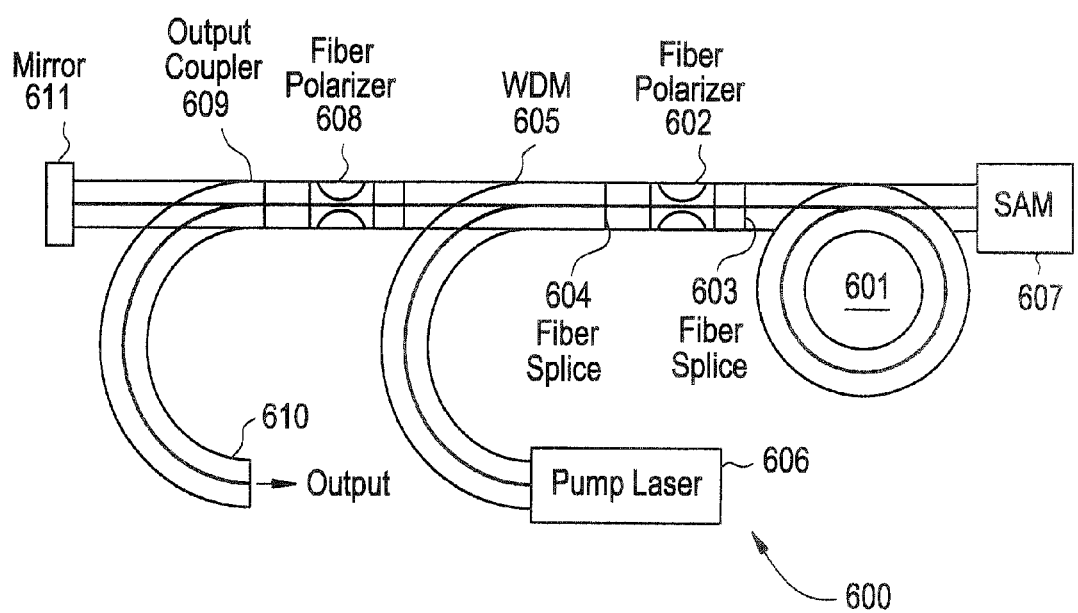
FIG. 24 is a diagram of a core pumped fiber cavity design using intra-cavity wavelength division multiplexers and output couplers according to an embodiment of the invention.

In the absence of a fiber grating, a mirror can be deposited or attached to one end of the fiber cavity. The corresponding cavity design 600 is shown in FIG. 24. Here, it is assumed that the fiber 601 is core pumped. The cavity comprises an intra-cavity all-fiber polarizer 602 spliced to fiber 601 via splice 603. Another splice 604 is used to couple WDM 605 to polarizer 602. Polarization maintaining WDM 605 is connected to pump laser 606, which is used to pump the fiber laser assembly. Saturable absorber mirror assembly 607, as described previously with respect to FIGS. 17 and 23, terminates one cavity end and is also used as the passive modelocking element.

A second fiber polarizer 608 is spliced between WDM 605 and polarization-maintaining output coupler 609 to minimize the formation of satellite pulses, which can occur when splicing sections of polarization maintaining fiber together without perfect alignment of their respective polarization axes, as discussed in U.S. patent application Ser. No. 09/809,248. Typically, coupler 609 has a coupling ratio of 90/10 to 50/50, i.e., coupler 609 couples about 90-50% of the intra-cavity signal out to fiber pig-tail 610. Pig-tail 610 can be spliced to a fiber isolator or additional fiber amplifiers to increase the pulse power. The second cavity end is terminated by mirror 611. Mirror 611 can be directly coated onto the fiber end face or, alternatively, mirror 611 can be butt-coupled to the adjacent fiber end.

The increase in stability of cavity 600 compared to a cavity where the output coupler fiber, the WDM fiber and gain fiber 601 are directly concatenated without intra-fiber polarizing stages, can be calculated using a Jones matrix formalism even when coherent interaction between the polarization axes of each fiber section occurs.

Briefly, due to the environmental sensitivity of the phase delay between the polarization eigenmodes of each fiber section, for N directly concatenated polarization-maintaining fibers the reflectivity of a fiber Fabry-Perot cavity can vary between R=1 and R=1$-$(N$\times\alpha$)$^2$, where $\alpha$ is the angular misalignment between each fiber section. Further, it is assumed that $\alpha$ is small (i.e., $\alpha$<<10°) and identical between each pair of fiber sections. Also, any cavity losses are neglected. In fact, it is advantageous to analyze the possible leakage L into the unwanted polarization state at the output of the fiber cavity. L is simply given by L=1$-$R. For the case of N concatenated fiber sections, the maximum leakage is thus (N$\times\alpha$)$^2$.

In contrast, a cavity containing N$-$1 polarizers in-between N sections of polarization-maintaining fiber is more stable, and the maximum leakage is L=2$\times$(N$-$1)$\alpha^2$. Here, any depolarization in the fiber polarizers itself is neglected. For instance, in a case where N=3, as in cavity 600, the leakage L into the wrong polarization axis is 2$\times$(3$-$1)/3$^3$=4/9 times smaller compared to a cavity with three directly concatenated fiber sections. This increase in stability is very important in manufacturing yield as well as in more reproducible modelocked operation in general.

Figure 25:
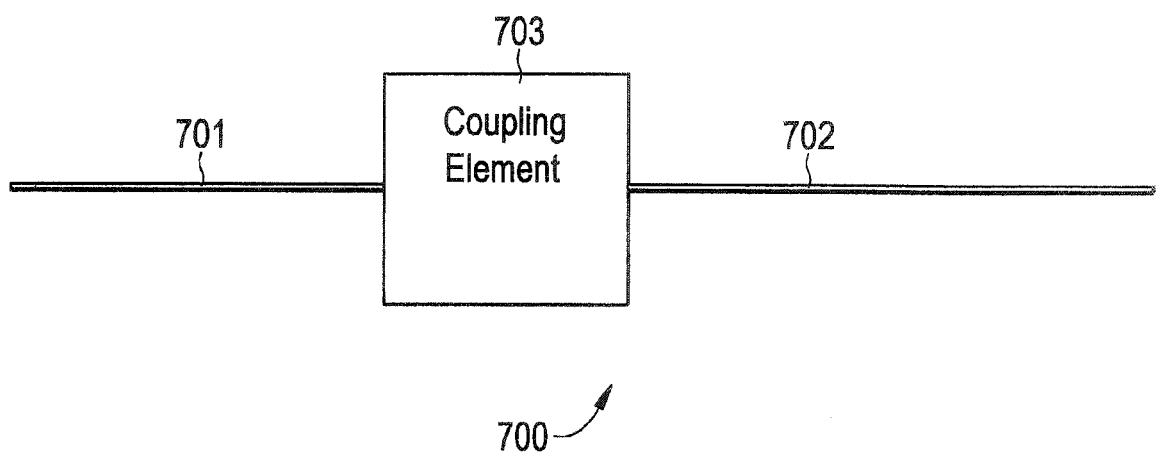
FIG. 25 is a diagram of a core pumped fiber cavity design using intra-cavity wavelength division multiplexers and a butt-coupled fiber pig-tail for output coupling according to an embodiment of the invention.

In constructing a stable laser, it is also important to consider the construction of WDM 605 as well as output coupler 609. Various vendors offer different implementations. An adequate optical representation of such general polarization-maintaining fiber elements is shown in FIG. 25. It is sufficient to assume that a general coupler 700 comprises two polarization-maintaining fiber sections (pig-tails) 701, 702 with a coupling point 703 in the middle, where the two polarization axes of the fiber are approximately aligned with respect to each other.

In order to ensure pulse stability inside a passively modelocked laser, the group-velocity walk-off along the two polarization axes of fiber sections 701, 702 should then be longer than the full-width half maximum (FWHM) pulse width of the pulses generated in the cavity. For example, assuming a birefringent fiber operating at a wavelength of 1550 nm with a birefringence of 3$\times$10$^{-4}$ corresponding to a polarization beat length of 5 mm at 1550 nm, the stable oscillation of soliton pulses with a FWHM width of 300 fs requires pig-tails with a length greater than 29 cm. For 500 fs pulses, the pig-tail length should be increased to around 50 cm.

Referring back to FIG. 24, if a fiber pig-tailed output is not required, mirror 611 as well as output coupler 609 can be omitted, and the 4% reflection from the fiber end adjacent to mirror 611 can be used as an effective output mirror. Such an implementation is not separately shown.

Figure 26:
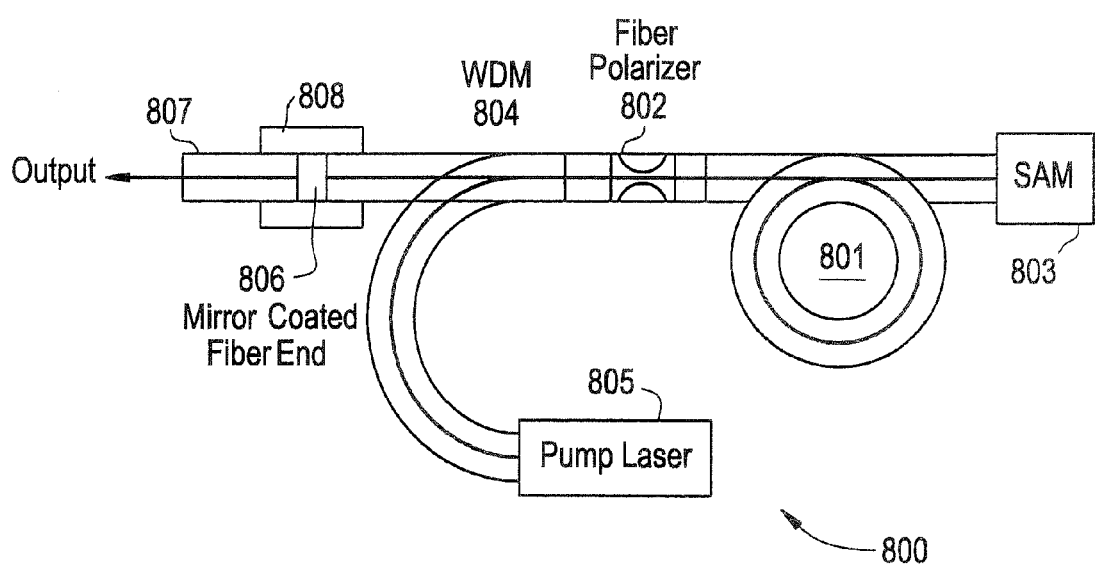
FIG. 26 is a diagram of a cladding pumped fiber cavity design using an intra-cavity output coupler according to an embodiment of the invention.

Alternatively, a fiber-pig-tail can be butt-coupled to mirror 611 and also be used as an output fiber pigtail. Such an implementation is shown in FIG. 26. Here, cavity 800 comprises core-pumped fiber 801, fiber polarizer 802 and SAM assembly 803. The laser is pumped via WDM 804 connected to pump laser 805. An appropriate mirror (or mirror coating) 806 is attached to one end of the cavity to reflect a part of the intra-cavity light back to the cavity and to also serve as an output mirror element. Fiber pig-tail 807 is butt-coupled to the fiber laser output mirror 806 and an additional ferrule 808 can be used to stabilize the whole assembly. The polarization axes of fiber 807 and 801 can be aligned to provide a linearly polarized output polarization. Again, applying a Jones matrix analysis, cavity 800 is more stable than cavity 600, because it comprises only one intra-fiber polarizing section. The maximum leakage in cavity 800 compared to a cavity comprising directly concatenated WDM and gain fiber sections is 50% smaller.

Figure 27:
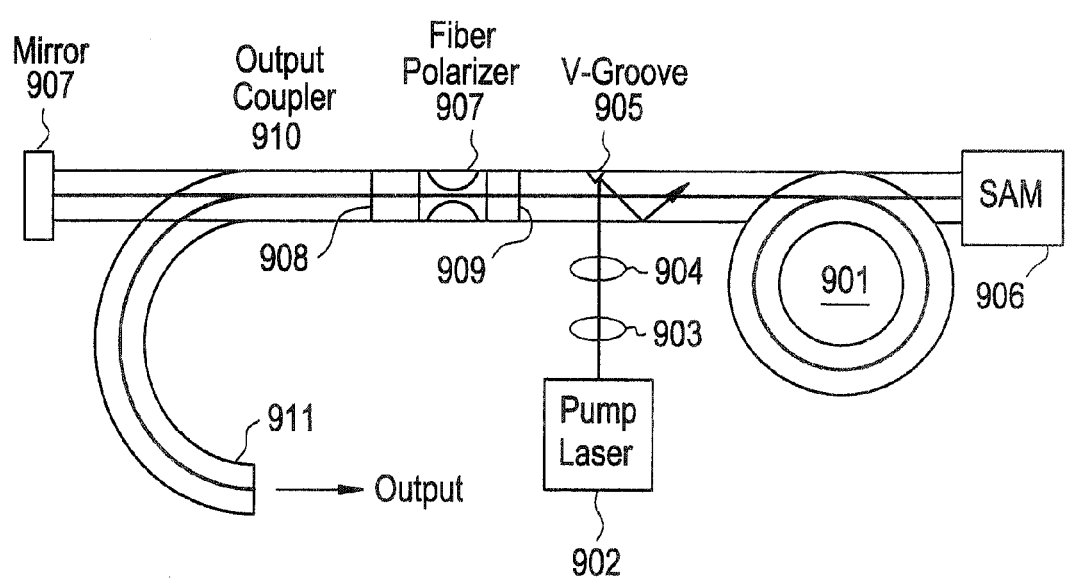
FIG. 27 is a diagram of a cladding pumped fiber cavity design using intra-cavity fiber output couplers according to an embodiment of the invention.

Similarly, a cladding pumped version of cavity 600 can be constructed. Cavity 900 shown in FIG. 27 displays such a cavity design. Fiber 901 is pumped via pump laser 902, which is coupled to fiber 901 via lens assembly 903 and 904 as well as V-groove 905. Alternatively, polarization-maintaining multi-mode fiber couplers or star-couplers could be used for pump power coupling. Such implementations are not separately shown. One end of the laser cavity is terminated with SAM assembly 906 (as discussed in regard to FIGS. 17, 23 and 24, which is also used as the modelocking element. A single-polarization inside the laser is selected via all-fiber polarizer 907, which is spliced into the cavity via splices 908 and 909. Polarization-maintaining output coupler 910 is used for output coupling. The laser output is extracted via fiber end 911, which can further be spliced to additional amplifiers. Cavity mirror 912 terminates the second cavity end. Output coupler 910 can further be omitted and the laser output can be obtained via a butt-coupled fiber pig-tail as explained with reference to FIG. 30.

The cavity designs discussed with respect to FIGS. 17, 23, 24, 26 and 27 follow general design principles as explained with reference to FIGS. 28*a*-28*c*.

Figure 28A:
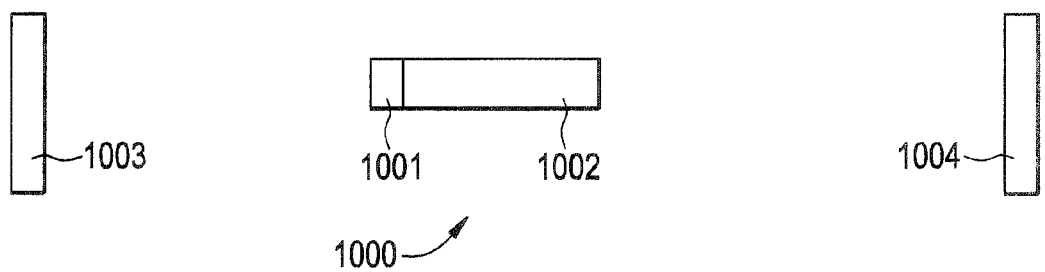
FIG. 28a is a diagram of a passively modelocked fiber laser based on concatenated sections of polarization maintaining and non-polarization maintaining fiber sections according to an embodiment of this invention.

FIG. 28*a* shows a representative modelocked Fabry-Perot fiber laser cavity 1000, producing a linear polarization state oscillating inside the cavity containing one (or more) sections of non-polarization maintaining fiber 1001 and one (or more) sections of polarization maintaining fiber 1002, where the length of fiber section 1001 is sufficiently short so as not to degrade the linear polarization state inside the fiber laser cavity, more generally a predominantly linear polarization state is oscillating everywhere within the intracavity fiber. The fiber laser output can be obtained from cavity end mirrors 1003 or 1004 on either side of the cavity. To suppress the oscillation of one over the other linear polarization state inside the cavity, either fiber 1001 or 1002 has a polarization dependent loss at the emission wavelength.

Figure 28B:
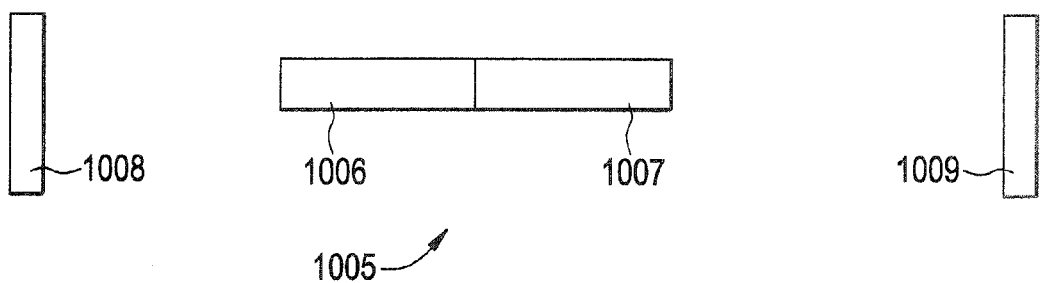
FIG. 28b is a diagram of a passively modelocked fiber laser based on concatenated sections of long polarization maintaining fiber sections according to an embodiment of this invention.

FIG. 28b shows a representative modelocked Fabry-Perot fiber laser cavity 1005, producing a linear polarization state oscillating inside the cavity containing two (or more) sections of polarization maintaining fibers 1006, 1007, where the length of fiber sections 1006, 1007 is sufficiently long so as to prevent coherent interaction of short optical pulses oscillating inside the cavity and propagating along the birefringent axes of fibers 1006, 1007. Specifically, for an oscillating pulse with a FWHM width of $\tau$, the group delay of the oscillating pulses along the two polarization axes of each fiber should be larger than $\tau$. For oscillating chirped pulses $\tau$ represents the bandwidth-limited pulse width that corresponds to the oscillating pulse spectrum. Cavity 1005 also contains end mirrors 1008 and 1009 and can further contain sufficiently short sections of non-polarization maintaining fiber as discussed with reference to FIG. 28a.

Figure 28C:
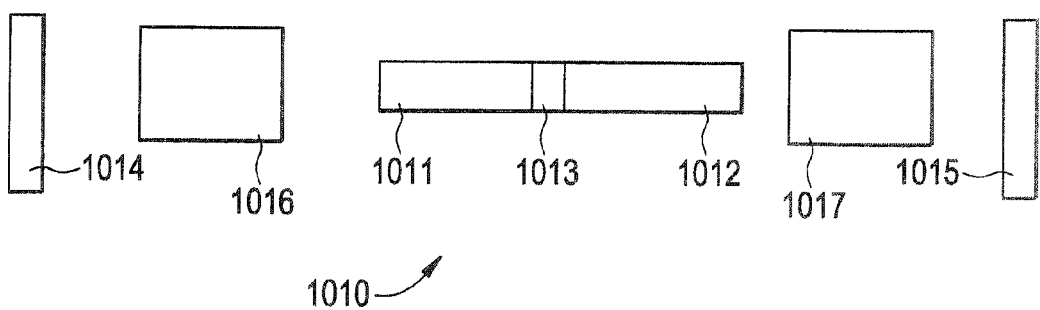
FIG. 28c is a diagram of a passively modelocked fiber laser based on short concatenated sections of polarization maintaining fiber and additional sections of all-fiber polarizer according to an embodiment of this invention.

FIG. 28c shows a representative modelocked Fabry-Perot fiber laser cavity 1010, producing a linear polarization state oscillating inside the cavity containing one (or more) sections of polarization maintaining fiber 1011, 1012 and one (or more) sections of polarizing fiber (or all-fiber polarizer) 1013, where the length of fiber sections 1011, 1013 is not sufficient to prevent coherent interaction of short optical pulses oscillating inside the cavity and propagating along the birefringent axes of fibers 1011, 1013, where the polarizing fiber is sandwiched between the sections of short polarization maintaining fiber. Cavity 1010 further contains cavity end mirror 1014 and 1015 and can further contain short sections of non-polarization maintaining fiber as discussed with reference to FIG. 28a. Moreover, cavity 1010 (as well as 1000 and 1005) can contain bulk optic elements 1016, 1017 (or any larger number) randomly positioned inside the cavity to provide additional pulse control such as wavelength tuning or dispersion compensation. Note that the fibers discussed here can be single-clad, double-clad; the fibers can comprise also holey fibers or multi-mode fibers according to the system requirement. For example polarization maintaining holey fibers can be used for dispersion compensation, whereas multi-mode fibers can be used for maximizing the output pulse energy. Cavity mirrors 1014, 1015, 1003, 1004 and 1008, 1009 can further comprise bulk mirrors, bulk gratings or fiber gratings, where the fiber gratings can be written in short sections of non-polarization maintaining fiber that is short enough so as not to perturb the linear polarization state oscillating inside the cavity.

Figure 29:
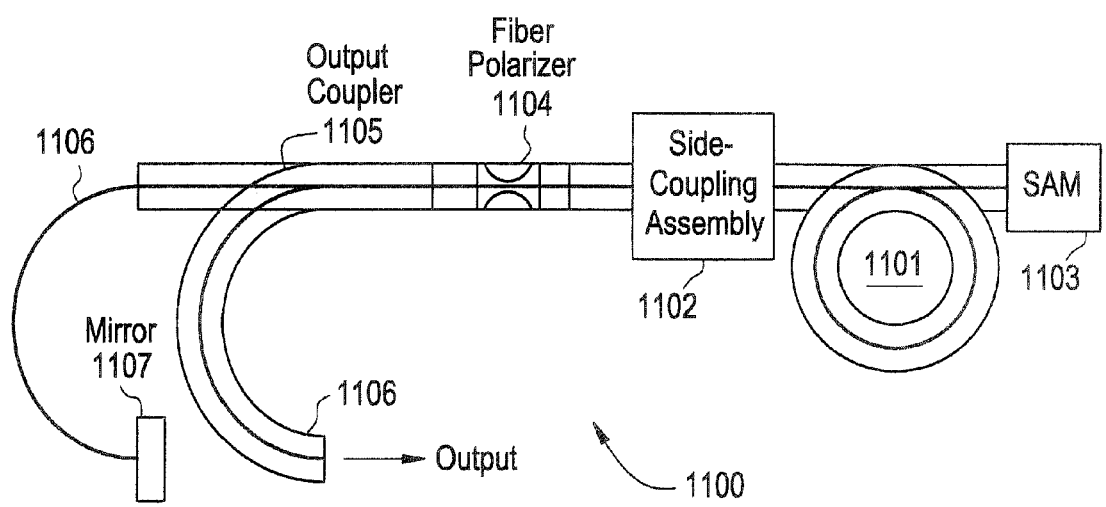
FIG. 29 is a diagram of a dispersion compensated fiber laser cavity according to an embodiment of this invention.

FIG. 29 serves as an example of a passively modelocked linear polarization cavity containing holey fiber for dispersion compensation. Cavity 1100 contains fiber 1101, side-pumping assembly 1102 (directing the pump light either into the cladding or the core of fiber 1101 as explained before), saturable absorber mirror assembly 1103, all fiber polarizer 1104 and fiber output coupler 1105 providing an output at fiber end 1106. All the above components were already discussed. In addition, a length of polarization maintaining holey fiber 1006 is spliced to the cavity for dispersion compensation and the cavity is terminated on the left hand side by mirror 1107.

Figure 30:
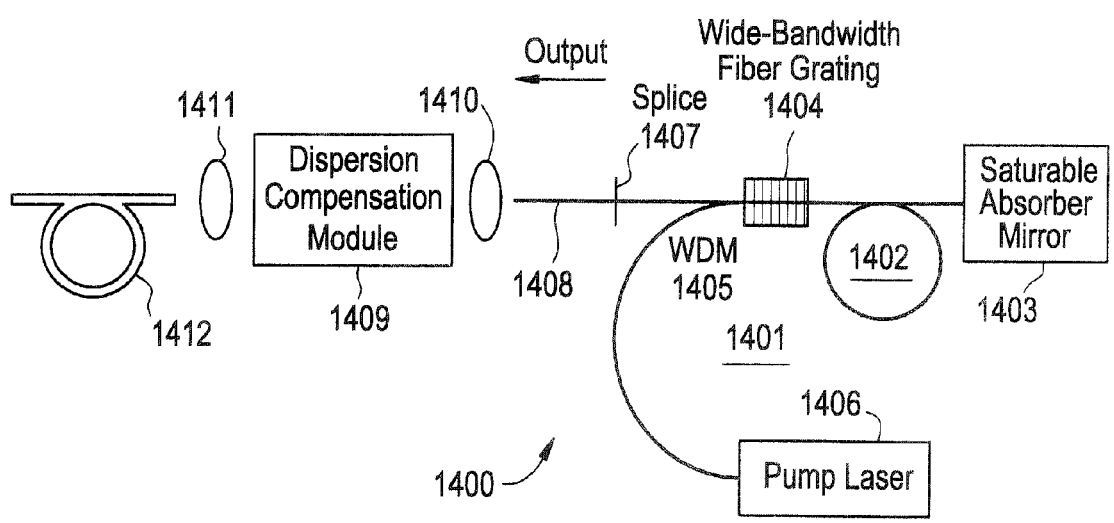
FIG. 30 is a diagram of a dispersion compensated fiber laser cavity according to an alternative embodiment of this invention, including means for additional spectral broadening of the fiber laser output.

FIG. 30 serves as another example of a passively modelocked linear polarization cavity containing a fiber grating for dispersion compensation as applied to the generation of ultra-stable spectral continua. System 1400 comprises a small modification of the cavity explained with respect to FIG. 23. System 1400 contains a fiber laser 1401 generating pulses with a bandwidth comparable to the spectral bandwidth of the fiber gain medium 1402. Fiber laser 1401 further comprises saturable absorber mirror assembly 1403, wide bandwidth fiber grating 1404, polarization maintaining wavelength division multiplexing (WDM) coupler 1405, which is used to direct pump laser 1406 into fiber gain medium 1402. Pump laser 1406 is preferably single-mode to generate the least amount of noise.

To enable the oscillation of short pulses with a bandwidth comparable to the bandwidth of the gain medium 1402, saturable absorber mirror 1403 contains a bi-temporal saturable absorber, constructed with a bi-temporal life-time comprising a $1^{st}$ short life-time of <5 ps and a $2^{nd}$ long life-time of >50 ps. More preferable is a first life-time of <1 ps, to allow pulse shaping of pulses as short as 100 fs and shorter. By selecting the penetration depth of the implanted ions into the saturable absorber, even tri-temporal saturable absorbers can be constructed.

The wide-bandwidth grating is preferably selected to approximately match the dispersion of the intra-cavity fibers. The wide-bandwidth grating can be made in short non-polarization maintaining fibers and it can be made also in polarization maintaining fibers. In order to suppress detrimental effects from cross coupling between the two polarization axes of the fiber grating, coupling to cladding modes in such large bandwidth fiber gratings should be suppressed. Gratings with suppressed coupling to cladding modes can be made in optical fibers with photosensitive core and cladding area, where the photosensitive cladding area is index-matched to the rest of the cladding. Such fiber designs are well known in the state of the art and can for example be manufactured with an appropriate selection of germania and fluorine doping in the core and cladding regions and such fiber designs are not further discussed here. Because of the large generated bandwidth, splicing of such polarization maintaining gratings to the rest of the cavity without coherent coupling between the linear polarization eigenmodes is no problem. Alternatively, the fiber gratings can be written directly into the photosensitive gain fiber, with an index and dopant profile that suppresses coupling to cladding modes in the fiber grating.

To sustain large spectral bandwidth, fiber grating 1404 has preferably a spectral bandwidth>20 nm. A splice 1407 (or an equivalent bulk optic lens assembly) is used to connect the output of fiber laser 1401 to nonlinear fiber 1408 to be used for additional spectral broadening of the output of the fiber laser. For example fiber 1408 can comprise a highly nonlinear dispersion-flattened holy fiber. In conjunction with such fiber, smooth broad-bandwidth spectral profiles with bandwidths exceeding 100 nm can be generated. These spectral outputs can be used directly in high precision optical coherence tomography.

The pulses at the output of fiber 1408 are generally chirped and a dispersion compensation module 1409 can be inserted after the output from fiber 1408 for additional pulse compression. The dispersion compensation module can be spliced directly to fiber end 1408 when optical fiber is used for dispersion compensation. Alternatively, the dispersion compensation module can comprise two (or one) bulk grating (or prism) pair(s). Such bulk optic elements for dispersion compensation are well known in the state of the art and are not further discussed here. Coupling into and out of a bulk dispersion compensating module is obtained via lenses 1410 and 1411. The output can also be from the other end of the cavity. The pulses generated after pulse compression can be as short as 20-200 fs. As mentioned previously this pulse compression module is optional and the dispersion compensation needed for this oscillator can be compensated by the pulse stretcher before and pulse compressor after the regenerative amplifier.

A fiber amplifier 1412 can also be added if further pulse energy is necessary.

Note that the discussion with respect to FIG. 30 serves only as an example of the use of bi- or multi-temporal saturable absorbers in the generation of mass producible ultra-broad band, low noise spectral sources. Other modifications are obvious to anyone skilled in the art. These modifications can comprise for example the construction of an integrated all-fiber assembly substituting elements 1408, 1409-1411 and 1412.

Though the discussion of the laser system with respect to FIG. 30 was based on the use of polarization maintaining fiber, non polarization maintaining fiber can also be used to produce pulses with bandwidth comparable to the bandwidth of the gain medium. In this case, saturable absorbers with depth controlled ion implantation are also of great value. Essentially, any of the prior art modelocked fiber laser systems described above (that were using saturable absorbers) can be improved with engineered bi- and multi-temporal saturable absorbers. Specifically, any of the cavity designs described in U.S. Pat. Nos. 5,450,427 and 5,627,848 to Fermann et al. can be used for the generation of ultra broadband optical pulses in conjunction with bi- or multi-temporal saturable absorbers and wide-bandwidth fiber Bragg gratings.

Figure 31:
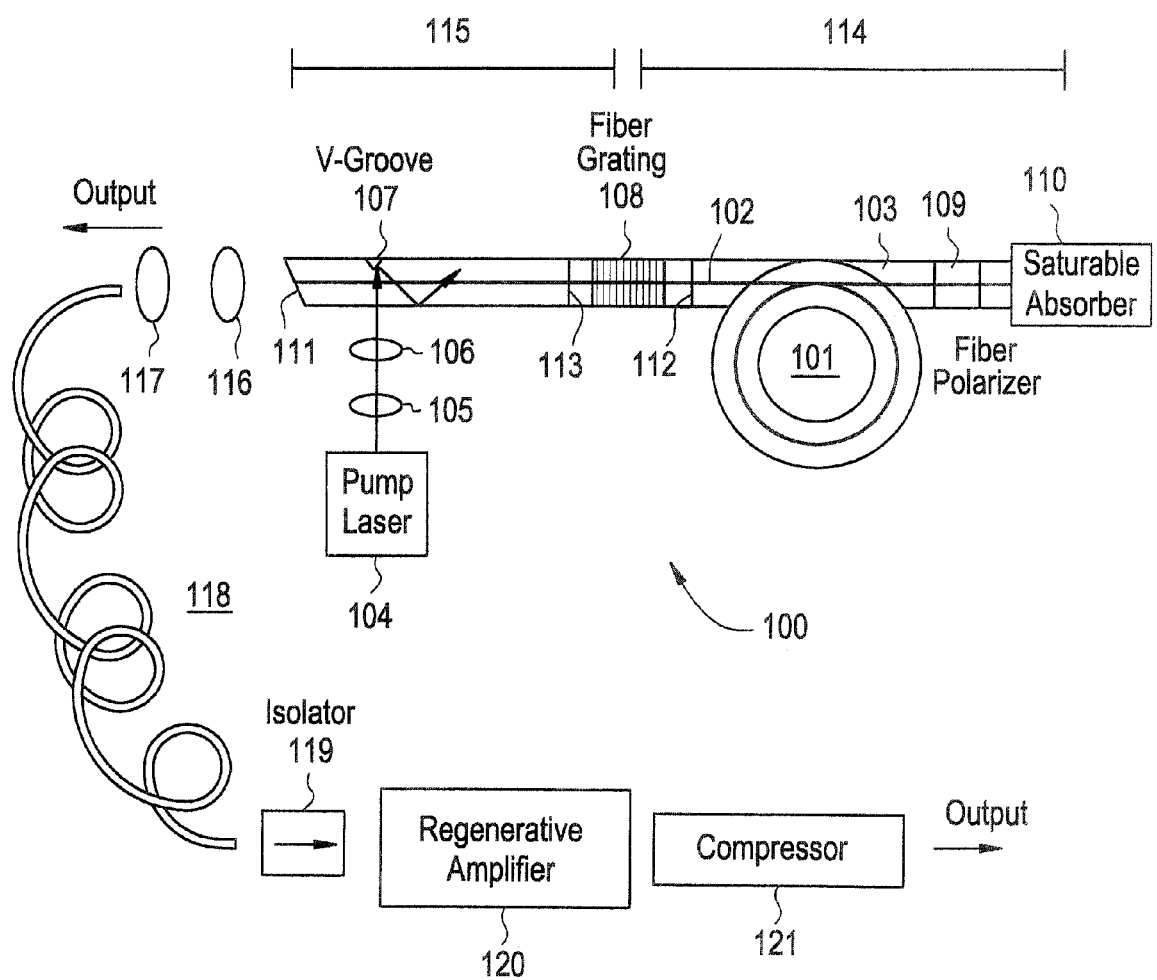
FIG. 31 is a diagram of a design based on a fiber based MOPA having the fewest bulk optical components, according to a further embodiment.

An embodiment with the fewest bulk optic components in the optical path is shown in FIG. 31. The source of ultrashort pulses is a fiber-based MOPA 100. This source is described in detail in Ser. No. 10/814,502 which is incorporated herein. A polarization-maintaining gain fiber 101 has a core 102 and cladding region 103. The fiber core 102 is doped with rare-earth ions, preferably Yb, to produce gain at a signal wavelength when the laser is pumped with diode laser 104. The pump diode is coupled into the cladding region 103 of fiber 101 using for example two lenses 105 and 106 and V-groove 107, though coupling systems comprising more than two lenses can be used. Alternatively a WDM and a single mode laser diode can be used for in core optical pumping. The fiber core can be single-mode or multi-mode. The multi-mode fiber is designed to propagate single mode as is described in U.S. application Ser. No. 09/785,944 (incorporated by reference herein). The multi-mode fiber can also be multi-mode photonic crystal fiber as is described in Ser. No. 10/844,943 (incorporated herein). The fiber laser cavity 100 further contains a fiber Bragg grating 108, written in polarization maintaining fiber, an optional polarizer (fiber or bulk) 109 and a saturable absorber assembly 110. A bulk polarizer such as a cube polarizer is preferred. Fiber grating 108 can be chirped or un-chirped, where the polarization cross talk between the two polarization axes of the polarization maintaining fiber containing the fiber gratings is preferably less than 15 dB. Fiber end face 111 completes the basic MOPA system. The fiber Bragg grating can be written directly into fiber 101 or it can be spliced into the MOPA system at splice positions 112 and 113, where the polarization axes of all involved fibers are aligned with respect to each other. The MOPA comprises an oscillator assembly 114 and an amplifier assembly 115. The oscillator assembly 114 is bounded on the left hand side by fiber grating 108 and on the right hand side by saturable absorber assembly 110. The amplifier assembly 115 is bounded by fiber grating 108 and fiber end 111 on the two opposite distal ends. In the present example fiber 101 is used both in the amplifier section and in the amplifier section. In general, however, different fibers can be used in the oscillator and amplifier, though to avoid feedback from the amplifier into the oscillator, the refractive index of both oscillator and amplifier fiber should be closely matched. The chirp of the output pulses can be conveniently compensated with the delivery fiber 118, where lenses 116 and 117 are used to couple the output from the MOPA into the delivery fiber. Other pulse modification elements can be placed between the lenses such as an isolator, tunable filter or fiber gratings. The delivery fiber can comprise standard silica step-index fiber, holey fiber or photonic crystal fiber. The use of photonic crystal for dispersion compensation and pulse delivery was previously disclosed in Ser. No. 10/608,233. The delivery fiber 118 can also be spliced directly to fiber end face 111, enabling a further integration of the laser assembly. The delivery fiber can also be sufficiently long to stretch the pulse sufficiently for amplification in the regenerative amplifier. The need for a compressor depends on the exact design of the regenerative amplifier.

Figure 32:
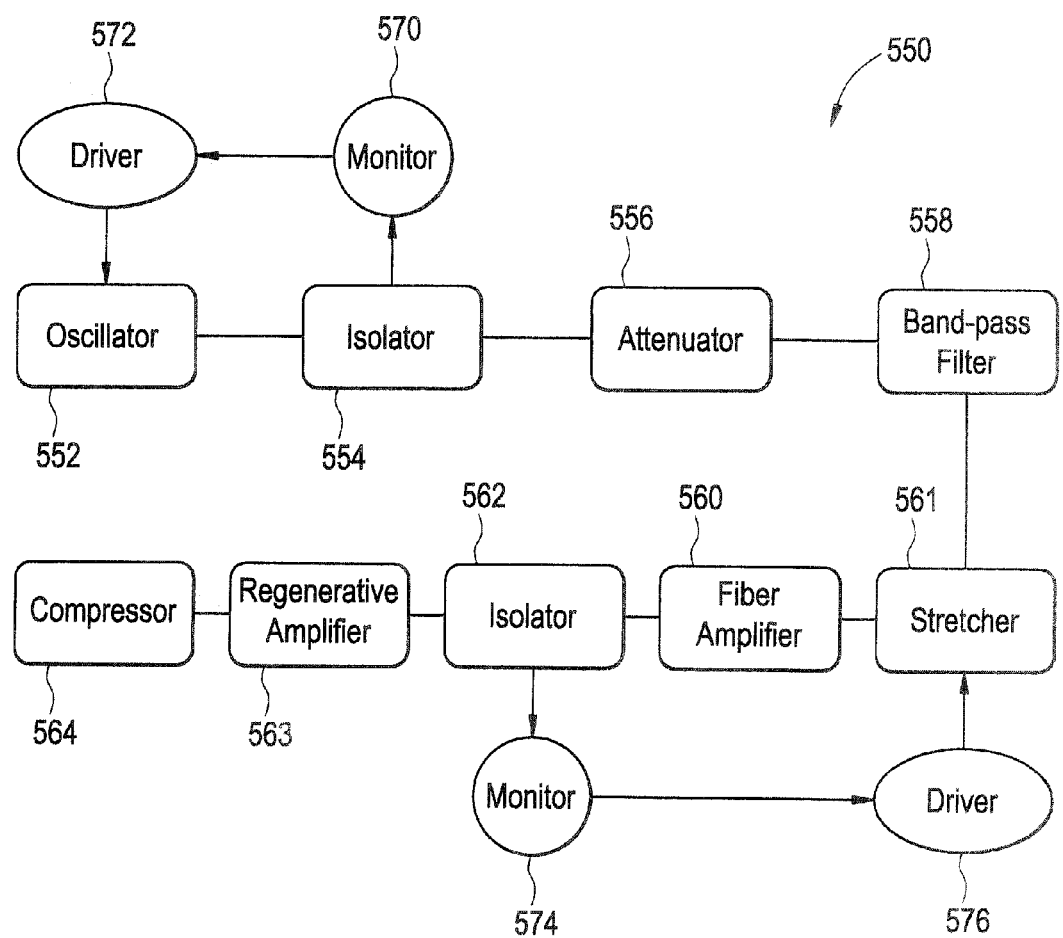
FIG. 32 is an embodiment which includes monitoring electronics and feedback control of a fiber based pulse source.

The embodiment in FIG. 31 may be the simplest design, however the pulse conditioning shown in FIG. 1 and described in Ser. No. 10/960,923 are often necessary to obtain the needed specifications from the ultrafast source. Ser. No. 10/814,319 (incorporated by reference herein) teaches how to utilize various modules for pulse conditioning for a fiber laser source. Ser. No. 10/813,163 (incorporated by reference herein) describes utilizing some of these methods in a fiber chirped pulse amplification system. These pulse conditioning methods can be utilized in a regenerative amplifier system. FIG. 32 illustrates one embodiment of a laser system 550 having a monitoring and feedback control capability. In one embodiment of the laser system, monitoring the performance such as output power at some point(s) of the system and providing feedback to the diode pump drivers for active control can achieve a stable operation. FIG. 10 illustrates one embodiment of a laser system 550 having such a monitoring and feedback feature. The exemplary laser system 550 comprises an oscillator 552 coupled to an attenuator 556 via an isolator 554. The output from the attenuator 556 is fed into a bandpass filter 558 whose output is then directed to a stretcher 561 and then an amplifier 560. The output from the amplifier 560 is fed into the regenerative amplifier 563 and then a compressor 564 via an isolator 562. It should be noted that the use of the attenuator 556 and the bandpass filter 558 are exemplary, and that either of these components may be excluded and any other modular components, including those disclosed herein, may be used in the laser system having feedback.

As shown in FIG. 32, the laser system 550 further comprises a first monitor component 570 that monitors a performance parameter of the system after the oscillator 552. The monitor 570 may comprise a sensor and controller. The monitor 570 may issue adjustment commands to a first driver 572 that implements those adjustment commands at the oscillator 552.

The exemplary laser system 550 is shown to further comprise a second monitor component 574 that monitors a performance parameter of the system after the amplifier 560. The monitor 574 may similarly comprise a sensor and controller. The monitor 574 can then issue adjustment commands to a second driver 576 that implements those adjustment commands at the amplifier 560.

The monitoring of the system performed by the exemplary monitors 570 and/or 574 may comprise for example an optical detector and electronics that monitors optical intensity or power or other relevant parameter such as, e.g., frequency and spectrum. In response to such measurement, the monitor and the driver may induce changes in the oscillator and/or the amplifier by for example adjusting the pump intensity and/or rate, or adjusting the operating temperature. Temperature control of the oscillator can stabilize the gain dynamics as well as frequency fluctuations. Temperature control of the amplifier can also be used to stabilize the gain dynamics.

Figure 37:
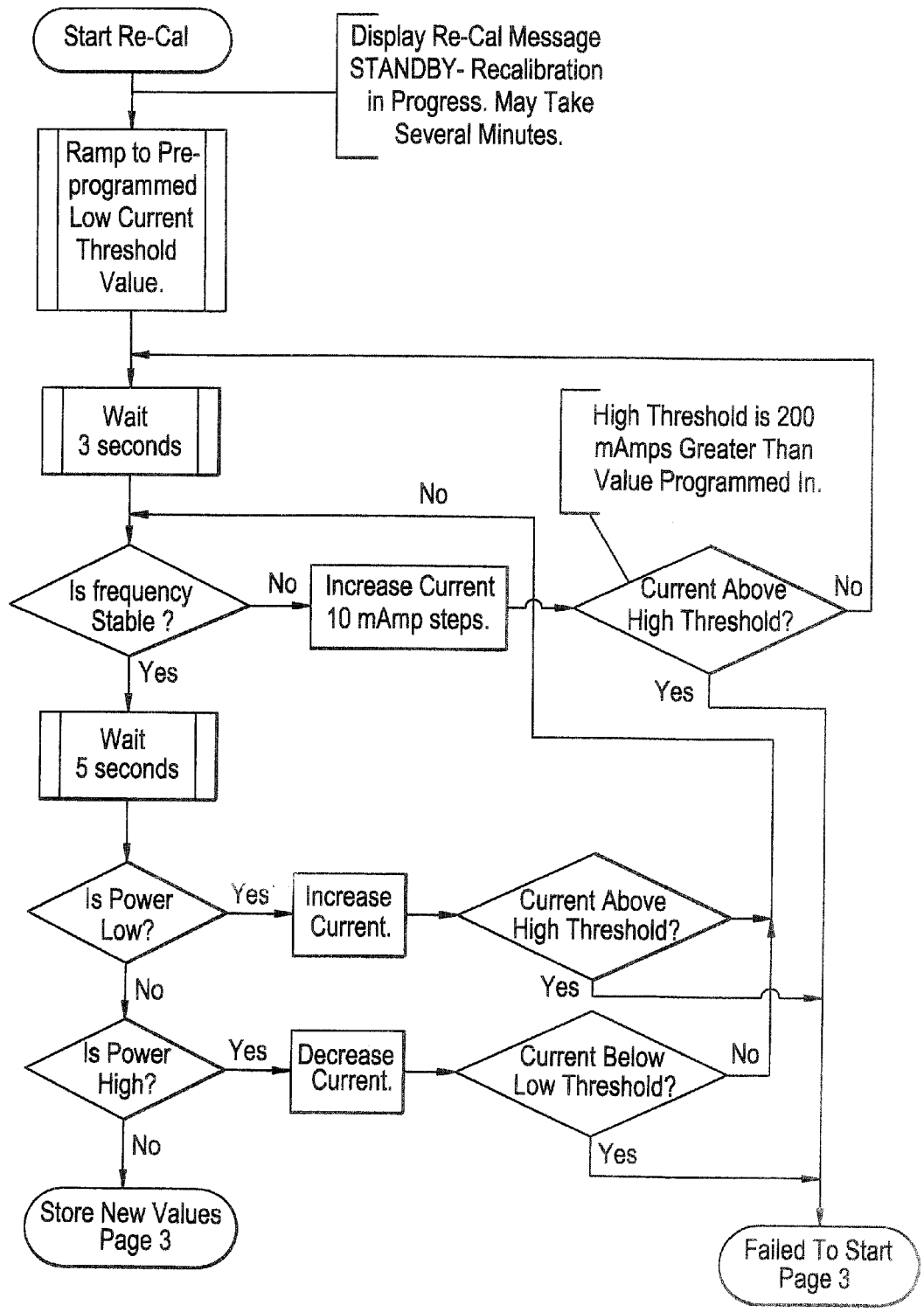
FIG. 37 illustrates an algorithm for a control system for ensuring mode-locking

Other configurations for providing feedback to control the operation of the laser system may also be employed. For example, more or less feedback loops may be included. The electronics associated with these feedback loops are further described in Ser. No. 10/813,173 (incorporated by reference herein). A particularly important electronic control is to control the gain of the fiber amplifier. At 1 KHz repetition rate and lower, the gain of the fiber amplifier could be reduced between pulses to conserve the lifetime of the laser diode. Also the gain needs to be reduced on the fiber amplifier if a signal is lost from the short pulse source to protect from optical damage to the fiber amplifier or subsequent optical elements. The loops may involve electronics that perform operations such as calculations to determine suitable adjustments to be introduced. Examples are the mode-lock start-up and search algorithms. The start-up algorithm is shown in FIG. 37. The feedback may be obtained from other locations in the system and may be used to adjust other components as well. The embodiments described in connection with FIG. 32 should not be construed to limit the possibilities.

A good Polarization Extinction Ratio (PER) is an important factor in maintaining good temporal pulse quality in a fiber-based ultrafast source for a regenerative amplifier. Poor polarization extinction creates ripple on the spectrum and on the chirped pulse. In various preferred embodiments, the light in the laser is linearly polarized. The degree of the linear polarization may be expressed by the polarization extinction ratio (PER), which corresponds to a measure of the maximum intensity ratio between two orthogonal polarization component. In certain embodiments, the polarization state of the source light may be maintained by using polarization-maintaining single-mode fiber. For example, the pigtail of the individual modular device may be fabricated with a polarization-maintaining fiber pigtail. In such cases, the PER of each modular stage may be higher than about 23 dB. Ensuring a high polarization extinction ratio throughout a series of modules is challenging despite the use of single mode polarization maintaining fiber. Degradation of the PER can occur at the fiber ferrule, fiber holder, or fusion splice in the series of modules.

Levels of PER above 23 dB may be obtained in a system by utilizing linear-polarizing optical components in the modules. Use of linear-polarizing components in the modules within systems that contain polarization degrading elements such as a fiber ferrule, fiber holder, or fusion splice is advantageous. The linear polarizers counter the superposition of the phase shift from each polarization degrading element. A superposed phase shift of 10 degrees may reduce the PER to about 15 dB in which case intensity fluctuation through a linear polarizer might be more than about 4%. In contrast, by embedding linear polarizers throughout the series of modules, the PER of the aggregate system can be substantially controlled such that the intensity fluctuation is below about 1%, provided that the PER of the individual module and splice is above about 20 dB.

Figure 33A:
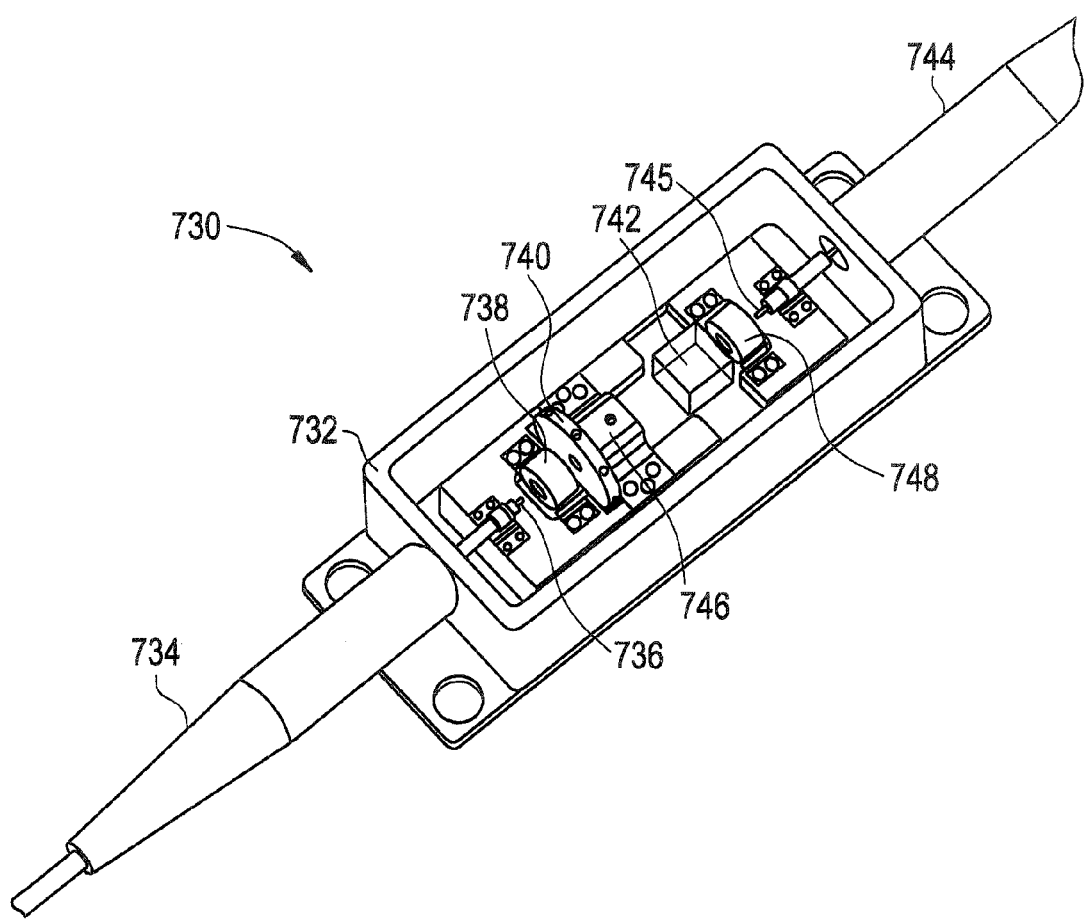
FIG. 33a illustrates a module usable for polarization correction or as variable attenuation in a fiber based laser system.

FIG. 33a illustrates one embodiment of a module that can be utilized for polarization correction or as variable attenuation. It is a variable attenuator module 730 comprising a housing 732 that contains optical components for providing a controllable amount of optical attenuation. The housing 732 may be sealed and thermally insulated as well. A first optical fiber connector 734 comprising an optical fiber 736 having an angle polished or cleaved end face passes through one sidewall of the housing 732 into an inner region of the housing containing the plurality of optical components. These optical components include a first lens 738 for collecting and preferably collimating light output from the optical fiber 736, a variable wave plate 740 and a polarization selective optical element 742. A second optical fiber connector 744 comprising an optical fiber 745 having an angle polished or cleaved end face passes through another sidewall of the housing 732 into the inner region containing the optical components. The variable waveplate 740 comprises a rotatable waveplate mounted on a rotatable wheel 746 and the polarization selective optical element 742 comprises a polarization beamsplitter such as a MacNeille prism. A second lens 748 disposed between the polarization selective optical element 742 couples light between the polarization beamsplitter 742 and the second optical fiber 745. An optical path is formed from the first optical fiber 736 through the waveplate 740 and prism 742 to the second optical fiber connector 744.

The waveplate 740 can be rotated to vary the distribution of light into orthogonal polarizations. The polarization beamsplitter 742 can be used to direct a portion of the light out of the optical path between the first and second fiber connectors 734, 744, depending on the state of the waveplate 740. Accordingly, a user, by rotating the waveplate 740 and altering the polarization of light can control the amount of light coupled between the first and second optical fiber connectors 734, 744 and thereby adjust the level of attenuation.

Preferably, the optical elements such as the first and second lenses 738, 748, the rotatable waveplate 740 and the MacNeille polarizer 742 comprise micro-optics or are sufficiently small to provide for a compact module. The elements in the housing 732 may be laser welded or otherwise securely fastened to a base of the housing. The housing 732 may be sealed and thermally insulated as well. In various preferred embodiments, these modules conform to Telcordia standards and specifications.

Figure 33B:
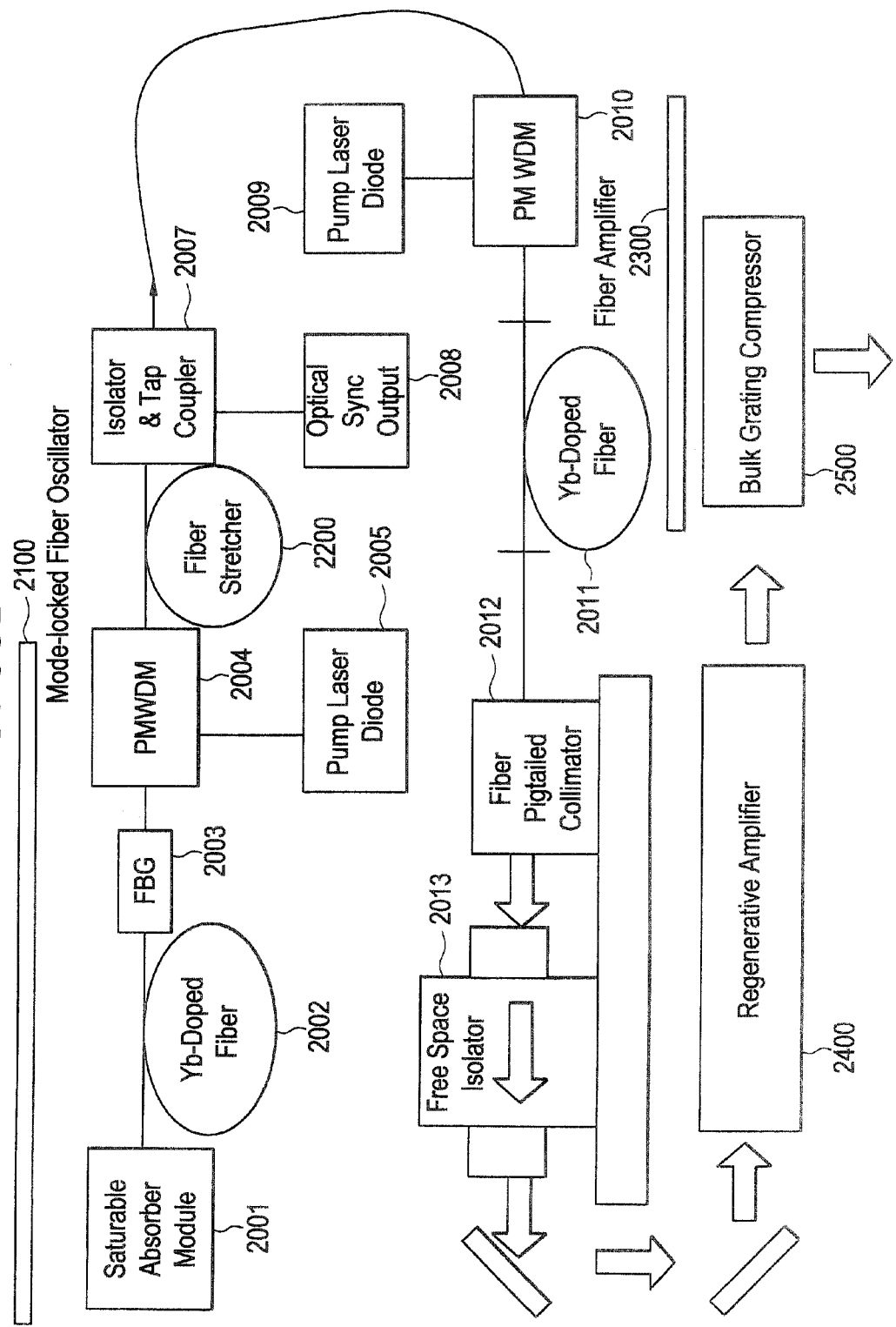
FIG. 33b illustrates a particularly preferred embodiment for a fiber solid-state regenerative amplifier system.

A particularly preferred embodiment for a fiber solid-state regenerative amplifier system (2000) is shown in FIG. 33b. The mode-locked Yb oscillator (2100) operates at near 50 MHz with a chirped pulse width after the fiber stretcher (2200) between 2-100 ps. The mode-locking means is a saturable absorber mirror (2001). The gain is provided by a Yb: doped fiber (2002). The other output coupler is a chirped fiber grating (2003) that also provides for dispersion compensation. The center wavelength is between 1030-1040 nm with a bandwidth between 5-20 nm. The pulse is compressible to 100-300 fs. It is pumped in core by a conventional laser diode (2005) through a polarization maintaining WDM (2004). Side pumping the cladding is also suitable. The pulse energy is nearly 1 nJ after amplification. The fiber amplifier (2300) is slightly nonlinear. The spectral broadening is negligible but is dependent on the input power to the fiber amplifier. The Yb: fiber (2011) is approximately 3 meters long. It is also polarization preserving fiber. The Yb: fiber amplifier gain shapes and frequency shifts slightly the output. It is pumped co propagating by a conventional single mode laser diode (2009) through a polarization maintaining WDM (2010). Counter-propagating pumping and cladding pumping are also suitable. The output from the fiber amplifier is through a bulk collimator (2012) and a bulk isolator (2013). More than one isolator may be necessary at this point. Alternatively, an AOM pulse selector can be added to the end of the amplifier for isolation. A Faraday rotator and polarizer can be used at this point to separate the input of the regenerative amplifier (2400) from the output to the bulk grating compressor (2500). In addition there is an isolator (2007) between the fiber stretcher and fiber amplifier that includes an optical tap. The tap (2007) provides an optical sync output (2008) that is converted to an electrical signal by means of a photodiode. This signal is used to synchronize the regenerative amplifier pulse selector to the mode-locked fiber laser.

Figure 34:
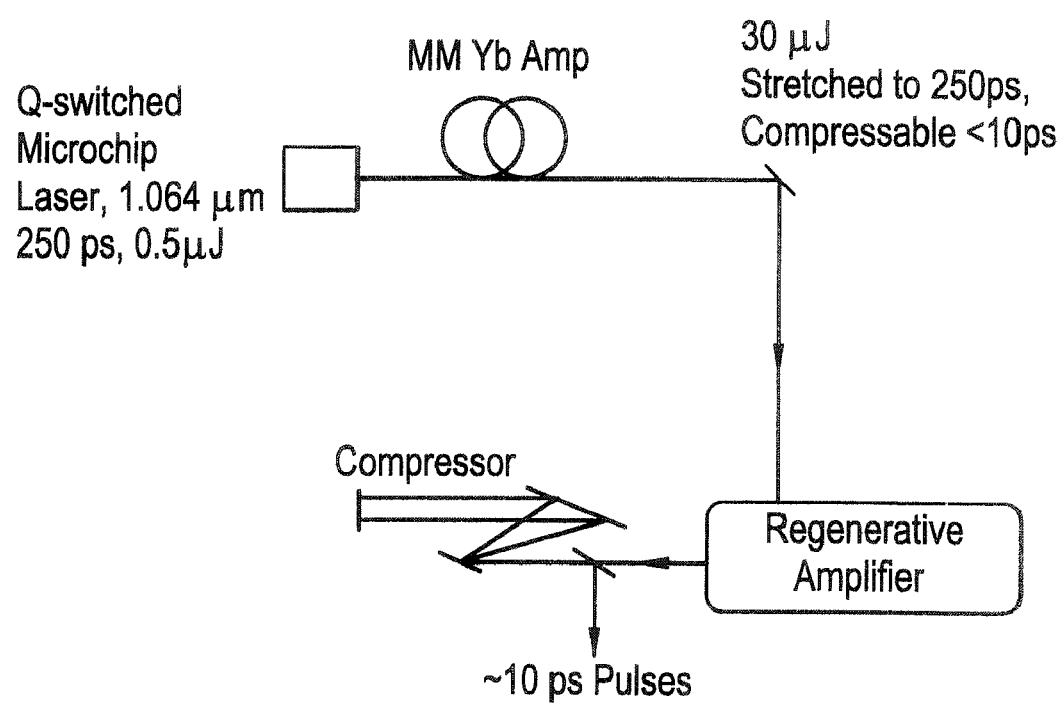
FIG. 34 shows a source of ultra-fast pulses based upon a microchip laser.
Figure 35:
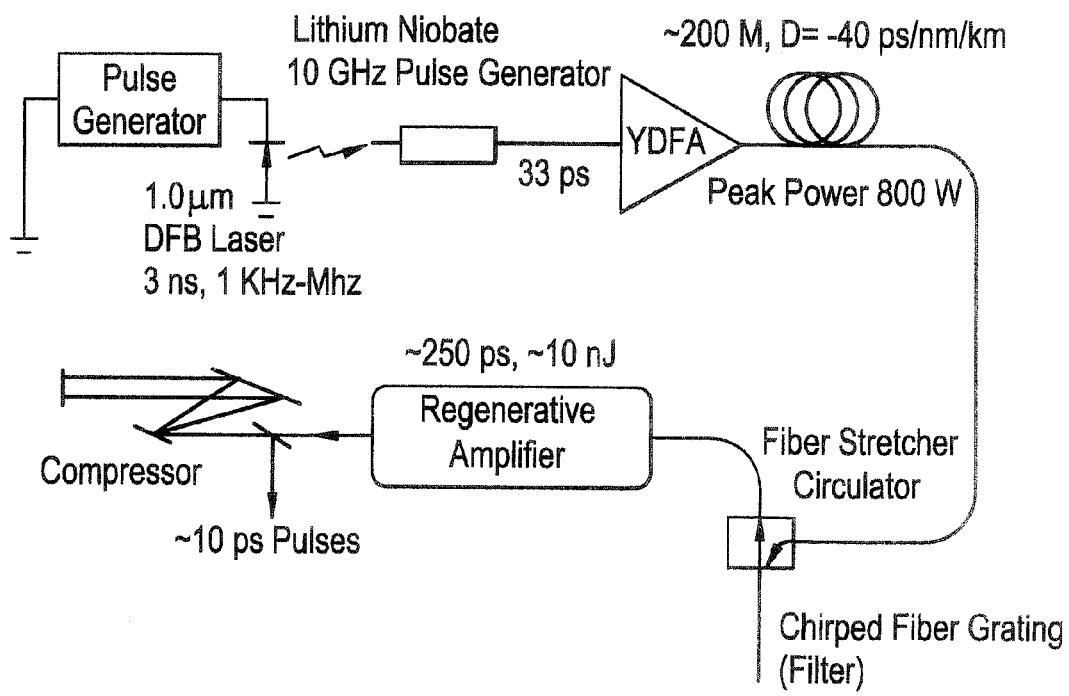
FIG. 35 illustrates a source based on a DFB laser and a lithium niobate pulse generator.

In this next embodiment an alternative source of the ultrafast pulses is a laser-diode or microchip laser. This embodiment is shown in FIGS. 34 and 35. In FIG. 34, the microchip laser is a single longitudinal Nd:vanadate source that provides a smooth temporal profile. The pulse width is 250 picoseconds. One solution for the compression fiber 62 is a standard single mode fiber with a mode field diameter of 5.9 µm and a NA of 0.12. The length of this compression fiber would be about 2 meters to create sufficient spectrum for a compression ratio of around 50. The output energy from microchip lasers can be 10 microjoules. In this case, the light intensity at the entrance face of the fiber will be near the damage threshold. A coreless end cap (not shown) can be used on the fiber so the mode can expand before the surface of the fiber. Otherwise, an amplifier with a larger mode field diameter can be used, such as a multimode fiber that propagates a single mode or a holey fiber amplifier as was used in (Furusawa et al "Cladding pumped Ytterbium-doped fiber laser with holey inner and outer cladding", Optics Express 9, pp. 714-720, (2001)). If a fiber with an order of magnitude higher mode area (mode field diameter of 19.5 µm) is used, then the parameters in the fiber will be the same as in the case with 1 microjoule input. So the fiber length would again be 2 meters.

Since there is no interplay between dispersion and self-phase modulation in this design, the pulse width stays the same as the original pulse width. The nearly linear chirp is created by the shape of the pulse. Such a fiber is normally called a "compression fiber". We propose to replace this "compression fiber" with an amplifier fiber. The output of the amplifier will be a chirped pulse that can be compressed in a compressor. This saves the need of a stretcher.

For pulse energies significantly greater than 1 microjoule, the single mode beam should be further amplified in a multimode fiber. This chirped pulse source is ideal for amplification of ultrashort pulses by chirped pulse amplification in a regenerative amplifier. The pulse is then compressed after amplification. In this case the microchip 71 was operated at 0.5 µJ, and produced 250 ps, pulses and operating at the repetition rate of the regenerative amplifier. The compression fiber 62 is now a multimode amplifier fiber that amplified a single mode with a mode-field diameter of 17 µm. The pulse was then amplified to 30 microjoules where Raman limited the amplification. This pulse is now a chirped 250 ps pulse. It is further amplified in a solid state regenerative amplifier and compressed in a bulk grating compressor to typically less than 1 ps. FIG. 35 illustrates the source generally described in FIG. 3 of U.S. Published Application 20040240037A1, incorporated by reference herein, with modification made to the chirped fiber grating at the end of the source to further stretch the pulses prior to amplification in the regenerative amplifier.

Figure 36:
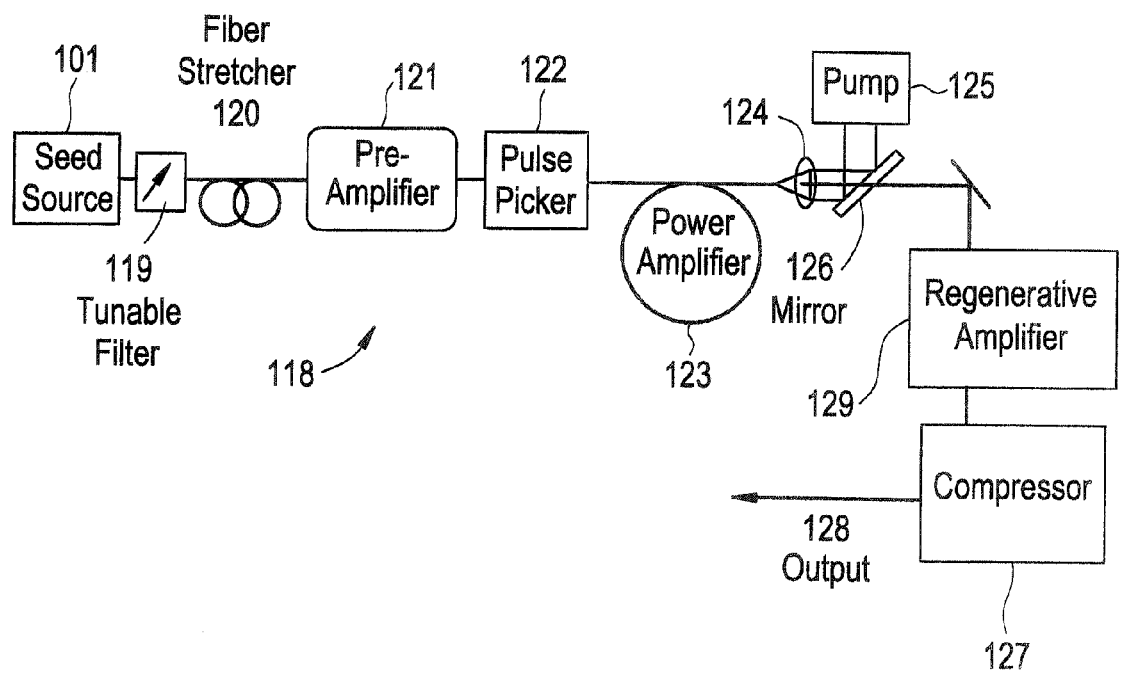
FIG. 36 illustrates a system allowing independent control of higher order dispersion and self-phase modulation.

FIG. 36 illustrates a chirped pulse amplification system that utilizes conventional fiber stretchers, fiber amplifiers, bulk regenerative amplifiers and bulk grating compressors. In order to obtain high quality pulses from such systems, the control of higher-order dispersion and self-phase modulation is critical. A chirped pulse amplification system allowing for independent control of second- and third order dispersion is shown in FIG. 36. In an exemplary embodiment, a seed source 101 based on a passively modelocked Yb fiber laser was used. Such passively modelocked Yb fiber lasers were previously described in application Ser. No. 10/627,069 and are not further described here. The seed source 101 produces positively chirped optical pulses with a bandwidth of 16 nanometers at a repetition rate of 43 megahertz with an average power of 16 milliwatts. The peak emission wavelength of the oscillator was 1053 nanometers. The pulses from the seed source were compressible to a pulse width of less than 150 femtoseconds, demonstrating that the chirp from the seed source was approximately linear. The output from the seed laser passed through an isolator (not shown) and a tunable bandpass filter 119 with a 15 nanometer bandwidth.

After the bandpass filter 119, an output power of 5 milliwatts was obtained and a fiber stretcher 120 was used to stretch the pulses to a width of approximately 100 picoseconds. The fiber stretcher employed for producing stretched pulses had a length of approximately 200 meters and was based on conventional polarization maintaining single-mode step-index fiber. In FIG. 36, the tunable bandpass filter 119 is shown inserted before the fiber stretcher 120; alternatively, the tunable bandpass filter 119 can also be inserted after the fiber stretcher 120 (system implementation is not separately shown).

A subsequent Yb-based polarization maintaining pre-amplifier 121 amplifies the stretched pulses to an average power of 500 milliwatts. A pulse picker 122, based on an acousto-optic modulator and pig-tailed with polarization maintaining fiber, reduces the repetition rate of the pulses to 200 kilohertz, resulting in an average power of 1 milliwatt. The pulses from the pulse picker 122 were subsequently injected into a large-mode polarization maintaining Yb fiber power amplifier 123 and amplified to an average power of 950 milliwatts. The Yb power amplifier had a length of 3 meters and the fundamental mode spot size in the Yb power amplifier was around 25 micrometers. All fibers were either spliced together with their polarization axes aligned or connected to each other (with their polarization axes aligned) with appropriate mode-matching optics (not shown). The power amplifier 123 was cladding pumped via a lens 124 with a pump source 125, delivering a pump power of about 10 watts at a wavelength of 980 nanometers. A beam splitting mirror 126 was implemented to separate the pump light from the amplified signal light. The amplified and stretched pulses from the power amplifier 123 are further amplified in a bulk solid state regenerative amplifier 129. The output pulses from the regenerative amplifier 129 were compressed in a conventional bulk optics compressor 127 based on a single diffraction grating with a groove density of 1200 lines/mm, operating near the Littrow angle. Such bulk optics compressors are well known in the state of the art and are not further explained here. After the bulk optics compressor 127, the output 128 will contain pulses with a full-width half-maximum (FWHM) width of around 330 femtoseconds and pulse energies around 1 millijoule. Alternative designs should be feasible including a system without the power amplifier. However, in this case the power amplifier is operating as the nonlinear fiber amplifier that is able to correct for higher order dispersion mismatch between the fiber stretcher and the bulk compressor.

Because stretched pulses can accumulate significant levels of third-order dispersion in the presence of self-phase modulation, gain-narrowing, gain-pulling and gain depletion, we refer to such pulses as cubicons. More generally, we can define a cubicon as a pulse that produces controllable levels of at least linear and quadratic pulse chirp in the presence of at least substantial levels of self-phase modulation (corresponding to a nonlinear phase delay >1) that can be at least partially compensated by dispersive delay lines that produce significant levels of second and third-order dispersion as well as higher-order dispersion. (Please note that for the compensation of linear pulse chirp, a dispersive delay line with second order dispersion is required, whereas for the compensation of quadratic pulse chirp, a dispersive delay line with third order dispersion is required and so on for higher orders of pulse chirp.) For a dispersive delay line to produce a significant level of $2^{nd}$ and $3^{rd}$ as well as possibly higher-order dispersion, the stretched pulses are typically compressed by more than a factor of 30. In addition cubicons can also be formed in the presence of resonant amplifier dispersion, gain narrowing, gain pulling as well as gain depletion, where we refer to gain depletion as an appreciable reduction in gain due to a single pulse. If a high power mode-locked oscillator an undoped fiber can be utilized to create the self-phase modulation. Spectral filtering will most likely be necessary to obtain the appropriate pulse shape to the chirped pulse. The chirped pulse width will need to be further expanded before amplification in the regenerative amplifier.

The importance of the pulse picker 122 has been described in Ser. No. 10/960,923 in that it alleviates the specifications on the optical switch in the regenerative amplifier. A further advantage is that it can be utilized as a variable attenuator for controlling the buildup time in the regenerative amplifier. An AO switch can be used here, however EO switches and EA switches are available in modules that conform to Telcordia standards and specifications. As pointed out in Ser. Nos. 10/437,057 and 10/606,829, it often takes two switches since the standard on off discrimination is 30 db while for lowering the rep rate from 30 MHz to 1 KHz requires an on off discrimination of more than 50 db for the majority of the energy to be in the one pulse operating at the lower repetition rate. Another use of the pulse picker is as a variable attenuator to control the nonlinearities in the fiber for dispersion correction. In cubicon amplification the nonlinearities are critical for dispersion control and the variable attenuation feature of the pulse pickers is a means for controlling the nonlinear affects in the fibers. Other variable attenuators can be used such as described in Ser. No. 10/814,319. Other means of controlling the nonlinearities of the fiber amplifier are utilizing the control of the fiber amplifier output as described above. These include varying the gain or temperature of the fiber amplifier by measuring the spectrum and or the output intensity from the fiber amplifier. Controlling the spectrum and the intensity accurately for cubicon amplification can be implemented.

Figure 38:
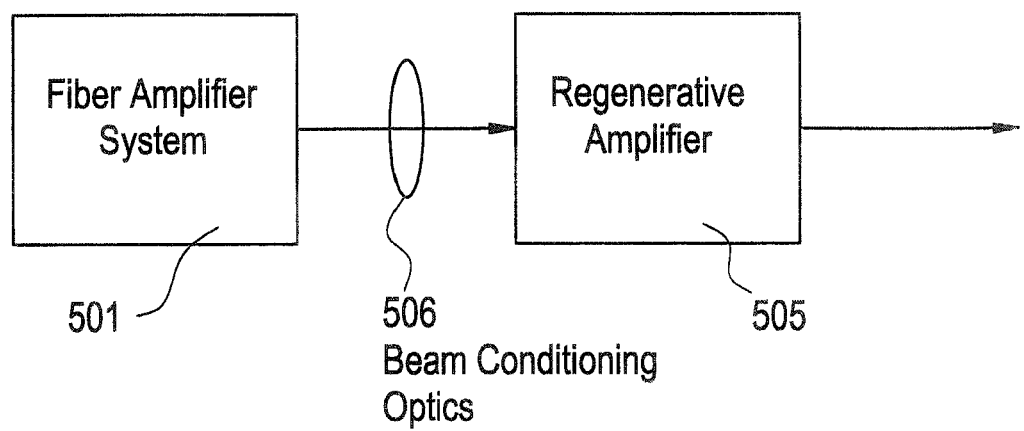
FIG. 38 illustrates an embodiment enabling the gain bandwidth of the regenerative amplifier to be easily matched to the fiber amplifier system.

The embodiment of a short pulse source in the picosecond and nanosecond range amplified in a fiber amplifier and amplified in a bulk amplifier is disclosed in application Ser. No. 10/927,374 (incorporated by reference herein) This system in some cases will have better performance when the bulk amplifier is utilized as a regenerative amplifier. This embodiment is shown in FIG. 38. Fiber amplifier system 501 is described in detail in Ser. No. 10/927,374. The output pulse of the fiber amplifier system 501 is mode-matched by beam conditioning optics 506 to the fundamental mode of the solid state regenerative amplifier 505. The regenerative amplifier 505 utilizes a bulk crystal gain material which is preferably directly diode pumped. The embodiment displayed in FIG. 38 has the advantage that the gain bandwidth of the regenerative amplifier can be matched to the fiber amplifier system. For example 1 ns pulses with a spectral bandwidth of 0.6 nm and a pulse energy exceeding 100 µJ, centered at a wavelength of 1064 nm can be generated in a fiber amplifier chain in conjunction with a diode seed laser, for injection into a Nd:YVO$_4$ amplifier, which has a spectral bandwidth of approximately 0.9 nm. As another example a modelocked Yb-fiber oscillator with center wavelength of 1064 nm and a bandwidth of several nm can be amplified and spectrally narrowed and matched to the gain bandwidth of the Nd:YVO$_4$ solid state amplifier. Thus 100 ps pulses with an energy of around 100 µJ and higher can be generated in a fiber amplifier chain and efficiently amplified in the regenerative amplifier. Without exploitation of spectral narrowing, the pulse energies from fiber amplifier chains designed for the amplification of 100 ps pulses in bulk Nd:YVO$_4$ amplifiers has to be reduced to avoid spectral clipping in the bulk amplifiers. Spectral narrowing is indeed universally applicable to provide high energy seed pulses for narrow line-width solid state amplifiers. For the example of bulk Nd:YVO$_4$ amplifiers, spectral narrowing is preferably implemented for pulse widths in the range of 20 ps-1000 ps.

Figure 39:
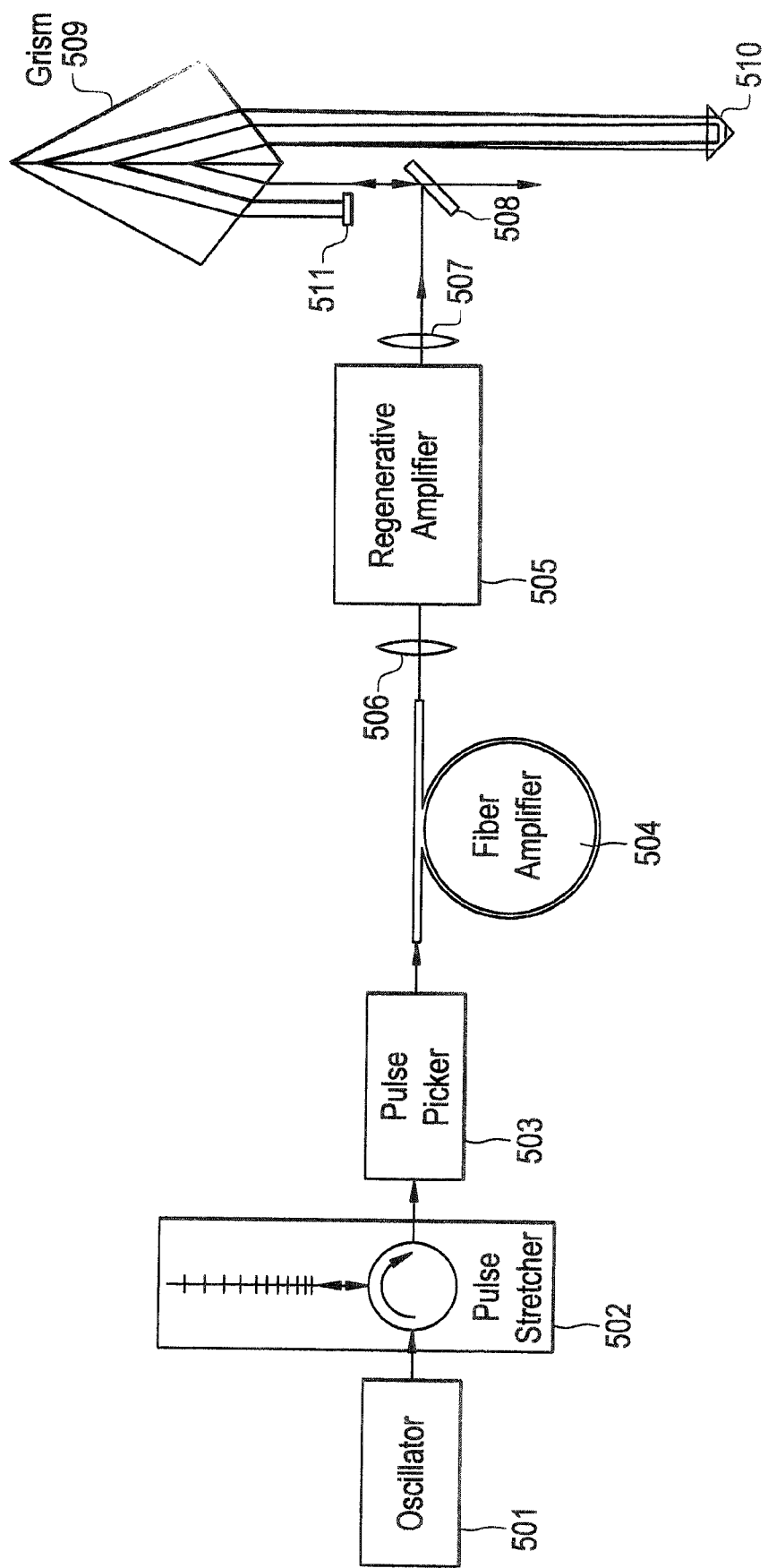
FIG. 39 illustrates a generic scheme for the amplification of the output of a FCPA system in a bulk optical amplifier.

Bulk solid-state regenerative amplifiers are also useful to increase the energy of pulses generated with fiber based chirped pulse amplification systems. Chirped pulse amplification is generally employed to reduce nonlinearities in optical amplifiers. The implementation of chirped pulse amplification is most useful for the generation of pulses with a width<50 ps. Due to the limited amount of pulse stretching and compression that can be achieved with chirped pulse amplification schemes, stretched pulses with an initial pulse width exceeding 1-5 ns are generally not implemented. Hence optical damage limits the achievable pulse energies from state of the art fiber based chirped pulse amplification systems (assuming fiber power amplifiers with a core diameter of 30 µm) to around 1 mJ. Single stage bulk solid state amplifiers can increase the achievable pulse energies normally by a factor of 10 while a regenerative amplifier has a gain of $10^6$. Therefore a regenerative amplifier can be preferable and give flexibility at a cost of complexity. One advantage is significantly lower pulse energies can be utilized from the fiber amplifier. A generic scheme 500 for the amplification of the output of a fiber based chirped pulse amplification system in a bulk optical amplifier is shown in FIG. 39. Here short fs-ps pulses with pulse energies of a few nJ are generated in fiber oscillator 501. The pulses from the oscillator are stretched in pulse stretcher 502 to a width of 100 ps-5 ns. The pulse stretcher is preferably constructed from a chirped fiber grating pulse stretcher as discussed with respect to FIG. 1 and can also be constructed from bulk optical gratings as well known in the state of the art. A pulse picker 503 reduces the repetition rate of the oscillator to the 1 kHz-1 MHz range to increase the pulse energy of the amplified pulses. A fiber amplifier chain represented by a single fiber 504 is further used to increase the pulse energy to the µJ-mJ level. Appropriate mode matching optics 506 is then used to couple the output of amplifier chain 504 into the bulk solid state amplifier 505. Here bulk solid state amplifiers based on rods, slabs as well as thin disk concepts can be implemented. Appropriate bulk amplifier material are based for example on Yb:YAG, Nd:YAG, Nd:YLF or Nd:YVO$_4$, Nd:glass, Yb, glass, Nd:KGW and others. Appropriate bulk amplifier materials and designs are well known in the state of the art and not further discussed here. A collimation lens 507 directs the output of the bulk solid state amplifier to the input of the compressor assembly. To minimize the size of a chirped pulse amplification system employing narrow bandwidth Nd-based crystals such as Nd:YAG, Nd:YLF, Nd:YVO$_4$ or Nd:KGW the use of a grism based compressor is preferred. The optical beam is directed to via mirror 508 to the grism 509 and an additional folding prism 510 is used to minimize the size of the compressor. Mirror 511 completes the compressor assembly. Such compressor assemblies have previously been used to compensate for third-order dispersion in wide-bandwidth chirped pulse amplification systems (i.e. chirped pulse amplification systems with a bandwidth >5 nm); no prior art exists applying grism technology to narrow bandwidth chirped pulse amplification systems (i.e. chirped pulse amplification systems comprising amplifiers with a spectral bandwidth <5 nm).

In an exemplary embodiment, fiber oscillator 501 generates 5 ps pulses, which are stretched by a chirped fiber grating stretcher to a width of 1 ns. After amplification in the fiber amplifier chain a pulse energy of 50 µJ is obtained at a repetition rate of 10 kHz. Further amplification in a Nd:YVO$_4$ solid state booster amplifier generates a pulse energy of 2 mJ. After recompression in the bulk grating compressor 10 ps pulses with an energy of 1 mJ are obtained. To ensure a compact design for the bulk grating compressor, preferably grisms with a groove density of 2800 l/mm are implemented. The whole compressor can then fit into an area of about 0.6×0.2 m by folding the optical beam path only once.

Figure 40:
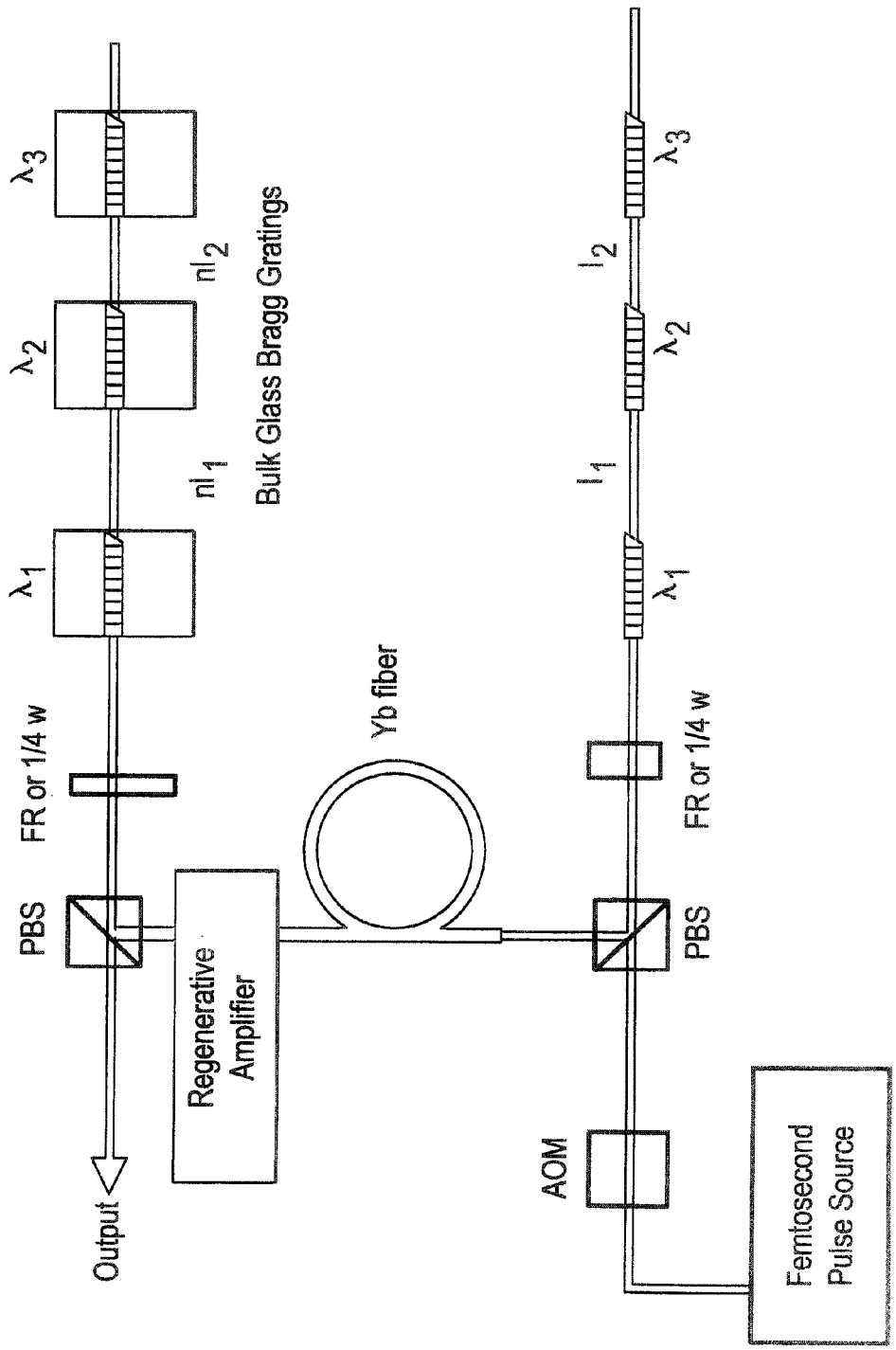
FIG. 40 illustrates an embodiment employing a series of chirped gratings operating on different portions of the spectrum, for elongating the pulse envelope.

As discussed above, a burst of multiple pulses with different wavelengths, different pulse widths and different temporal delays may be desired. Referring to FIG. 40, an embodiment of the laser means 51 is illustrated, which increasing the increasing the possible energy and average power from ultrafast fiber lasers. A longer pulse envelope can be obtained by utilizing a series of chirped gratings that reflect at different wavelengths. After amplification, a similar series of gratings can be placed to recombine/compress the pulses. In FIG. 40, pulses from a femtosecond pulse source are passed through an acousto-optic modulator, a polarized beam-splitter and a Faraday rotator, and are then supplied to a series of chirped fiber stretcher gratings that operate on different portions of the input pulse spectrum. The spacings between the stretcher gratings can be $l_1, l_2, l_3 \ldots$ . In order to reconstruct the pulses after amplification in the fiber amplifier and the regenerative amplifier the spacings between a series of complementary bulk glass Bragg grating compressors are set to $nl_1, nl_2, nl_3, \ldots$, where n is the refractive index of the fiber between the stretcher fiber gratings, assuming that the bulk Bragg compression gratings are separated by air. The reconstructed pulse is output via a second beam splitter. As previously mentioned, the reconstructed pulse is generally the result of incoherent addition of the separately amplified spectral components of the input pulse.

If the distances between the compression and stretcher gratings are not equalized as described above, then multiple pulses will appear at the output. If the distances are not equal between the different sections than the temporal delays will not be equal. This can be beneficial for applications such as micro-machining. By varying the stretching and compression ratios, pulses with different pulse widths can be generated. A single broadband compression grating can be used when generating multiple pulses.

The utilization of the regenerative amplifier is not as flexible as an all fiber amplifier system for modification of the pulse shape. For example, long pulse widths are limited to repetitive features equal to the round trip time of the regenerative amplifier, e.g., approximately 10 nanoseconds. For a regenerative amplifier, the pulse train created by the gratings needs to be less than the round trip time of the regenerative amplifier.

Figure 41:
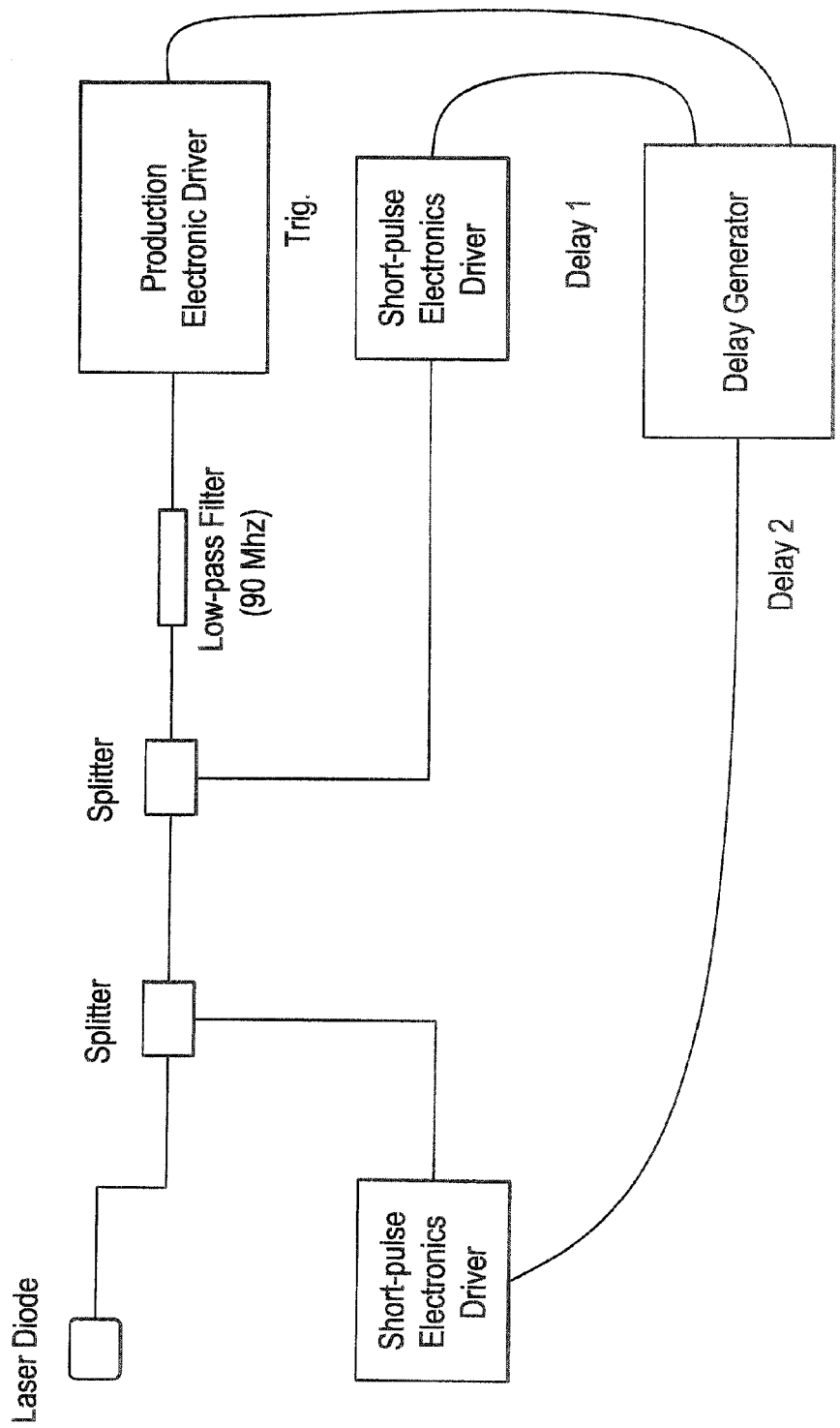
FIGS. 41 and 42 show a laser diode-based multiple pulse source, and a laser system including this source.
Figure 42:
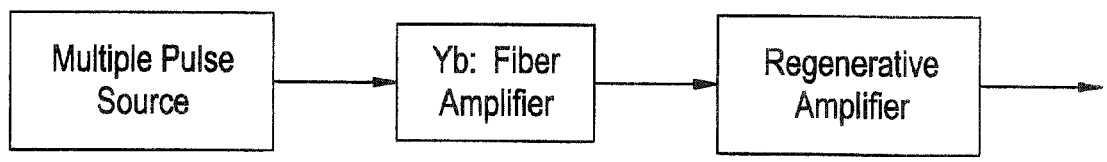
Figure 43A:
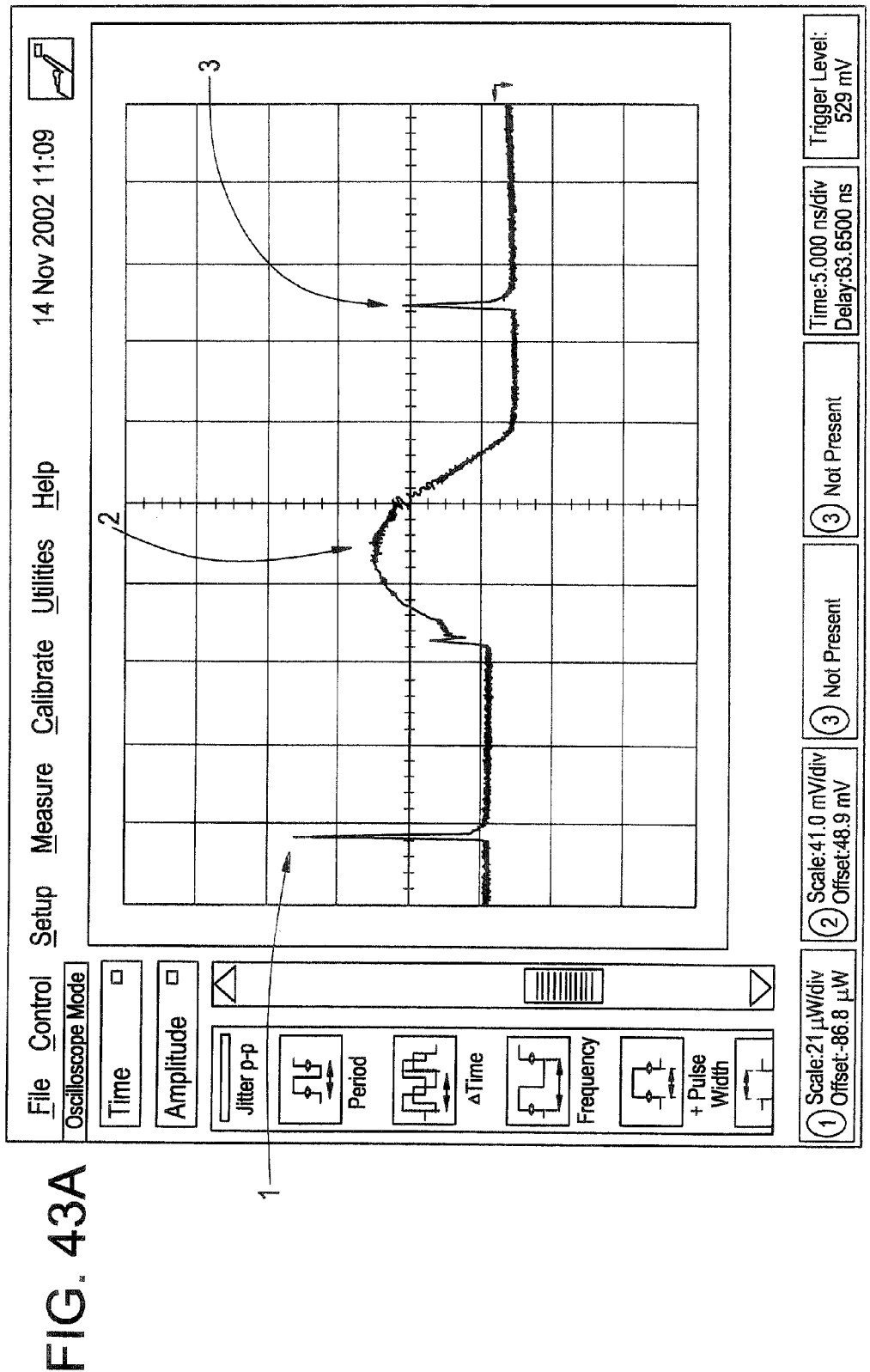
FIGS. 43a-43c show outputs of the pulse source of FIG. 41 in graphic form.
Figure 43B:
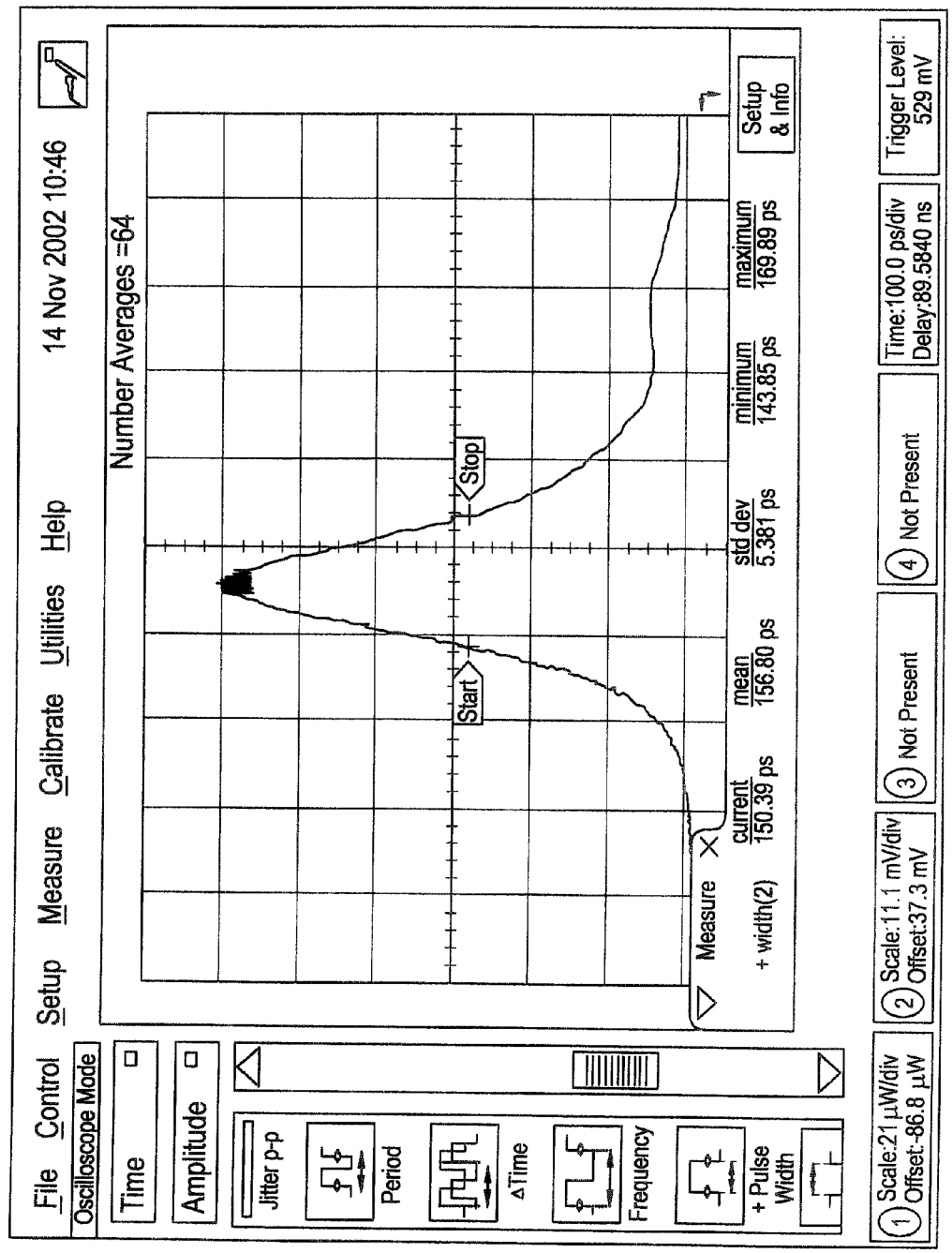
Figure 43C:
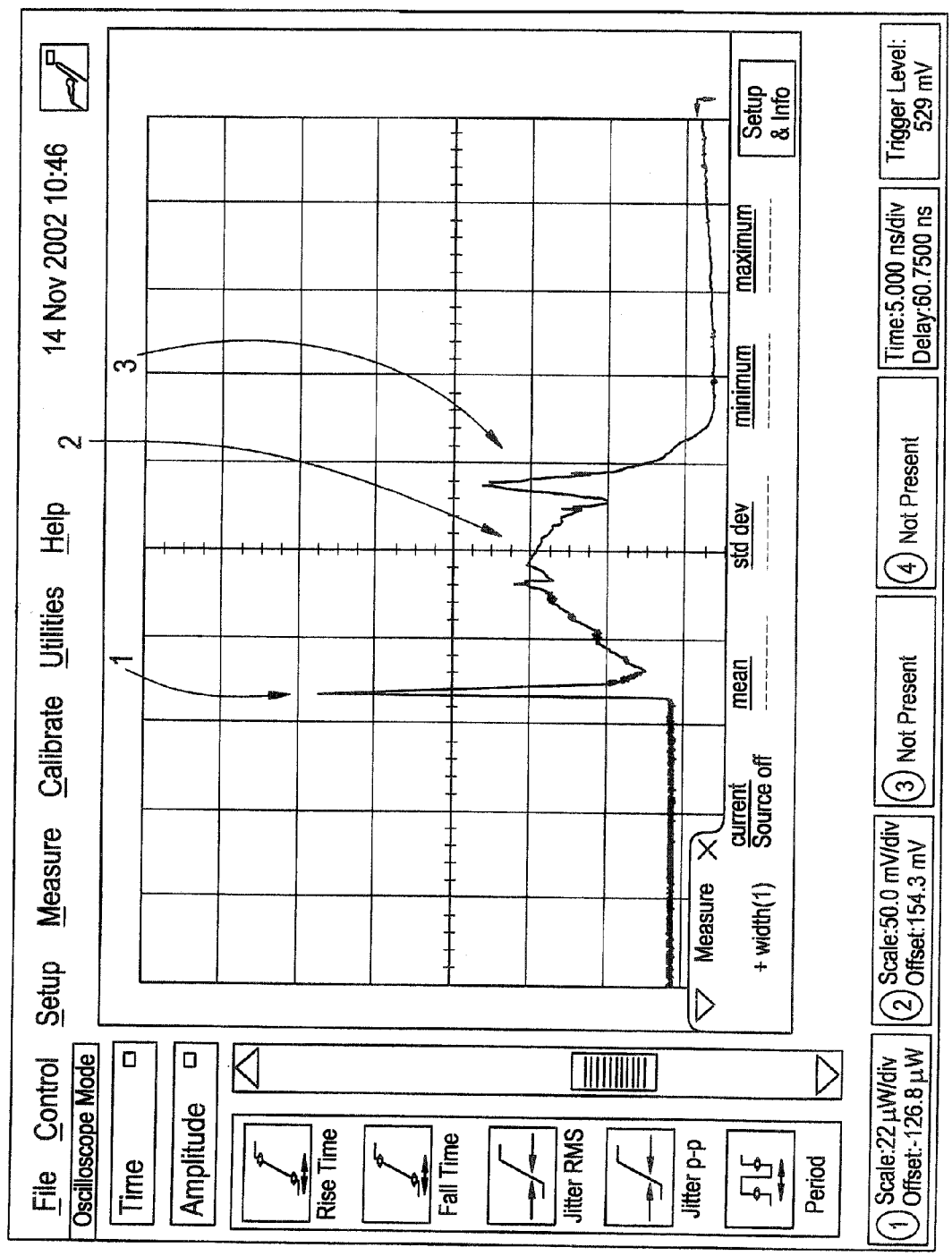

Another embodiment of a multiple pulse source is shown in FIG. 41. This source is utilized in the laser system shown in FIG. 42. The Ytterbium amplifier is normally needed for the pulse intensity to be sufficient for amplification in the regenerative amplifier. The pulse compressor is optional. The multiple pulse source is a laser diode and multiple electronic drivers. In this case there are three sources with a delay generator that allows different delays to each electronic driver. A long pulse is generated by a conventional pulse driver for a laser diode. The shorter pulses are derived from short pulse laser diode drivers such as are available from Avtech. These signals are added through electronic mixers. The output is shown in FIG. 43*a*. This is an oscilloscope screen measured with a sufficiently fast photodiode. There are three peaks observable. The output for one of the short pulses is shown in FIG. 43*b*. The pulse width is approximately 100 ps. FIG. 43*c* illustrates a three peak pulse that is formed by changing the delay between the pulses so the electronic signals overlap. The short pulses can also be chirped and then recompressed to femtosecond pulses by the final compressor as described in Ser. No. 08/312,912 and U.S. Pat. No. 5,400,350 (incorporated by reference herein). By appropriately choosing the chirp rates and frequency ranges a single bulk grating can compress a plurality of pulses.

Figure 44:
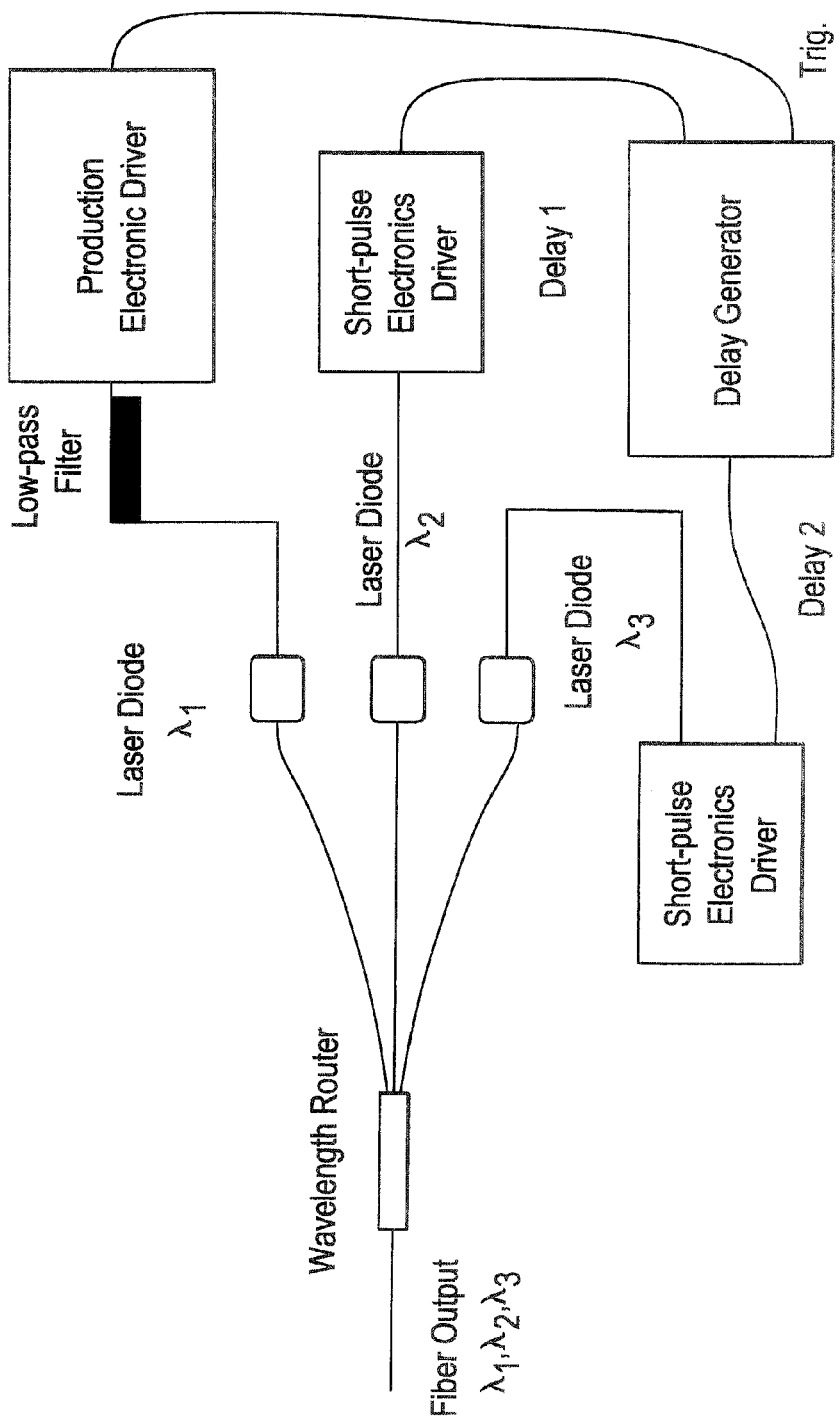
FIG. 44 illustrates a wavelength router scheme usable with the embodiment of FIG. 41.
Figure 45:
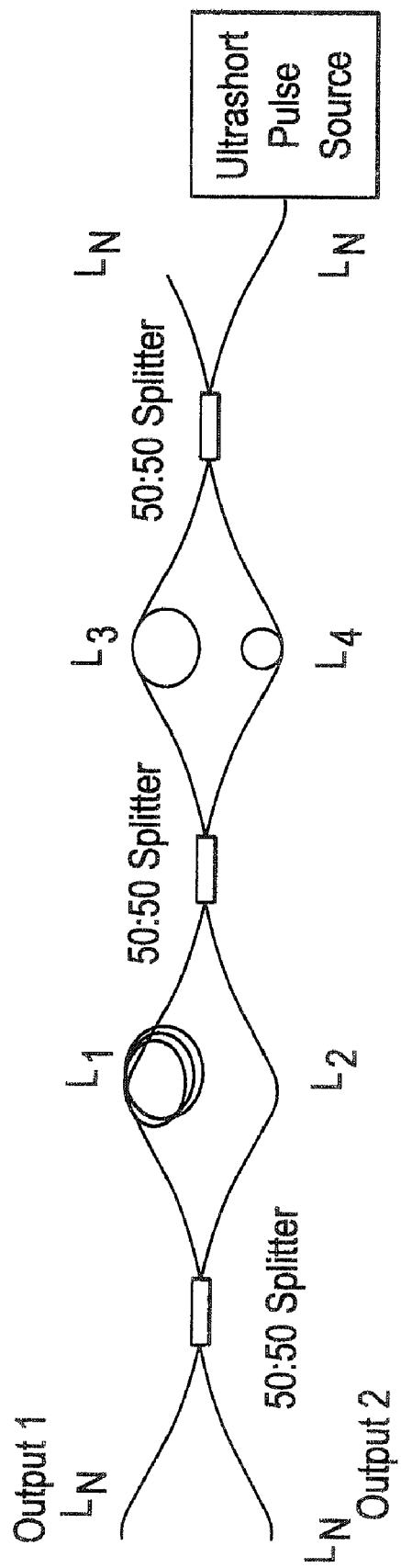
FIG. 45 illustrates a fiber splitter arrangement useable in the embodiment of FIG. 41.

Another embodiment of this is to utilize laser diodes at different wavelengths or polarization states and then combine these optically either with wavelength fiber combiners such as the wavelength router utilized in multiple wavelength telecomm systems or by fiber splitters as shown in FIG. 44. It is also possible to utilize conventional mode-locked sources to give multiple pulses. The methods for utilizing fiber gratings and etalons as disclosed in U.S. Pat. No. 5,627,848 (incorporated by reference herein) as a source of multiple calibration pulses can be utilized here. Another method is to use fiber splitters with different path lengths as shown in FIG. 45. Four pulses are output for each pulse from the Ultrashort pulse source. The four pulses are sequentially, temporally delayed by:

1. $c(2L_N+L_1+L_4)$
2. $c(2L_N+L_1+L_3)$
3. $c(2L_N+L_2+L_4)$
4. $c(2L_N+L_2+L_3)$

What is claimed is:

1. A pulse source for generating pulses in the picosecond to nanosecond range, comprising:
    a seed source emitting seed pulses, said seed source comprising a Yb: mode-locked fiber oscillator, a laser diode, or a microchip laser;
    at least one fiber amplifier optically coupled to said seed source, and comprising a multimode fiber amplifier configured to propagate a single mode beam;
    a feedback controller coupled to one or more of said seed source and said at least one fiber amplifier;
    a bulk optical amplifier receiving amplified pulses from said at least one fiber amplifier and producing output pulses having pulse widths in the picosecond to nanosecond range; and
    one or more pump laser diodes for pumping said seed source, said at least one fiber amplifier, and said bulk optical amplifier.

2. A pulse source, comprising:
    a seed source generating seed pulses, said seed source comprising a mode-locked fiber oscillator;
    a monitor for one or more parameters of said pulse source, said monitor operatively coupled to at least said mode locked fiber oscillator and responsive to one or more parameters of said mode locked fiber oscillator;
    a pulse stretcher comprising a first length of optical fiber, said pulse stretcher configured to receive and temporally stretch said seed pulses;
    a bulk optical amplifier configured to receive and amplify said temporally stretched seed pulses and to produce temporally stretched and amplified pulses;
    a pulse compressor disposed downstream from said bulk optical amplifier, said pulse compressor configured to compress said temporally stretched and amplified pulses and to produce compressed output pulses; and one or more pump laser diodes for pumping said seed source and said bulk optical amplifier.

3. The pulse source according to claim 2, wherein said one or more parameters comprise at least a frequency of said mode locked fiber oscillator.

4. The pulse source according to claim 2, wherein at least one of said one or more parameters is representative of mode lock startup of said mode locked fiber oscillator.

5. The pulse source according to claim 2, wherein at least one of said one or more parameters is both measurable and controllable by said monitor.

6. The pulse source according to claim 2, said pulse source comprising at least one fiber amplifier optically coupled to said seed source and disposed upstream from said bulk optical amplifier, said at least one fiber amplifier increasing pulse energy prior to amplification with said bulk optical amplifier.

7. The pulse source according to claim 6, wherein said at least one fiber amplifier and said seed source are configured as a fiber-based MOPA.

8. The pulse source according to claim 2, wherein said mode-locked fiber oscillator generates broadband pulses having a bandwidth comparable to the bandwidth of the mode-locked fiber oscillator gain medium; and wherein said seed source comprises a first pulse compressor and/or dispersion compensator, said seed source generating seed pulses having pulse widths in the range from about 20 fs to about 200 fs.

9. The pulse source according to claim 2, wherein said monitor is operatively coupled to at least one of said seed source, said bulk optical amplifier, or said one or more pump diodes.

10. The pulse source according to claim 2, wherein said monitor comprises a first monitor component, and a driver between said mode locked fiber oscillator and said first monitor component.

11. The pulse source according to claim 6, wherein said monitor is operatively coupled to said at least one fiber amplifier.

12. The pulse source according to claim 2, wherein said monitor comprises a sensor and a controller.

13. The pulse source according to claim 2, wherein said monitor is configured to adjust an oscillator parameter.

14. The pulse source according to claim 6, wherein said monitor is configured to adjust a parameter of said at least one fiber amplifier.

15. The pulse source according to claim 2, wherein said monitor comprises a controller operatively coupled to said seed source, said monitor being configured to adjust at least one of mode locked frequency, optical power, and mode lock calibration.

16. The pulse source according to claim 2, wherein said monitor comprises a controller having at least one module for extracting a tap signal for feedback control.

17. The pulse source according to claim 2, wherein said monitor comprises a device for monitoring one or more of pulse width, wavelength, repetition rate, polarization and temporal delay characteristics of pulses produced by said seed source.

18. The pulse source according to claim 2, wherein said monitor comprises a controller configured to control one or more of a power and spectrum generated with said pulse source.

19. The pulse source according to claim 2, wherein said monitor comprises a controller having a mode-lock start-up and search algorithm.

20. The pulse source according to claim 2, wherein said pulse stretcher comprises a fiber Bragg grating.

21. The pulse source according to claim 20, wherein said fiber Bragg grating comprises a chirped fiber Bragg grating.

22. The pulse source according to claim 2, wherein said pulse stretcher comprises at least one of optical fiber, dispersion shifted fiber, and chirped fiber Bragg grating.

23. The pulse source according to claim 6, wherein said first length of optical fiber comprises a dispersion shifted and non-dispersion-shifted fiber.

24. The pulse source according to claim 2, wherein said pulse stretcher comprises a second length of optical fiber and a fiber Bragg grating.

25. The pulse source according to claim 2, wherein said first length of optical fiber comprises a dispersion shifted and dispersion non-shifted fiber.

26. The pulse source according to claim 2, wherein a gain medium of said bulk optical amplifier comprises Yb:YAG, Nd:YAG, Nd:YLF, Nd:YVO$_4$, Nd:glass, Yb, glass, Nd:KGW, or a narrow bandwidth Nd-based crystal.

27. The pulse source according to claim 2, wherein said bulk optical amplifier comprises a regenerative amplifier.

28. The pulse source according to claim 2, wherein said bulk optical amplifier comprises a rod, slab, or thin disk.

29. The pulse source according to claim 2, said pulse source comprising an electro-optic or acousto-optic modulator disposed between said seed source and said bulk optical amplifier, said modulator configured as a pulse picker to reduce a repetition rate to within a range of 1 KHz to 1 MHz.

30. The pulse source according to claim 2, said pulse source further comprising a wavelength converter following an output of said bulk optical amplifier.

31. The pulse source according to claim 2, wherein said pulse compressor recompresses the pulses emitted from said bulk optical amplifier to near the bandwidth limit, said compressor comprising one or more of a bulk optic component, single grating compressor, a dispersive prism, a grism, a dispersive delay line, a fiber or bulk Bragg grating, and a chirped periodically poled crystal.

32. The pulse source according to claim 2, wherein said pulse compressor is configured to produce femtosecond (fs) output pulses.

33. The pulse source according to claim 6, wherein said at least one fiber amplifier comprises a non-linear amplifier coupled to said seed source, said non-linear amplifier configured to generate spectrally narrowed amplified pulses matched to a gain bandwidth of said bulk optical amplifier.

34. The pulse source according to claim 14, wherein said parameter comprises a gain of said at least one fiber amplifier.

35. The pulse source according to claim 2, wherein said monitor comprises a beam manipulator comprising: one or more of an optical gating device, a power meter, a non-linear crystal, and a spectrometer.

36. The pulse source according to claim 2, said pulse source comprising a pulse conditioner disposed between said seed source and said bulk optical amplifier, said pulse conditioner configured for at least one of: spectral narrowing, broadening or shaping, wavelength converting, temporal pulse compression or stretching, pulse attenuation, or lowering of the repetition rate of a pulse train generated by said seed source.

37. The pulse source according to claim 2, wherein said mode locked fiber oscillator comprises: concatenated sections of optical fiber comprising at least one section of polarization maintaining fiber.

38. A pulse source, comprising:
a seed source generating seed pulses, said seed source comprising a mode-locked fiber oscillator;

a monitor for one or more parameters of said pulse source, said monitor operatively coupled to said pulse source and comprising a sensor and a controller, said monitor receiving a signal representative of said one or more parameters of said pulse source;

a pulse stretcher comprising a first length of optical fiber, said pulse stretcher configured to receive and temporally stretch said seed pulses;

a bulk optical amplifier configured to receive and amplify said temporally stretched seed pulses and to produce temporally stretched and amplified pulses;

a pulse compressor disposed downstream from said bulk optical amplifier, said pulse compressor configured to compress said temporally stretched and amplified pulses and to produce compressed output pulses; and one or more pump laser diodes for pumping said seed source and said bulk optical amplifier.

39. The pulse source according to claim 37, said pulse source comprising at least one fiber amplifier optically coupled to said seed source and disposed upstream from said bulk optical amplifier, said at least one fiber amplifier increasing pulse energy prior to amplification with said bulk optical amplifier.

40. A pulse source, comprising:
a seed source generating seed pulses, said seed source comprising a mode-locked fiber oscillator;
a monitor for one or more performance parameters of said pulse source and comprising a sensor arranged after said oscillator;
a pulse stretcher comprising a first length of optical fiber, said pulse stretcher configured to receive and temporally stretch said seed pulses;
a bulk optical amplifier configured to receive and amplify said temporally stretched seed pulses and to produce temporally stretched and amplified pulses;
a pulse compressor disposed downstream from said bulk optical amplifier, said pulse compressor configured to compress said temporally stretched and amplified pulses and to produce compressed output pulses; and
one or more pump laser diodes for pumping said seed source and said bulk optical amplifier.

41. A pulse source, comprising:
a seed source generating seed pulses, said seed source comprising a mode-locked fiber oscillator;
a monitor for one or more performance parameters of said pulse source;
a pulse stretcher comprising a first length of optical fiber, said pulse stretcher configured to receive and temporally stretch said seed pulses;
a bulk optical amplifier configured to receive and amplify said temporally stretched seed pulses and to produce temporally stretched and amplified pulses;
a pulse compressor disposed downstream from said bulk optical amplifier, said pulse compressor configured to compress said temporally stretched and amplified pulses and to produce compressed output pulses; and
one or more pump laser diodes for pumping said seed source and said bulk optical amplifier;
wherein said monitor is operatively coupled to at least one of said seed source, said bulk optical amplifier, or said one or more pump diodes.

42. The pulse source according to claim 6, wherein said pulse stretcher comprises a chirped fiber Bragg grating.

43. The pulse source according to claim 6, wherein said pulse stretcher comprises at least one of optical fiber, dispersion shifted fiber, and chirped fiber Bragg grating.

44. The pulse source according to claim 6, wherein said pulse stretcher comprises a second length of optical fiber and a fiber Bragg grating.

* * * * *